(12) United States Patent
Whitten et al.

(10) Patent No.: US 10,420,407 B2
(45) Date of Patent: Sep. 24, 2019

(54) CASE AND MOUNT SYSTEM FOR HANDHELD ELECTRONIC DEVICE

(71) Applicant: ROKFORM IP LLC, Irvine, CA (US)

(72) Inventors: Jeff Whitten, Irvine, CA (US); Bernhard Leitner, Mission Viejo, CA (US); Craig Erion, Lemon Heights, CA (US)

(73) Assignee: ROKFORM IP LLC, Irvine, CA (US)

( * ) Notice: Subject to any disclaimer, the term of this patent is extended or adjusted under 35 U.S.C. 154(b) by 0 days.

(21) Appl. No.: 16/124,032

(22) Filed: Sep. 6, 2018

(65) Prior Publication Data

US 2019/0029380 A1 Jan. 31, 2019

Related U.S. Application Data

(63) Continuation of application No. 15/645,944, filed on Jul. 10, 2017, now Pat. No. 10,070,707, which is a
(Continued)

(51) Int. Cl.
*B65D 85/00* (2006.01)
*A45C 11/00* (2006.01)
(Continued)

(52) U.S. Cl.
CPC .......... *A45C 11/00* (2013.01); *A45C 13/002* (2013.01); *A45C 13/005* (2013.01); *A45C 13/1069* (2013.01); *A45F 5/00* (2013.01); *B60R 11/00* (2013.01); *B62J 9/003* (2013.01); *B62J 11/00* (2013.01); *F16M 11/041* (2013.01); *F16M 11/105* (2013.01); *F16M 11/16* (2013.01); *F16M 11/2021* (2013.01); *F16M 11/242* (2013.01); *F16M 11/38* (2013.01);
(Continued)

(58) Field of Classification Search
CPC .......... A45C 2011/001; A45C 13/1069; A45C 13/1053; B60R 11/00; B62J 7/02; B62J 7/04
USPC ................. 206/45.2, 320, 701; 224/412, 929
See application file for complete search history.

(56) References Cited

U.S. PATENT DOCUMENTS 3,179,367 A 4/1965 Rapata
3,986,780 A 10/1976 Nivet
(Continued)

FOREIGN PATENT DOCUMENTS

DE 20 2004 017 041 U1 3/2005

OTHER PUBLICATIONS

International Search Report and Written Opinion re International Application No. PCT/US2013/021474 dated Apr. 2, 2013, in 12 pages.
(Continued)

*Primary Examiner* — Anthony D Stashick
*Assistant Examiner* — Raven Collins
(74) *Attorney, Agent, or Firm* — Knobbe, Martens, Olson & Bear, LLP

(57) ABSTRACT

A protective case and mounting system for a handheld electronic device is provided. The protective case can include a removable mounting system comprised of an interlocking member and a plurality of mounting bases. The protective case may further include a non-slip member to prevent the device from slipping on a surface and a magnet for attaching the device to a magnetic surface.

7 Claims, 43 Drawing Sheets

Related U.S. Application Data continuation of application No. 15/356,346, filed on Nov. 18, 2016, now Pat. No. 9,700,114, which is a continuation of application No. 14/939,231, filed on Nov. 12, 2015, now Pat. No. 9,498,034, which is a continuation of application No. 14/120,319, filed on May 14, 2014, now Pat. No. 9,185,953, which is a continuation-in-part of application No. 14/260,817, filed on Apr. 24, 2014, now Pat. No. 9,383,774, which is a continuation of application No. 13/593,220, filed on Aug. 23, 2012, now Pat. No. 8,708,151.

(60) Provisional application No. 61/860,212, filed on Jul. 30, 2013, provisional application No. 61/823,752, filed on May 15, 2013, provisional application No. 61/823,803, filed on May 15, 2013, provisional application No. 61/823,807, filed on May 15, 2013, provisional application No. 61/653,618, filed on May 31, 2012, provisional application No. 61/585,933, filed on Jan. 12, 2012.

(51) Int. Cl.
| | | |
|---|---|---|
| *B62J 9/00* | (2006.01) | |
| *G06F 1/16* | (2006.01) | |
| *B62J 11/00* | (2006.01) | |
| *F16M 11/38* | (2006.01) | |
| *F16M 13/02* | (2006.01) | |
| *F16M 11/20* | (2006.01) | |
| *F16M 11/04* | (2006.01) | |
| *F16M 11/10* | (2006.01) | |
| *A45F 5/00* | (2006.01) | |
| *H04B 1/3888* | (2015.01) | |
| *B60R 11/00* | (2006.01) | |
| *A45C 13/00* | (2006.01) | |
| *F16M 11/24* | (2006.01) | |
| *F16M 11/16* | (2006.01) | |
| *A45C 13/10* | (2006.01) | |
| *B62J 99/00* | (2009.01) | |

(52) U.S. Cl.
CPC ......... *F16M 13/022* (2013.01); *G06F 1/1656* (2013.01); *H04B 1/3888* (2013.01); *A45C 2011/001* (2013.01); *A45C 2011/002* (2013.01); *A45C 2011/003* (2013.01); *A45C 2200/15* (2013.01); *A45F 2005/006* (2013.01); *A45F 2200/0516* (2013.01); *A45F 2200/0525* (2013.01); *B62J 2099/0006* (2013.01); *B62J 2099/0033* (2013.01); *G06F 2200/1633* (2013.01)

(56) References Cited

U.S. PATENT DOCUMENTS

| | | |
|---|---|---|
| D564,754 S | 3/2008 | Tages et al. |
| 7,523,906 B2 | 4/2009 | Bennett |
| D606,738 S | 12/2009 | Hofer et al. |
| 7,652,888 B2 | 1/2010 | Bohlinger et al. |
| 7,685,904 B2 | 3/2010 | Cutsforth |
| D627,771 S | 11/2010 | Smith et al. |
| 7,930,006 B2 | 4/2011 | Neu et al. |
| D646,672 S | 10/2011 | Fathollahi |
| D647,085 S | 10/2011 | Chung et al. |
| D653,190 S | 1/2012 | Richter |
| D654,043 S | 2/2012 | Pan et al. |
| 8,167,127 B2 | 5/2012 | Martin et al. |
| 8,172,247 B2 | 5/2012 | Weber et al. |
| 8,267,418 B1 | 9/2012 | Chuang |
| 8,317,067 B2 * | 11/2012 | Lewis ............... A45F 5/02 224/183 |
| D671,932 S | 12/2012 | Azoulay |
| 8,439,239 B2 | 5/2013 | Lee |
| 8,469,245 B2 | 6/2013 | Gregory et al. |
| D685,363 S | 7/2013 | Murchison et al. |
| D685,785 S | 7/2013 | Seoc et al. |
| D687,004 S | 7/2013 | Behling |
| D697,060 S | 1/2014 | Yang |
| 8,708,151 B2 | 4/2014 | Whitten et al. |
| D711,886 S | 8/2014 | Kerawala et al. |
| 8,800,763 B2 | 8/2014 | Hale |
| 8,830,663 B2 | 9/2014 | Child et al. |
| D718,290 S | 11/2014 | Whitten et al. |
| 8,936,222 B1 | 1/2015 | Bastian et al. |
| D725,119 S | 3/2015 | Gaylord |
| D726,170 S | 4/2015 | Ng |
| D726,732 S | 4/2015 | Lay et al. |
| D739,857 S | 9/2015 | Lay et al. |
| 9,185,953 B2 | 11/2015 | Whitten et al. |
| 9,243,739 B2 | 1/2016 | Peters |
| 9,383,774 B2 | 7/2016 | Whitten et al. |
| 9,402,016 B1 | 7/2016 | Hidalgo |
| 9,498,034 B2 | 11/2016 | Whitten et al. |
| 9,592,871 B2 | 3/2017 | Whitten et al. |
| 9,700,114 B2 | 7/2017 | Whitten et al. |
| 10,070,707 B2 | 9/2018 | Whitten et al. |
| 10,093,377 B2 | 10/2018 | Whitten et al. |
| 10,112,670 B2 | 10/2018 | Whitten et al. |
| 2002/0139822 A1 | 10/2002 | Infanti |
| 2004/0204169 A1 | 10/2004 | Goradesky |
| 2006/0229740 A1* | 10/2006 | Kreisel ............... H02H 3/006 700/22 |
| 2007/0014120 A1 | 1/2007 | Kitamura |
| 2007/0212931 A1 | 9/2007 | Livingston |
| 2008/0023508 A1 | 1/2008 | Harchol |
| 2008/0251512 A1 | 10/2008 | Griffin et al. |
| 2008/0314941 A1 | 12/2008 | Knych et al. |
| 2010/0084527 A1 | 4/2010 | Lau et al. |
| 2011/0043086 A1 | 2/2011 | Cui et al. |
| 2011/0143583 A1 | 6/2011 | Zilmer et al. |
| 2011/0227735 A1 | 9/2011 | Fawcett et al. |
| 2012/0298820 A1 | 11/2012 | Manolidis |
| 2013/0292270 A1 | 11/2013 | Lach et al. |
| 2013/0292296 A1 | 11/2013 | Kang et al. |
| 2014/0355200 A1 | 12/2014 | Thiers |
| 2016/0192752 A1 | 7/2016 | Lach et al. |

OTHER PUBLICATIONS

Bicio—GoRide —Bike Mount for iPhone 3G/3GS, http://www.bicio.com/GoRide_iphoneBikeMount.php, accessed via web archive, dated Nov. 29, 2011.
Bicio —GoRide Product page depicting an iPhone Bike Mount and Base Mount, http://www.bicio.com/category-biker.php, accessed via web archive, dated Dec. 8, 2011.
Bicio—GoRide iPhone Bike Mount, http://www.bicio.com/GoRide_iphoneBase.php, accessed via web archive, dated Apr. 16, 2011.
The Wallee—Features page depicting iPad hard case and wall plate, http://thewallee.com/site/about ("features" tab), accessed via web archive, dated Jan. 8, 2011.
The Wallee—Technical Specifications page depicting iPad hard case and wall plate, http://thewallee.com/site/about ("tech specs" tab), accessed via web archive, dated Jan. 8, 2011.
"The Wallee Wall Mount + Hard Case System for iPad", The Gadgeteer (Jul. 29, 2010), available at http://the-gadgeteer.com/2010/07/29/the-wallee-wall-mount-hard-case-system-for-ipad/.
Donovan, Thomas J., Letter to counsel for Applicant, Dec. 8, 2017.
The Wallee iPad Case and Wall Mount, https://web.archive.org/web/20110108191535/http://thewallee.com/#, in 89 pages.
Welcome to iBikeMount.com—The Bike Mount Solution for iPho . . . , https://web.archive.org/web/20090721175904/http://www.ibikemount.com:80/index.html, in 20 pages.
Donovan, Thomas J., Letter to counsel for Applicant, dated Mar. 15, 2018, and accompanying exhibits to letter.

* cited by examiner

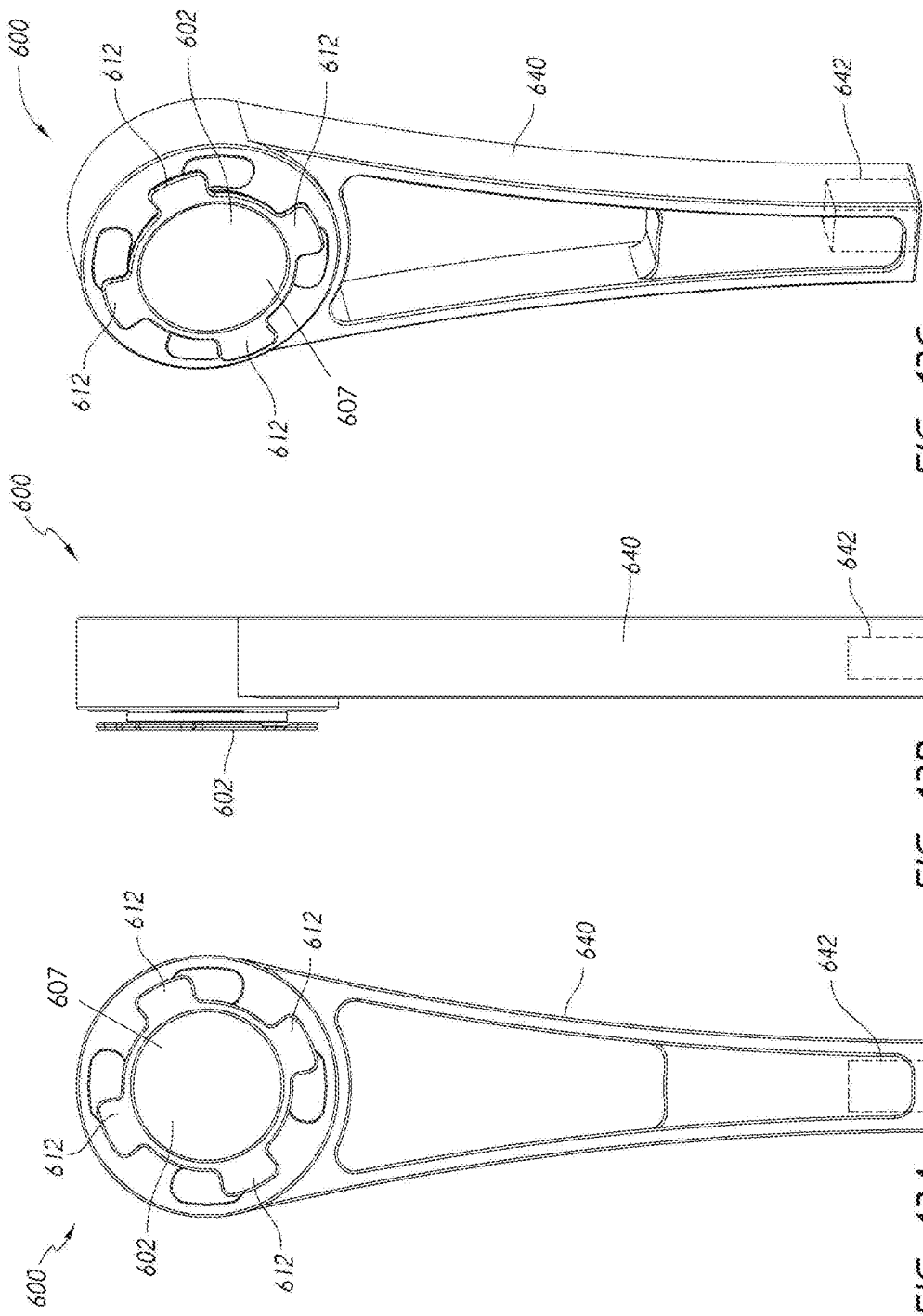

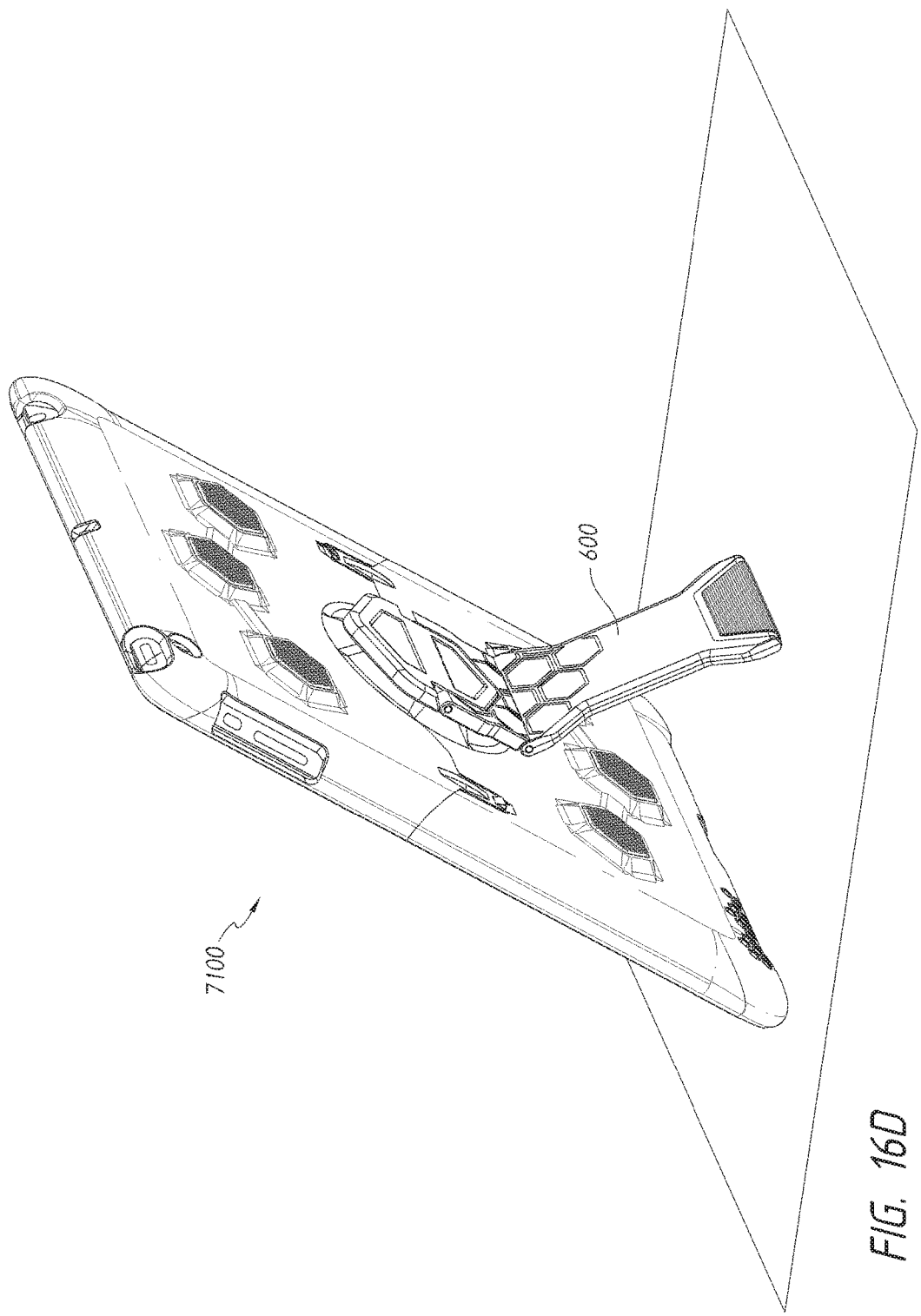

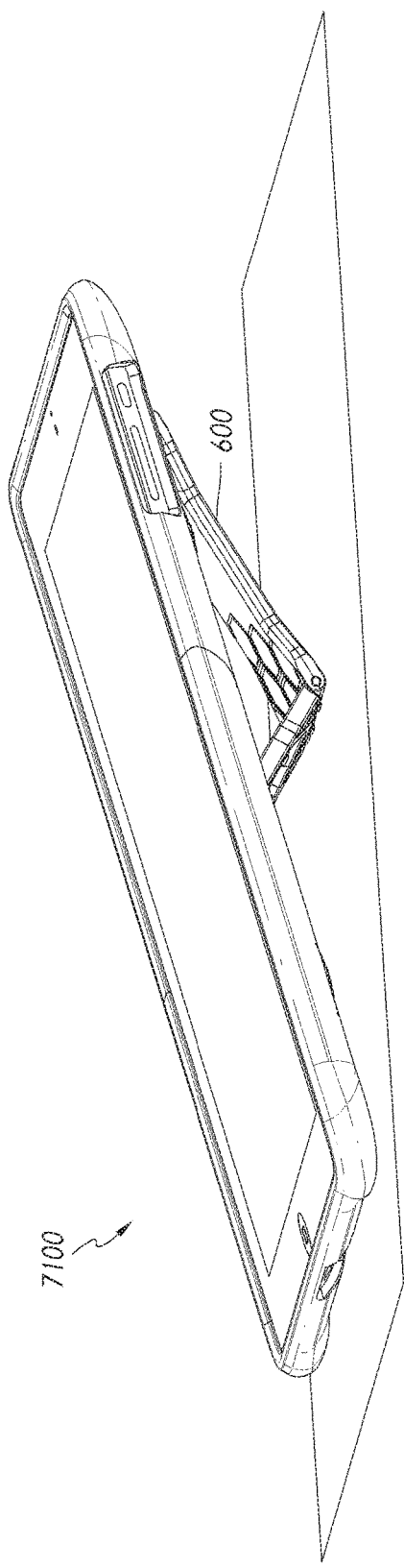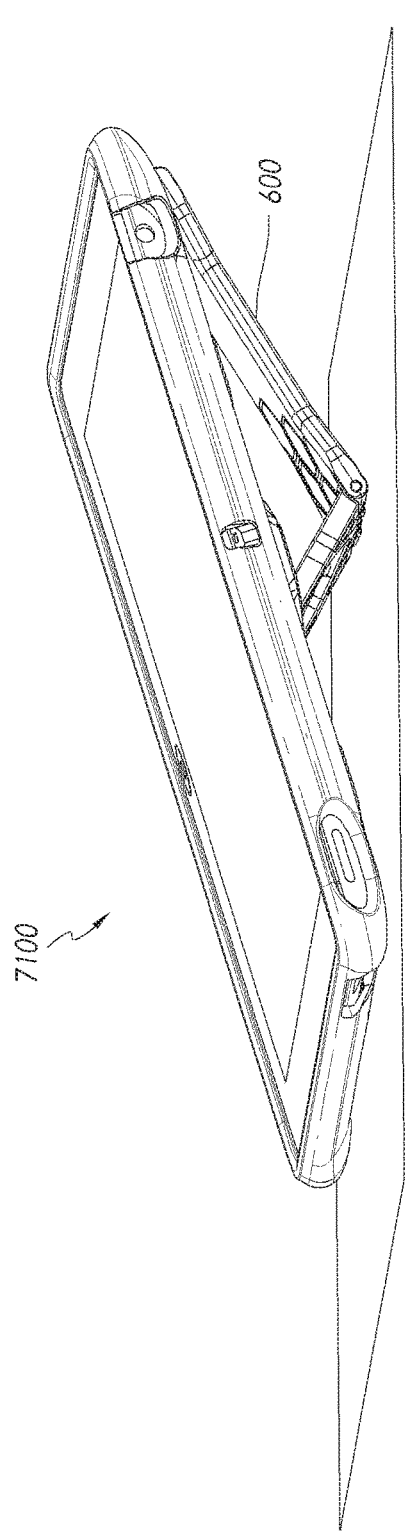

CASE AND MOUNT SYSTEM FOR HANDHELD ELECTRONIC DEVICE

CROSS-REFERENCE TO RELATED APPLICATIONS

Any and all applications for which a foreign or domestic priority claim is identified in the Application Data Sheet as filed with the present application are hereby incorporated by reference in their entirety.

BACKGROUND OF THE INVENTION

Field of the Invention

The invention relates generally to protective cases for handheld electronic devices.

Description of the Related Art

Handheld and/or portable electronic devices (e.g., digital media players, phones, smartphones, tablet computers, handheld readers, and similar devices) are becoming important and common tools. These tools are constantly in use, both at home and on the go.

However, with this frequency and variety of use comes the problem of proper protection. Without proper protection, a device may become damaged due to being dropped or by falling from an unsecured position. This damage may be permanent and cause loss of data or information and high replacement costs.

SUMMARY OF THE INVENTION

In at least one embodiment, the present application relates to a protective system for a handheld electronic device that overcomes the shortcomings of the prior art noted above.

In some embodiments, a protective system for a handheld electronic device is disclosed. The protection system comprises a shell comprised of a rear wall, a plurality of wall surfaces arranged to enclose a plurality of peripheral edges of a handheld electronic device, and an outer surface. The rear wall further defines an attachment region designed to receive an interlocking member and a non-slip region designed to receive a non-slip member. The attachment region comprises a first open space, an inner interlocking surface and an outer interlocking surface, both the interlocking surfaces surrounding the first open space, the inner interlocking surface being located above the plane of the outer surface of the rear wall and wherein the inner and outer interlocking surfaces are radially offset to provide an interlocking area. The interlocking member comprises a plate having a plurality of engaging members generally located at right angles, the engaging members being configured to interact with the inner and outer interlocking surfaces such that in an interlocked position each of the engaging members is disposed within the interlocking area. The interlocking member further comprises at least one mounting base. The non-slip region comprises a second open space and a recessed surface formed by the disposition of a small diameter opening within a larger diameter opening. The non-slip member comprises a non-slip material shaped to fit within the second open space, the non-slip member having a circumferential groove dividing the non-slip member into a gripping surface and an interior surface, the interior surface having a greater diameter than the gripping surface, the groove in the non-slip member engaging with the recessed surface to attach the non-slip member to the shell. The non-slip member further comprises an indentation on the interior surface designed to incorporate a magnet.

1. An embodiment involves a protection system for a handheld electronic device, including a shell comprising a rear wall and a side wall extending from the rear wall, wherein, in use, the side wall encloses a plurality of peripheral edges of an associated handheld electronic device. The rear wall further comprises an inner surface and an outer surface. The rear wall defines an attachment region designed to receive an interlocking member and a non-slip region designed to receive a non-slip member. The attachment region comprises a first open space, a first interlocking surface and a second interlocking surface. Both of the first and second interlocking surfaces surrounding at least a portion of the first open space. The first and second interlocking surfaces are located behind the inner surface of the rear wall with the first interlocking surface being located substantially in a first plane and the second interlocking surface having at least a portion that extends substantially perpendicular to the first plane. The first interlocking surface is circumferentially offset from at least a portion of the second interlocking surface to provide an interlocking area. The interlocking member comprises a plate portion having at least one engagement member that, in use, is passed through the first open space and disposed within the interlocking area to achieve an interlocked position between the interlocking member and the shell. The interlocking member further comprises at least one mounting base. The non-slip region comprises a second open space and a recessed surface formed by the disposition of a smaller opening within a larger opening. The non-slip member comprises a non-slip material shaped to fit within the second open space. The non-slip member has a peripheral groove that, in use, engages the recessed surface to attach the non-slip member to the shell. The non-slip member further comprises an indentation within an interior surface that, in use, faces the associated handheld electronic device. A magnet is received within the indentation of the non-slip member.

2. The system of paragraph 1, wherein the shell further comprises at least one access opening that allows access to control features of the handheld electronic device.

3. The system of paragraph 1, wherein the non-slip member is disposed outwardly of the outermost portion of the outer surface of the rear wall of the shell.

4. The system of paragraph 1, wherein the mounting base further comprises an adhesive layer that, in use, attaches to a mounting surface via adhesion.

5. The system of paragraph 1, wherein the interlocked position is achieved by rotation of the interlocking member within the attachment region.

6. An embodiment involves a protection system for a handheld electronic device, including a shell comprising a rear wall and a side wall extending from the rear wall, wherein, in use, the side wall encloses a plurality of peripheral edges of an associated handheld electronic device. The rear wall further comprises an inner surface and an outer surface. The rear wall defines an attachment region designed to receive an interlocking member and a non-slip region designed to receive a non-slip member. The attachment region comprises a first open space and a plurality of interlocking surface portions, and each of the interlocking surface portions including a retaining surface and a stop surface that cooperate to provide an interlocking area. The interlocking member comprises a plurality of engaging members, each of which are configured to interact with one of the plurality of interlocking surface portions such that, in an interlocked position, each of the plurality of engaging members is disposed within one of the plurality of interlocking areas. The non-slip region comprises a second open space and a recessed surface formed by the disposition of a smaller opening within a larger opening. The non-slip member comprises a non-slip material shaped to fit within the second open space, the non-slip member having a peripheral groove that, in use, engages the recessed surface to attach the non-slip member to the shell.

7. The system of paragraph 6, wherein the shell further comprises at least one access opening that allows access to control features of a handheld electronic device.

8. The system of paragraph 6, further comprising a magnet disposed within the non-slip member.

9. The system of paragraph 6, further comprising at least one mounting base attached to the interlocking member.

10. The system of paragraph 9, wherein the mounting base comprises an adhesive layer that allows the mounting base to be affixed to a surface through adhesion.

11. An embodiment involves a protection system for a handheld electronic device, which includes a shell comprising a rear wall and a side wall extending in a first direction from the rear wall, wherein, in use, the side wall encloses a plurality of peripheral edges of an associated handheld electronic device. The rear wall comprises a first surface facing in the first direction and a second surface facing in a second direction opposite the first direction. The rear wall comprises an opening extending through the second surface. The opening defines at least one shell interlock surface. The system also includes a mount having at least one mount interlock surface, wherein, in use, a portion of the mount is passed through the opening of the shell and the at least one shell interlock surface is engaged with the at least one mount interlock surface to selectively couple the shell to the mount.

12. The protection system of paragraph 11, wherein the mount comprises an adhesive layer that permits the mount to be secured to a surface via adhesion.

13. The protection system of paragraph 11, wherein the mount is a bike mount that, in use, is mounted to a component of a bicycle.

14. The protection system of paragraph 13, wherein the bike mount comprises a cap portion that, in use, is secured to a steerer tube of the bicycle.

15. The protection system of paragraph 14, further comprising an arm portion that extends between the cap portion and the at least one mount interlock surface, wherein the arm portion is rotatably adjustable relative to the cap portion.

16. A mounting system for a handheld electronic device includes a locking member defining an attachment region designed to receive an interlocking member. The attachment region includes a first open space, a first interlocking surface and a second interlocking surface, both of the first and second interlocking surfaces surrounding at least a portion of the first open space, the first and second interlocking surfaces being located behind the inner surface of the rear wall, the first interlocking surface being located substantially in a first plane and the second interlocking surface having at least a portion that extends substantially perpendicular to the first plane, and wherein the first interlocking surface is circumferentially offset from at least a portion of the second interlocking surface to provide an interlocking area. The interlocking member includes a plate portion having at least one engagement member that, in use, is passed through the first open space and disposed within the interlocking area to achieve an interlocked position between the interlocking member and locking member. The interlocking member further includes at least one mounting base.

17. The system of paragraph 16, wherein the interlocked position is achieved by rotation of the interlocking member within the attachment region.

18. The system of paragraph 16, wherein the interlocking member further comprises an arm portion that extends from the interlocking surfaces.

19. The system of paragraph 18, wherein the arm portion permits the handheld electronic device to be secured to a tripod.

20. A protection system for a handheld electronic device includes a shell comprising a rear wall and a side wall extending from the rear wall, wherein, in use, the side wall encloses a plurality of peripheral edges of an associated handheld electronic device. The rear wall further comprises an inner surface and an outer surface, the rear wall defining an attachment region designed to receive an interlocking member and at least one non-slip region designed to receive at least one non-slip member. The attachment region comprises a first open space and a plurality of interlocking surface portions, each of the interlocking surface portions including a retaining surface and a stop surface that cooperate to provide an interlocking area. The interlocking member comprises a plurality of engaging members, each of the engaging members being configured to interact with one of the plurality of interlocking surface portions such that, in an interlocked position, each of the plurality of engaging members is disposed within one of the plurality of interlocking areas. The at least one non-slip region comprises a second open space and a recessed surface formed by the disposition of a smaller opening within a larger opening. The non-slip region comprises at least one non-slip material shaped to fit within the second open space, the non-slip member having a peripheral groove that, in use, engages the recessed surface to attach the non-slip member to the shell. The non-slip member further comprises an indentation within an interior surface that, in use, faces the associated handheld electronic device and a magnet received within the indentation of the non-slip member.

21. The system of paragraph 20, wherein the shell further comprises at least one access opening that allows access to control features of the handheld electronic device.

22. The system of paragraph 20, wherein the non-slip member is disposed outwardly of the outermost portion of the outer surface of the rear wall of the shell.

23. The system of paragraph 20 further comprising a rubber bumper member configured to surround the plurality of peripheral edges of the electronic device.

24. The system of paragraph 20, wherein the interlocked position is achieved by rotation of the interlocking member within the attachment region.

25. The system of paragraph 20, wherein the interlocking member further comprises an elongated arm portion that extends from the interlocking surfaces.

26. The system of paragraph 25, wherein the elongated arm portion permits the handheld electronic device to be displayed in both portrait and landscape positions and at different angles of inclination.

27. The system of paragraph 20, wherein the rear wall further comprises two or more non-slip regions designed to each receive a non-slip member and a magnet received within an indentation of each non-slip member.

28. The system of paragraph 27, wherein two or more magnets are received within a magnet connection member such that the magnets are received within the indentations of proximal non-slip members.

29. A protection system for a handheld electronic device includes a shell comprising a rear wall and a side wall extending from the rear wall, wherein, in use, the side wall encloses a plurality of peripheral edges of an associated handheld electronic device and an elongated, hinged arm that extends from the shell, wherein the elongated arm portion permits the handheld electronic device to be displayed in both portrait and landscape orientations and, in each orientation, in at least two different angles of inclination via manipulation of portions of the hinged arm into different relative positions.

30. The system of paragraph 29, wherein the hinged arm permits display of the electronic device in three different angles of inclination in both the portrait and landscape orientations.

31. A mounting system for a handheld electronic device includes a mounting member defining a lock arrangement and a strap portion. The lock arrangement comprises a lock arm that extends away from a main portion of the mounting member, the lock arm comprising a projection that engages an attachment region of a case shell of an electronic device. The strap portion comprises a first section comprising an opening to accommodate a second section of the strap portion such that the strap portion is adjustable in circumference.

BRIEF DESCRIPTION OF THE DRAWINGS

These and other features, aspects, and advantages of the present invention will now be described in connection with a preferred embodiment of the present invention, in reference to the accompanying drawings. The illustrated embodiments, however, are merely examples and are not intended to limit the invention.

FIG. 13A illustrates a front view of a second mounting member according to a preferred embodiment of the invention;

FIG. 13B illustrates a side view of the mounting member shown in FIG. 13A;

FIG. 13C illustrates a front perspective view of the mounting member shown in FIG. 13A;

FIG. 16D illustrates a side perspective view of the protective case of FIG. 16A with the display member in a second configuration to display the electronic device in portrait mode;

FIG. 16F illustrates a side perspective view of the protective case of FIG. 16A with the display member in a third configuration to display the electronic device in a portrait typing position;

FIG. 16G illustrates a side perspective view of the protective case of FIG. 16A with the display member in a third configuration to display the electronic device in a landscape typing position;

DETAILED DESCRIPTION OF THE PREFERRED EMBODIMENTS

The following detailed description is directed to certain specific embodiments of the invention. However, the invention may be embodied in a multitude of different ways as defined and covered by the claims.

Embodiments of the invention can provide the features of a protection system for a portable or handheld electronic device (hereinafter "handheld electronic device"). Some embodiments of the invention desirably may incorporate an attachment region for attaching a removable mounting member preferably able to support the handheld electronic device within the protection system and affix to a variety of surfaces. Other embodiments of the invention may also incorporate an anti-slip surface wherein a magnet is disposed for attachment of the device to magnetic surfaces and slip prevention.

Shell and Mount System

A preferred embodiment of the present invention comprises a shell for rigidly securing and protecting a handheld electronic device. In a preferred embodiment, the shell may be in multiple pieces for ease of assembly around a handheld electronic device. The upper piece of the shell preferably provides an attachment region for a removable mounting member that can attach to various solid surfaces, such as but not limited to a desk, vehicle dashboard, mirror, etc. The shell preferably also incorporates an anti-slip insert in which a magnet is disposed, allowing for magnetic adherence to surfaces without interfering with the anti-slip benefit provided by the anti-slip insert. The shell preferably is formed using a material that is generally rigid and lightweight, such as but not limited to an injection molded polycarbonate or other suitable plastic material(s). Preferably, the shell comprises rigid sidewalls that surround an entirety or portions of the peripheral edges of the device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera) or to reduce the weight of the shell.

Figure 1:
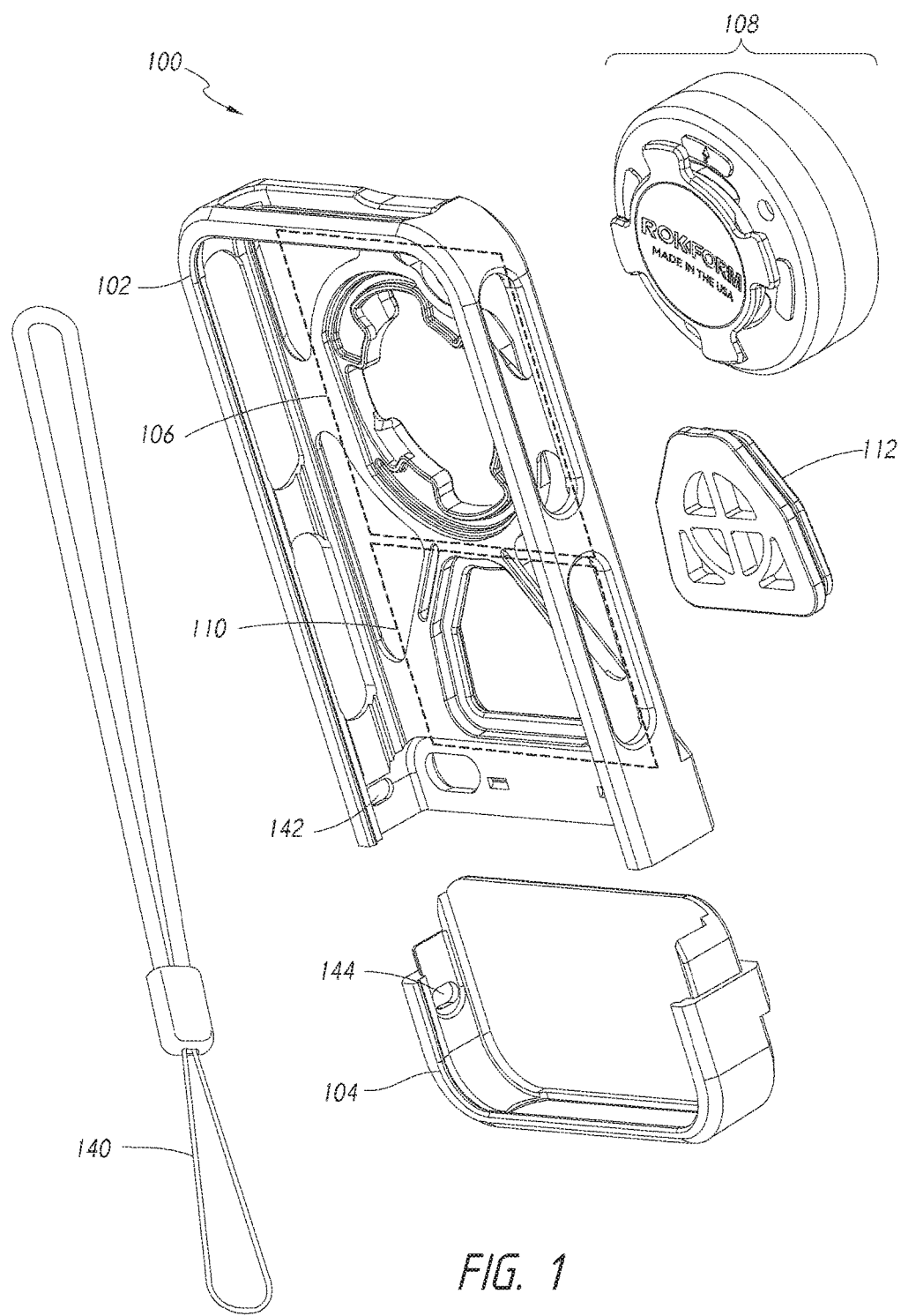
FIG. 1 is a perspective view of an exploded assembly of protective system for a handheld electronic device according to a preferred embodiment of the invention.

FIG. 1 depicts a preferred embodiment having certain features, aspects and advantages of the present invention. In FIG. 1, protection system 100 may include more, fewer or different components than those shown. Protection system 100 includes a body or shell that, in the illustrated arrangement, is comprised of an upper shell piece 102 and lower shell piece 104. Protection system 100 is shown in two pieces to facilitate installation of the protection system 100 on a handheld electronic device. Lower shell piece 104 is designed, in one embodiment, to fit together with upper shell piece 102 preferably using an interlocking or tab/slot attachment. However, in other arrangements, the upper shell piece 102 and lower shell piece 104 could be secured together with other arrangements (e.g., mechanical fasteners, such as screws) or could be portions of a unitary or single-piece shell in which installation of the electronic device is accomplished through another method, such as by deformation of the side walls or other portions of the shell to pass over the electronic device. Thus, references to the upper shell piece 102 or lower shell piece 104 herein are also intended to refer to the entire shell of an integrated or unitary shell arrangement.

Upper shell piece 102 preferably includes an attachment region 106 for attaching mounting member 108. The attachment region 106 contains an engagement structure that allows the upper shell piece 102 and, thus, the protection system 100 to be releasably attached the mounting member 108. A preferred engagement structure is described in greater detail below. As shown in FIG. 1 and FIGS. 9A-C, mounting member 108 may be comprised of an interlocking member 902 and at least one mounting base 904. As described further below and shown in FIG. 6, the mounting member 108 can also include one or more optional spacers, which could be similar or identical to the mounting base 904. Upper shell piece 102 also preferably includes a non-slip region 110, which includes a non-slip arrangement that enhances frictional engagement of protection system 100 with a surface on which the protection system 100 may be placed. In the illustrated arrangement, the non-slip region 110 incorporates an opening or cavity in the protection system 100 (e.g., the upper shell piece 102) into which non-slip member 112 may be inserted. As depicted more clearly in FIG. 8C, non-slip member 112 may also preferably comprise a rare earth magnet 802 in order to removably attach the handheld electronic device contained within protection system 100 to a magnetic surface.

Figure 11:
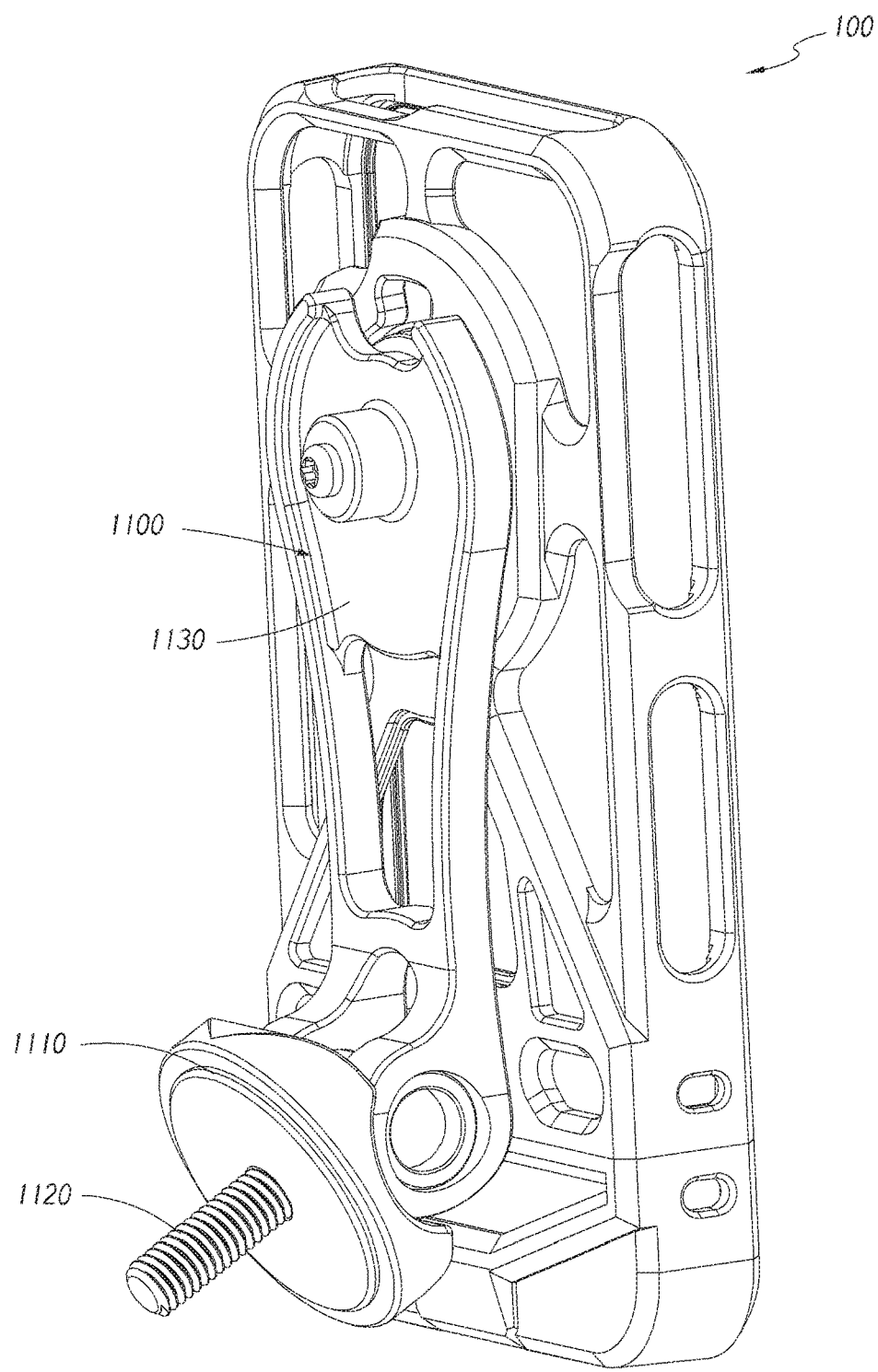
FIG. 11 is perspective view of the protective system secured to a bicycle mount.

FIG. 1 further depicts a preferred embodiment of the invention further comprising a lanyard 140, which may attach to protection system 100 to facilitate easy carrying and transport of a handheld electronic device. For example, the lanyard 140 can be looped through openings 142 and 144 on the upper shell piece 102 and lower shell piece 104, respectively. Additional accessories, not shown in FIG. 1, may be used with protection system 100. For example, one accessory that may be used with protection system 100 includes a bike mount, one embodiment of which is shown in FIG. 11. Another accessory that may be used with protection system 100 includes a tripod (not shown), which can support the protection system 100 and associated electronic device in a suitable position (e.g., portrait or landscape) preferably at an elevated position relative to a surface on which the tripod rest to take photographs or video. The accessory can be coupled to the protection system 100 via an interlocking arrangement the same as or similar to the mounting member 108 or via other suitable arrangements, such as the same as or similar to the lanyard 140 arrangement. In addition to the lanyard 140, bike mount and tripod, other types of accessories can also be provided, such as adjustable or non-adjustable stands, mounting or securing clip arrangements, etc.

As shown in FIGS. 1-4, the assembled upper shell piece 102 and lower shell piece 104 of the protection system 100 together define an interior region or space in which a handheld electronic device may be enclosed. Each of the upper shell piece 102 and the lower shell piece 104 has a rear wall portion 200 that defines an interior rear surface 202 positioned adjacent the back surface of an electronic device placed in the protection system 100. The upper shell piece 102 and the lower shell piece 104 also include at least one or a plurality of enclosing edges to surround the sides of a handheld electronic device and provide protection for the handheld electronic device. In the illustrated arrangement, the enclosing edges are defined by a sidewall portion 150 that extends from the rear wall portion 200. The illustrated sidewall portion 150 extends along an entire periphery of the rear wall portion 200. As described above, however, the sidewall portion 150 is not necessarily solid or continuous, but can include one or more openings configured to allow access to controls or other components or features of the handheld electronic device, or simply to reduce weight. In alternative arrangements, the sidewall portion 150 can be constructed of one or several distinct sidewall portions, such as four corner portions, for example. A forward wall portion is spaced from the rear wall portion 200 by the sidewall portion 150. The forward wall portion defines a forward interior surface that is positioned adjacent a forward surface of the handheld electronic device placed in the protection system 100. In the illustrated arrangement, the forward wall portion is defined by a lip 152 that extends in an inward direction from the sidewall portion 150. Preferably, the lip 152 extends around the entire periphery of the rear wall portion 200. However, in other arrangements, the lip 152 can extend only around a portion of the periphery, which can be the same portion or a different portion than the portion surrounded by the sidewall portion 150. As discussed above, the upper shell piece 102 and lower shell piece 104 can be unitarily-formed. Accordingly, the sidewall portion 150 and/or lip 152 could be unitary, as well.

Figure 2:
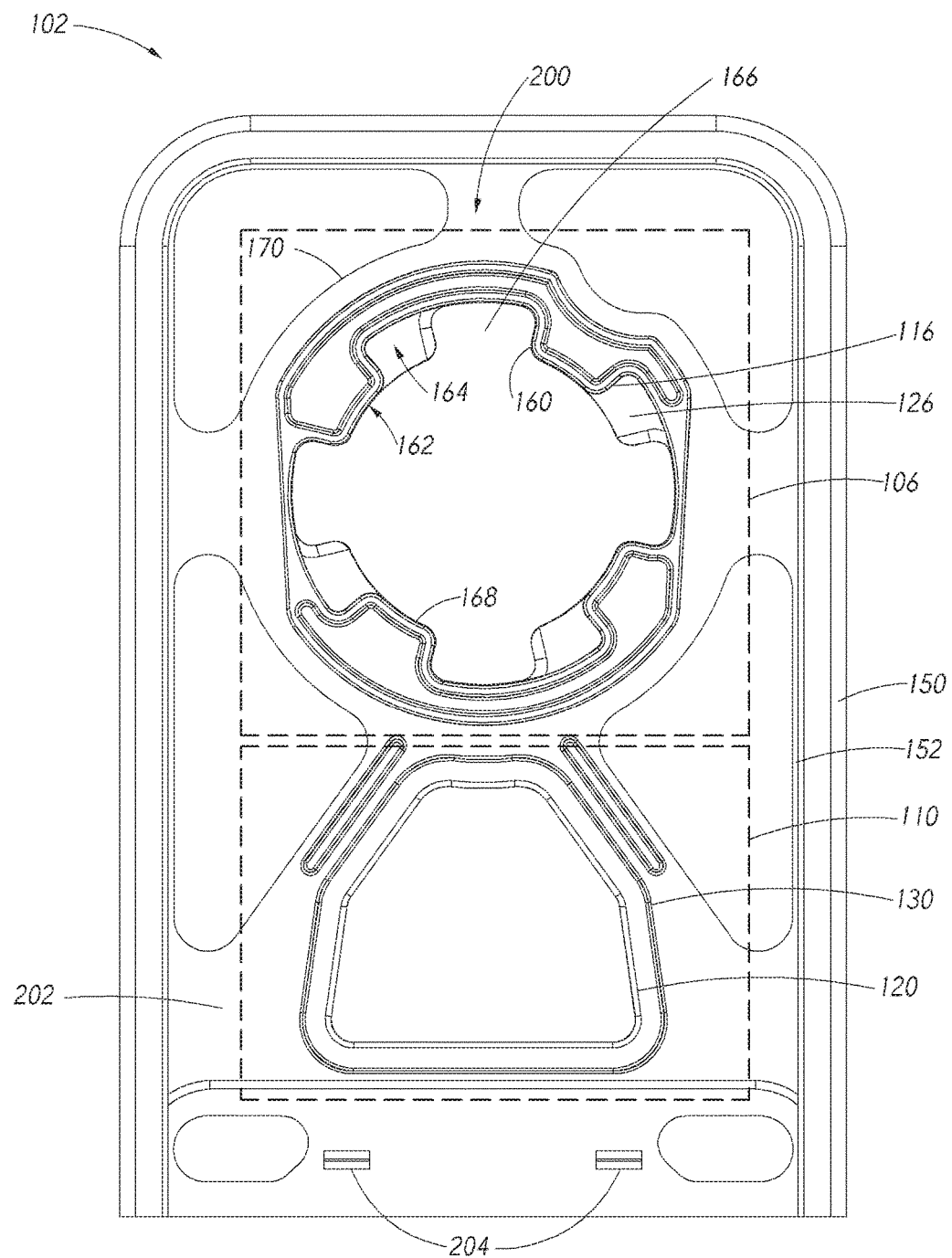
FIG. 2 is a view of the interior rear surface of a shell of the protective system.

As more clearly illustrated in FIG. 2, upper shell piece 102 also preferably includes an attachment region 106. The illustrated attachment region 106 defines an opening 160 in the interior rear surface 202 of upper shell piece 102. As described above, attachment region 106 is configured to allow attachment of mounting member 108 through an interlocking attachment that selectively secures the shell 102 to the mounting member 108 an inhibits or prevents removal in at least one direction. As pictured, attachment region 106 comprises at least one tab 162, each of which preferably defines two interlocking surfaces, 116 and 126. In the illustrated arrangement, the attachment region 106 includes four tabs 162; however, other numbers of tabs 162 could also be provided, such as two, three, five, six or more tabs 162. Interlocking surface 116 is disposed towards the interior rear surface 202 of upper shell piece 102, while interlocking surface 126 is disposed within a different plane than that defined by interlocking surface 116. Preferably, the interlocking surface 116 is perpendicular or substantially perpendicular to the interlocking surface 126. Preferably, the interlocking surface 116 is perpendicular or substantially perpendicular to the interior rear surface 202. The plane of interlocking surface 126 preferably is offset or disposed "below" the plane defined by the interior rear surface 202 or towards the outer rear surface of upper shell piece 102. In addition, preferably, the interlocking surface 116 is offset from at least a portion of the interlocking surface 126 in a circumferential direction to provide a space 164 in which a portion (e.g., tab 912) of the interlocking member 902 may be inserted. The opening 160 preferably also includes at least one access space 166 located beside or circumferentially offset from the at least one tab 162. Preferably, the number of access spaces 166 corresponds to the number of tabs 162. In the illustrated arrangement, four access spaces 166 are provided; however, the number of access spaces 166 can vary in the same manner as the number of tabs 162. Each of the tabs 912 of the interlocking member 902 can be inserted through one of the access spaces 166 and then turned to enter the space 164 and rest against the interlocking surfaces 116 and 126 to form an attachment with upper shell piece 102. Preferably, the access opening 166 is located on an opposite side of the interlocking surface 126 from the interlocking surface 116. In the illustrated arrangement, a circumferential dimension of the access opening 166 is smaller than a circumferential dimension of the tab 162 and can be approximately one-half of the circumferential dimension of the tab 162. The circumferential dimension of the space 164 is less than the circumferential dimension of the tab 162 and can be approximately one-half of the circumferential dimension of the tab 162. In the illustrated arrangement, the interlocking surface 116 is defined by a rib 168 that extends at least partially, and preferably entirely, around the opening 160. Preferably, the opening 160 passes completely through the upper shell piece 102 such that the surface of the associated electronic device is exposed through the opening 160. Such an arrangement advantageously minimizes the overall thickness of the protection system 100, while still providing the desired interlocking mount functionality. In an alternative arrangement, however, a rear wall portion can be provided to define a closed internal end of the opening 160, such that the rear wall portion is positioned in between the interlocking mount and the associated electronic device. Such an arrangement may increase the overall thickness of the protection system 100, but can also provide increased protection to the associated electronic device.

The interior rear surface 202 preferably also includes a non-slip region 110 within which a non-slip arrangement can be provided. For example, a non-slip member 112 may be inserted within the non-slip region 110 of the protective device 100. As shown, non-slip region 110 is comprised of a smaller opening 120 disposed within a larger opening 130. In the illustrated arrangement, the smaller opening 120 extends completely through the rear wall portion 200 and the larger opening 130 extends partially through the rear wall portion 200 from the interior rear surface 202. The recessed surface formed by the disposition of smaller opening 120 within larger opening 130 forms an interference surface to retain non-slip member 112 within the non-slip region 110. FIG. 2 shows one orientation of attachment region 106 and non-slip region 110, though other embodiments may include different orientations. A number of additional open spaces (generally 170) may be provided in the interior rear surface 202 of upper shell piece 102 for any of a number of reasons, including providing access to rear-mounted features of a handheld electronic device such as a camera, microphone, or speaker, or to reduce the weight of the protection system 100. Upper shell piece 102 may further comprise one or more of recesses 204 configured to accommodate one or more tabs 206 to facilitate attachment and retention of lower shell piece 104 to upper shell piece 102 to provide further protection for a handheld electronic device. In the illustrated arrangement, a pair of recesses 204 are located on the rear wall portion 200 of the upper shell piece 102 and a pair of tabs 206 are located on the rear wall portion 200 of the lower shell piece 104. However, in other arrangements, the recesses 204 and tabs 206 could be located elsewhere (e.g., sidewall 150 or front wall/lip 152) and/or could be provided in different numbers. In addition, the arrangement could be reversed such that the tabs 206 are provided on the upper shell piece 102 and the recesses 204 are provided on the lower shell piece 104.

Figure 3:
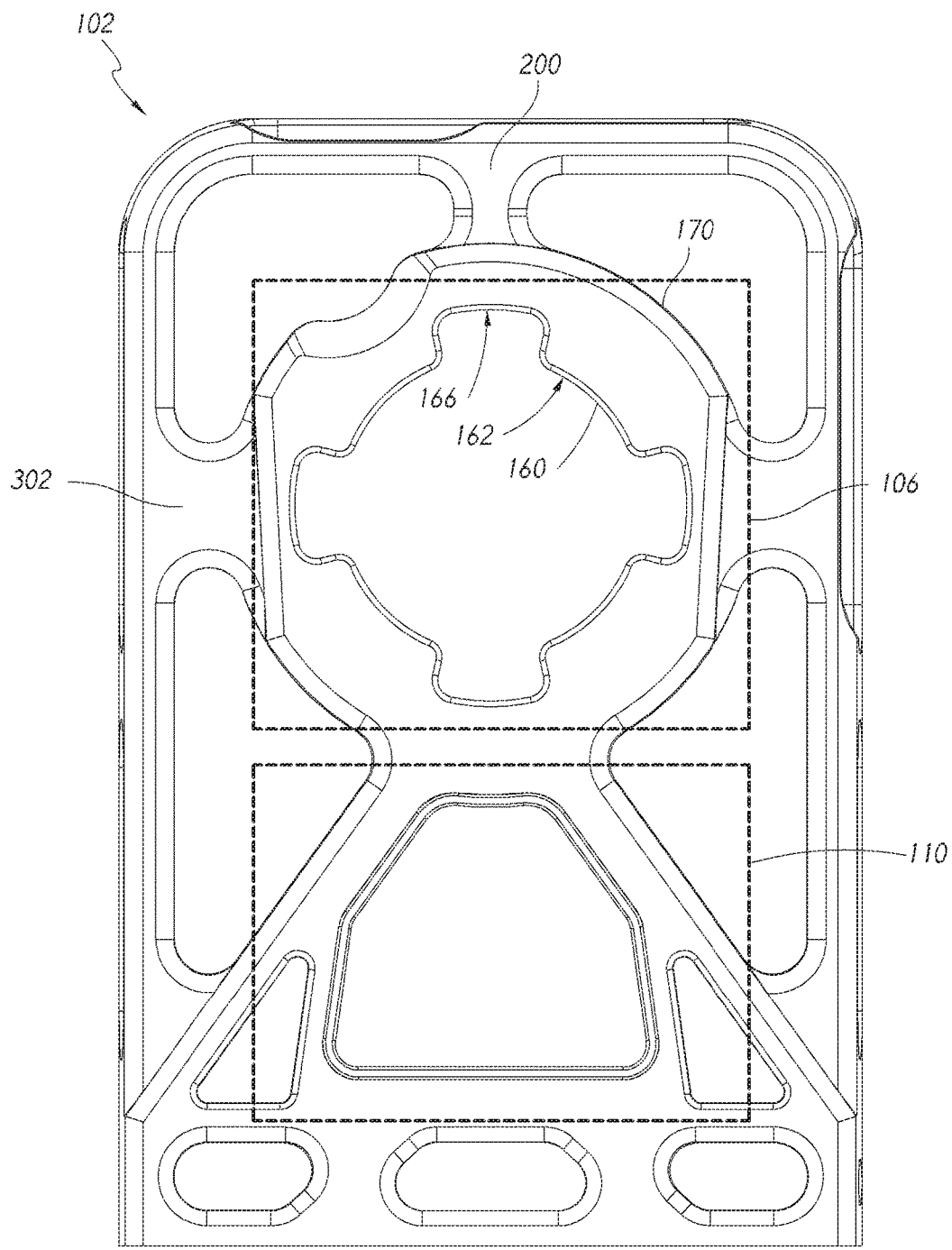
FIG. 3 is a view of the exterior rear surface of a shell of the protective system.

One embodiment of the exterior rear surface 302 of upper shell piece 102 is pictured in FIG. 3. The attachment region 106 as viewed from the rear of upper shell piece 102 is preferably disposed above or outwardly of the plane defined by at least a portion of the exterior rear surface 302, which can be a peripheral portion. In a preferred embodiment, the attachment region 106 has an opening 160 defined by a plurality of equally spaced radial lobes or tabs 162 designed to correspond with the tabs 912 of an interlocking member 902, more clearly viewed in FIGS. 9A and 9B. Mounting member 108 attaches to the exterior rear surface 302 side of the rear wall portion 200 of the upper shell piece 102 of protection system 100 preferably via an interlocking attachment. Once inserted, the tabs 912 of the interlocking member 902 may then rotate until further rotation is prevented by the interlocking surface 116, as seen in FIG. 2. After rotation, the tabs of interlocking member 902 will preferably be located adjacent to the interior side of interlocking surface 126 and against the edge of interlocking surface 116, forming an interlocking connection which preferably attaches mounting member 108 to the upper shell piece 102 of protection system 100.

Preferably, non-slip region 110 will also be disposed above the plane defined by exterior rear surface 302, as seen in FIG. 3. In the illustrated arrangement, when inserted, the non-slip member 112 will protrude outwardly as far as or further than any other rearward surface portion of the protection system 100 such that the non-slip member 112 will contact a surface upon which the protection system 100 is placed (assuming the surface is relatively flat or otherwise appropriately shaped) to accomplish a non-slip function. Therefore, when non-slip member 112 is disposed within non-slip region 110, the non-slip surface will extend beyond at least the plane of exterior rear surface 302 to grip a surface and provide a non-slip feature.

Figure 4:
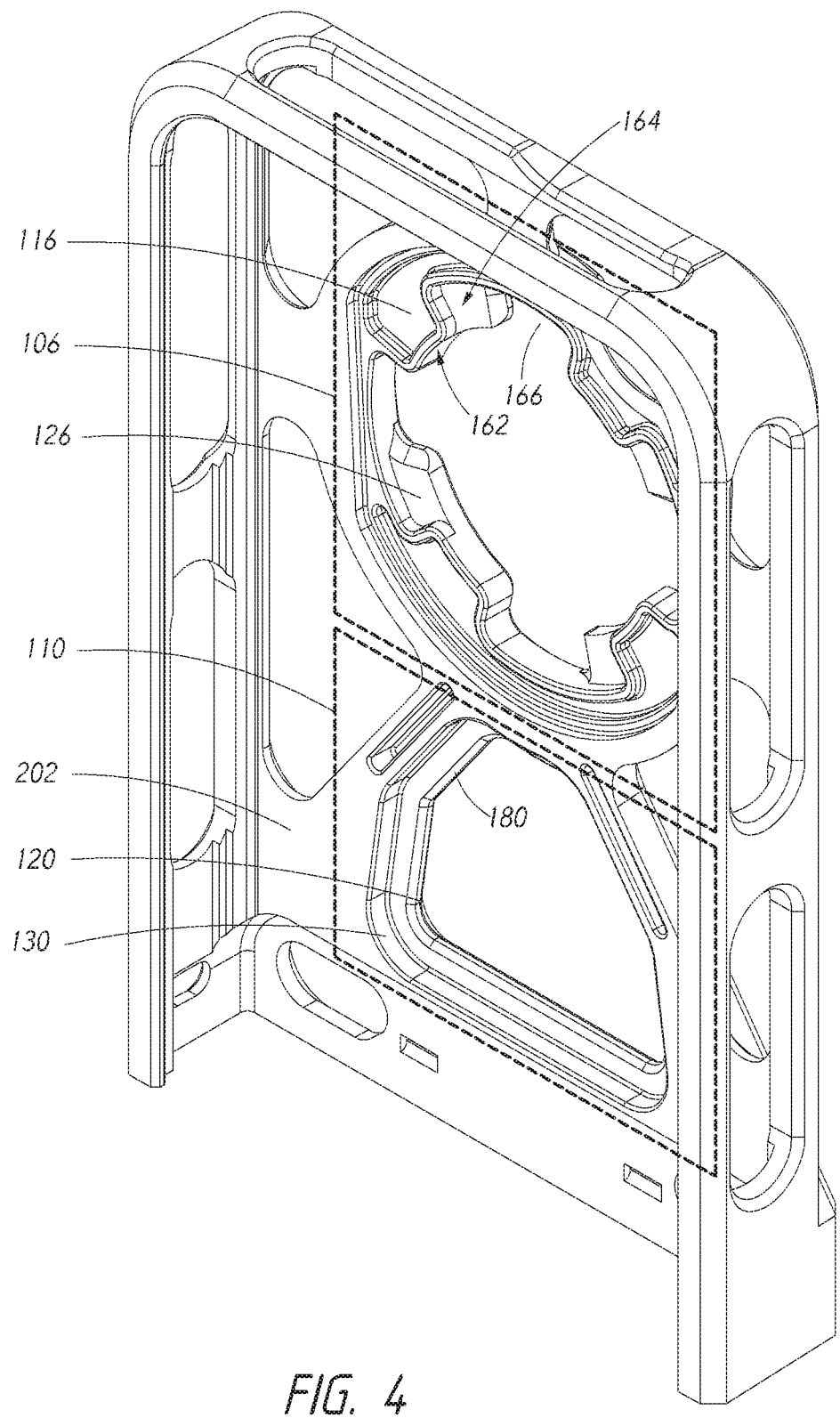
FIG. 4 is a perspective view of a shell of the protective system.

A perspective view of a preferred embodiment of upper shell piece 102 is pictured in FIG. 4. In this view, the different surfaces of attachment region 106 are more clearly visible. As described above with respect to FIG. 2, interlocking surface 116 is disposed towards the interior rear surface 202 of upper shell piece 102 relative to the interlocking surface 126, while interlocking surface 126 is disposed "below" the plane defined by interlocking surface 116, or towards the outer rear surface of upper shell piece 102. As is more clearly seen in FIG. 4, the interlocking surface 116 is circumferentially offset from the access opening 166 to provide the space 164 in which an interlocking member 902 may be inserted and then turned to form an attachment with upper shell piece 102. The rotation of the interlocking member 902 within attachment region 106 forms an interlocking connection with the upper shell piece 102. This interlocking connection is defined by the tabs 912 of the interlocking member 902 passing without obstruction into the defined areas (e.g., access openings 166) of attachment region 106 and then rotating against the interior surface of interlocking surface 126 until the tabs of interlocking member 902 are prevented from further rotation by encountering the interlocking surface 116. After rotation, the interior-facing surfaces of the interlocking member 902 and the interlocking surface 116 preferably will be substantially within the same plane.

FIG. 4 also more clearly depicts a preferred embodiment of the non-slip region 110 and openings 120 and 130. The smaller opening 120 is disposed within the larger opening 130. A small lip or ridge 180 is formed by the overlap of the two openings because the larger opening 130 is disposed towards the interior rear surface 202 of upper shell piece 102. Preferably, this lip or ridge 180 is disposed beneath the plane of the interior rear surface 202. The flexible non-slip member 112, such as that described in greater detail below with regard to FIGS. 8A-C, may be disposed within the non-slip region 110. An interior portion of the non-slip member 112 preferably has a greater diameter than the smaller opening 120 but also has a diameter sized to fit within larger opening 130. When inserted into the non-slip region 110, the larger diameter of the interior surface prevents the non-slip member 112 from falling out of the non-slip region 110. The smaller diameter of opening 120 will substantially prevent the non-slip member 112 from falling out of the non-slip region 110. The opening 120 defined by the non-slip region 110 will therefore allow a portion of the non-slip member 112 to contact a surface. The inclusion of the non-slip member 112 into protection system 100 provides non-slip properties and benefits to the protection system 100, such as preventing a handheld electronic device within the protection system from sliding off a smooth surface such as a desk or counter. The non-slip member 112 can include a peripheral recess 182 that is configured to receive the lip 180 to more securely hold the non-slip member 112 within the opening 120.

Figure 5:
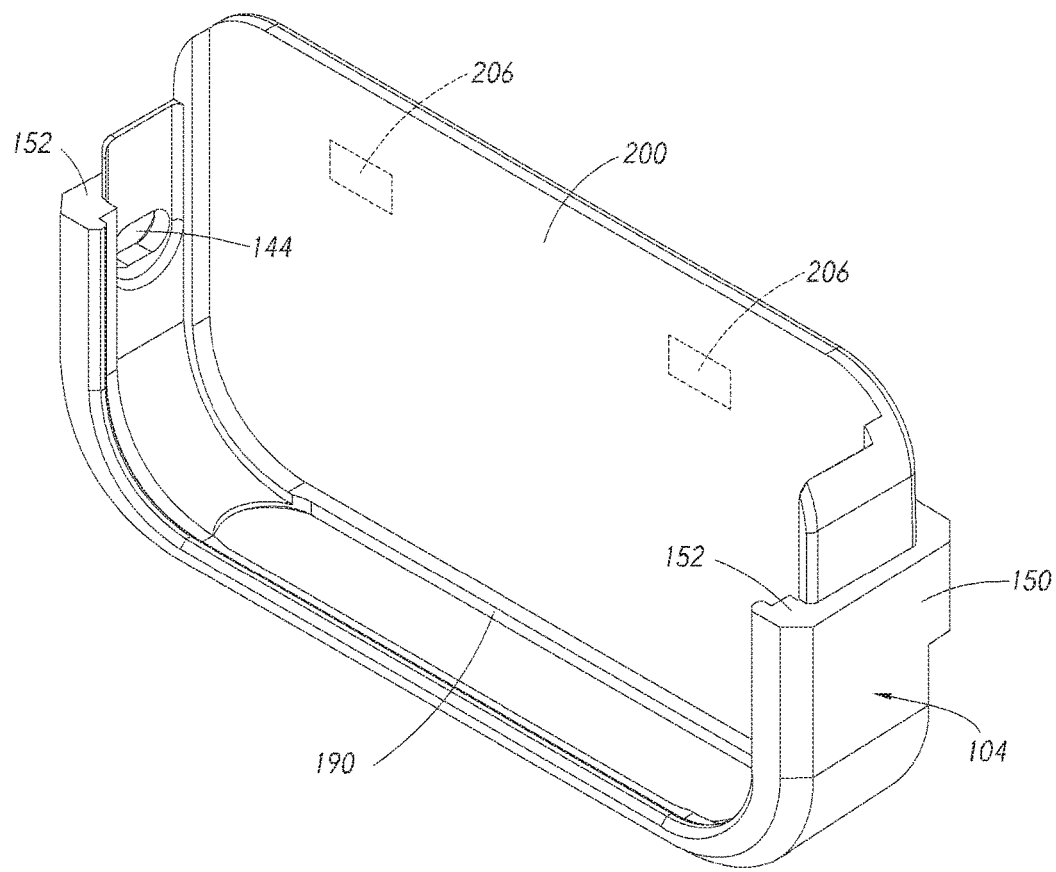
FIG. 5 is a perspective view of a lower shell of the protective system.

Lower shell piece 104 is shown in FIG. 5. In a preferred embodiment, lower shell piece 104 comprises an interior surface and side surfaces that surround the lower sides of a handheld electronic device to provide additional protection. Lower shell piece 104 preferably joins with upper shell piece 102 to provide protection around the sides and back of a handheld electronic device. The lower shell piece 104 can contain one or more openings to allow access to controls and ports on the handheld electronic device, such as a headphone jack or microphone jack. Furthermore, lower shell piece 104 also preferably contains an opening 190 to allow access to the charging area and/or microphone and speakers on the handheld electronic device such that the handheld electronic device does not need to be removed from protection system 102 in order to charge the device. FIG. 5 depicts only a preferred embodiment of the invention and other openings not shown may be included.

Figure 6:
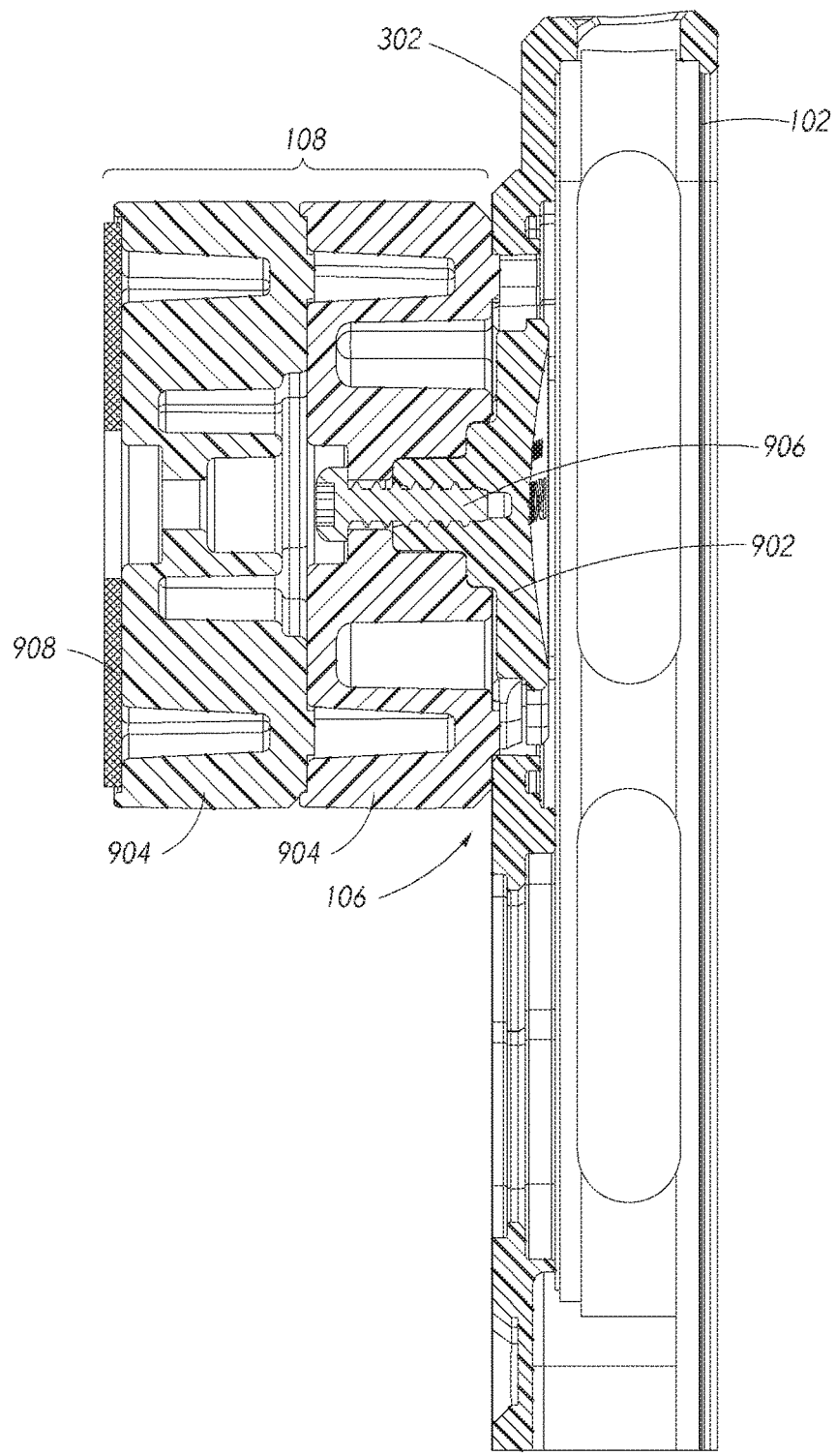
FIG. 6 is a cross sectional view of a shell of the protective system and a mounting member.

FIG. 6 illustrates a cross section of upper shell piece 102 and mounting member 108. In this figure, mounting member 108 is affixed to upper shell piece 102 in a preferred embodiment. As shown in this figure, the mounting member 108 is affixed to the rear surface of upper shell piece 102 within attachment region 106. Mounting member 108 extends out from the rear surface 302 of upper shell piece 102 such that protection system 100 may be mounted on a solid surface without being flush against the solid surface. The mounting member 108 depicted in the preferred embodiment is composed of two mounting pieces (e.g., mounting bases 904) joined together, along with an interlocking member 902. Mounting member 108 may be composed of greater or fewer mounting pieces joined together, depending on how far a user desires to mount the handheld electronic device from a solid surface. The interlocking member 902 of the mounting member 108 is joined to the interlocking member 902 preferably via a screw 906, but other forms of attachment may be used. The mounting bases 904 can be joined together by any suitable arrangement (e.g., snap-fit or mechanical fasteners) or the screw 906 could also hold the mounting bases 904 together in addition to securing the interlocking member 902 to the mounting base(s). If desired, an optional adhesive layer 908 can be provided on the rearward surface of the mounting member 108 to allow the mounting member 108 to be adhesively coupled to a desired surface.

Figure 7:
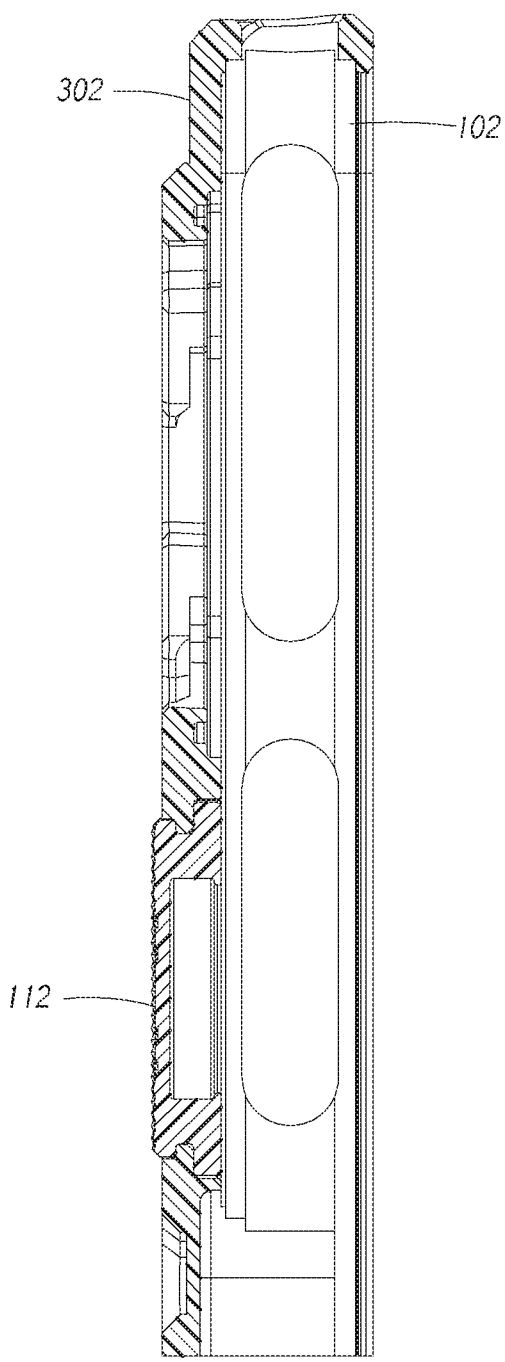
FIG. 7 is a cross sectional view of a shell of the protective system and a non-slip member.

A cross-sectional view of a preferred embodiment of protection system 100 containing non-slip member 112 is shown in FIG. 7. In the preferred embodiment shown, the non-slip surface of non-slip member 112 extends in a rearward direction at least as far and, preferably, beyond any other portion of exterior rear surface 302 of upper shell piece 102 (and lower shell piece 104) in order to provide a gripping surface to prevent a handheld electronic device from slipping on a solid surface. The non-slip member 112 also preferably contains a magnetic member, such as a rare-earth magnet 802, as further described below in regards to FIG. 8C. The magnet 802 is positioned or embedded within non-slip member 112 in order to provide a means of attaching protection system 100 to a magnetic surface without impacting the non-slip benefits provided by non-slip member 112 or scratching the surface.

Figure 8A:
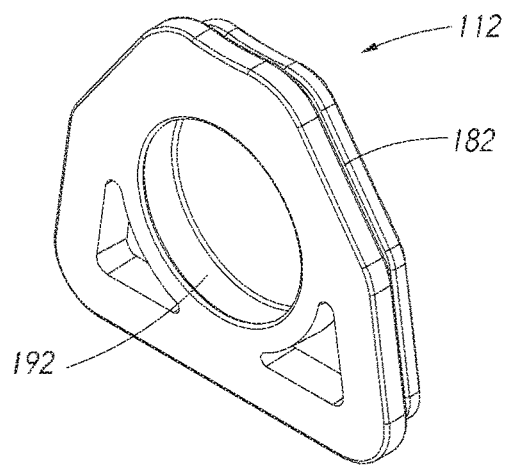
FIG. 8A is a perspective view of a non-slip member.
Figure 8B:
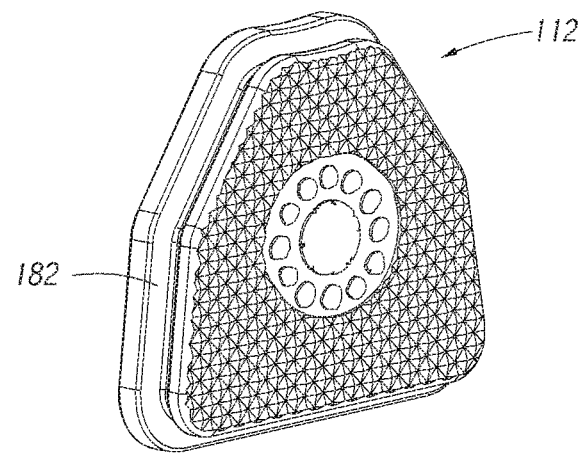
FIG. 8B is a second perspective view of a non-slip member.
Figure 8C:
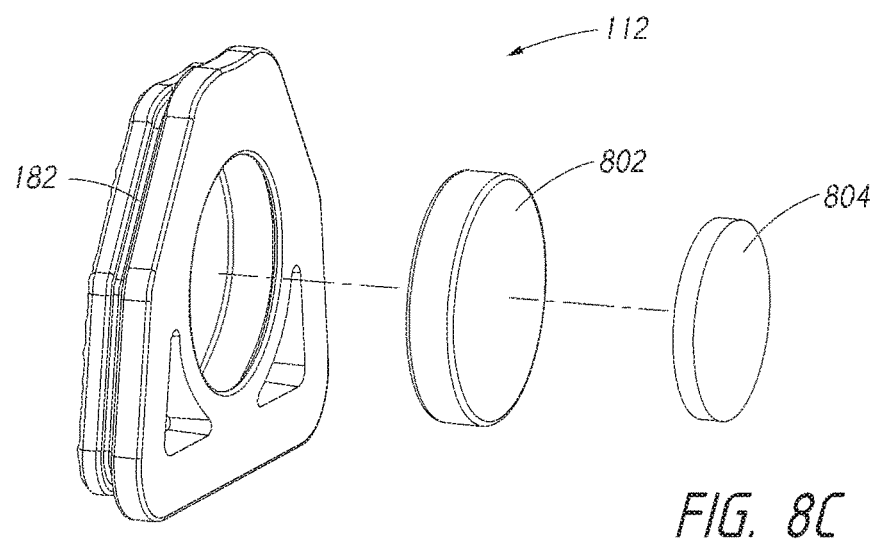
FIG. 8C is a perspective view of an exploded assembly of a non-slip member containing a rare-earth magnet and a magnet cover piece.

One preferred embodiment of a non-slip member 112 is shown in FIGS. 8A, 8B, and 8C. The non-slip member 112 is composed of a gripping outer surface shown in FIG. 8B and an interior-facing surface, as shown in FIG. 8A. This figure depicts a generally round or cylindrical indentation 192 into which a rare-earth magnet or other magnetic material may be placed without interfering with the non-slip benefits provided by non-slip member 112.

FIG. 8B depicts the exterior-facing surface of non-slip member 112. This figure more clearly illustrates the larger diameter of the interior-facing surface of non-slip member 112 versus the exterior-facing surface. These surfaces are separated by the groove or recess 182, which interacts with the smaller opening 120 in upper shell piece 102, as discussed above with regard to FIG. 4. As discussed above, the larger diameter of the interior surface prevents the non-slip member 112 from falling out of the non-slip region 110 because of interference between the larger diameter of the interior surface of non-slip member 112 and the smaller diameter of opening 120. The exterior surface of non-slip member 112 preferably has a ridged or roughened surface features in order to provide a better gripping surface and prevent the protection system from slipping on a solid surface. The exterior surface may also comprise different logos or other surface textures as desired.

The inclusion of rare-earth magnet 802 into non-slip member 112 is shown in FIG. 8C. This figure illustrates that the rare-earth magnet is preferably inserted into the indentation 192 on the interior surface of non-slip member 112. An optional cover piece 804 preferably made of the same material as non-slip member 112 can be placed on the interior-facing side of the rare-earth magnet 802 to provide a buffer between the magnet and the handheld electronic device within protection system 100.

Figure 9A:
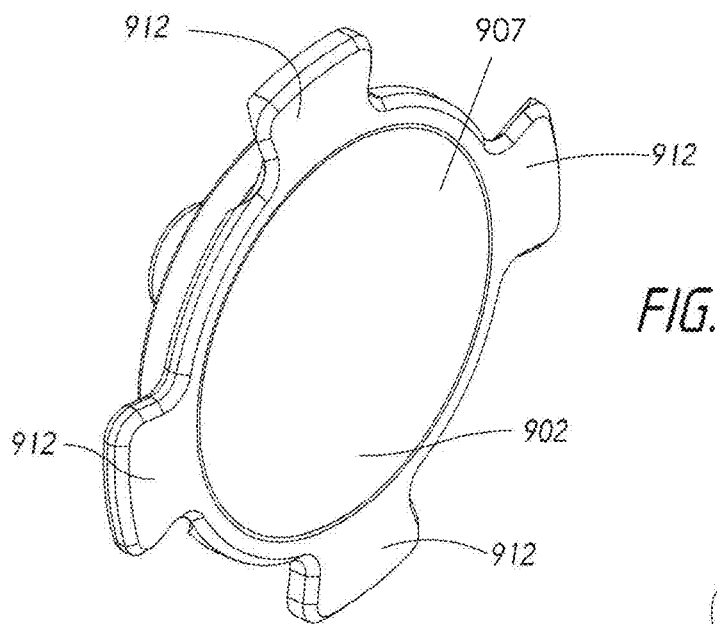
FIG. 9A is a perspective view of a first side of an interlocking member.
Figure 9B:
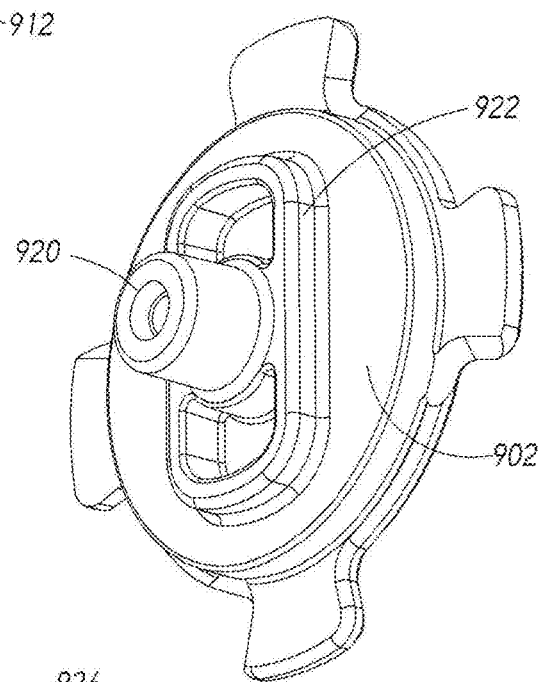
FIG. 9B is a second perspective view of a second side of the interlocking member.
Figure 9C:
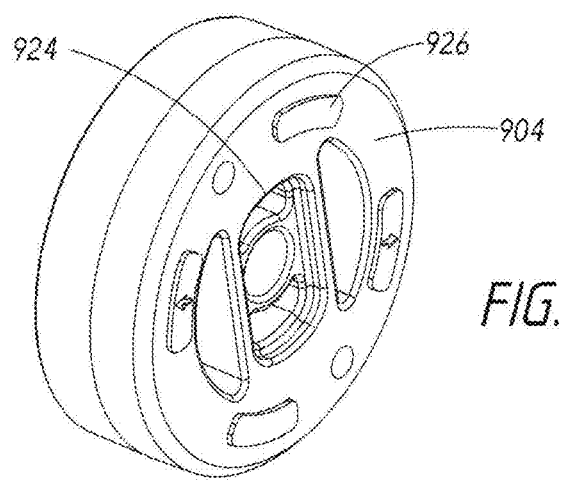
FIG. 9C is a perspective view of a mounting base.

FIGS. 9A-C illustrate one embodiment of the different components of mounting member 108. As shown in FIG. 9A, interlocking member 902 comprises a plate portion 907 having a plurality of engaging members 912 located preferably at 90 degree intervals around the circumference of the interlocking member 902. This surface of interlocking member 902 may also display a logo or other information.

The connecting surface of interlocking member 902 is shown in FIG. 9B. Interlocking member 902 is attached to at least one mounting base 904, shown in FIG. 9C, preferably via a screw 906 (FIG. 6) received within a boss 920 of the interlocking member 902. However, other means of attachment may be used to connect the interlocking member 902 to at least one mounting base 904. Preferably, the interlocking member 902 and the mounting base 904 include complementary interference features that locate the interlocking member 902 and mounting base 904 relative to one another in a rotational direction and inhibit or prevent the relative rotation of the interlocking member 902 and the mounting base 904. In the illustrated arrangement, the interference features include a projection 922 and a recess 924, which are generally rectangular in shape but could be other suitable shapes, as well. The projection 922 is positioned on the interlocking member 902 and the recess 924 is located on the mounting base 904; however, these positions could be reversed. The projection 922 and recess 924 locate the interlocking member 902 such that the engaging members or tabs 912 are located in a desirable position relative to corresponding projections or feet 926 on the surface of the mounting base 904 that faces the interlocking member 902. The feet 926 are circumferentially offset from the tabs 912 and contact the tabs 162 of the upper shell piece 102 to provide a stop surface to the rotation of the upper shell piece 102 at a properly aligned position relative to the mounting member 108 when assembled thereto. The illustrated arrangement includes the same number of feet 926 as tabs 912; however, a lesser number of feet 926 could also be used. The circumferential dimension of the feet 926 can be configured such that the feet 926 contact an edge of the access opening 166 to provide some amount of resistance to rotation of the upper shell piece 102 in a directing tending to remove the upper shell piece 102 from the mounting member 108 thereby inhibiting unintentional disconnection of the upper shell piece 102 from the mounting member 108. If desired, active locks could also be provided to prevent unintentional disconnection of the upper shell piece 102 from the mounting member 108.

Figure 10:
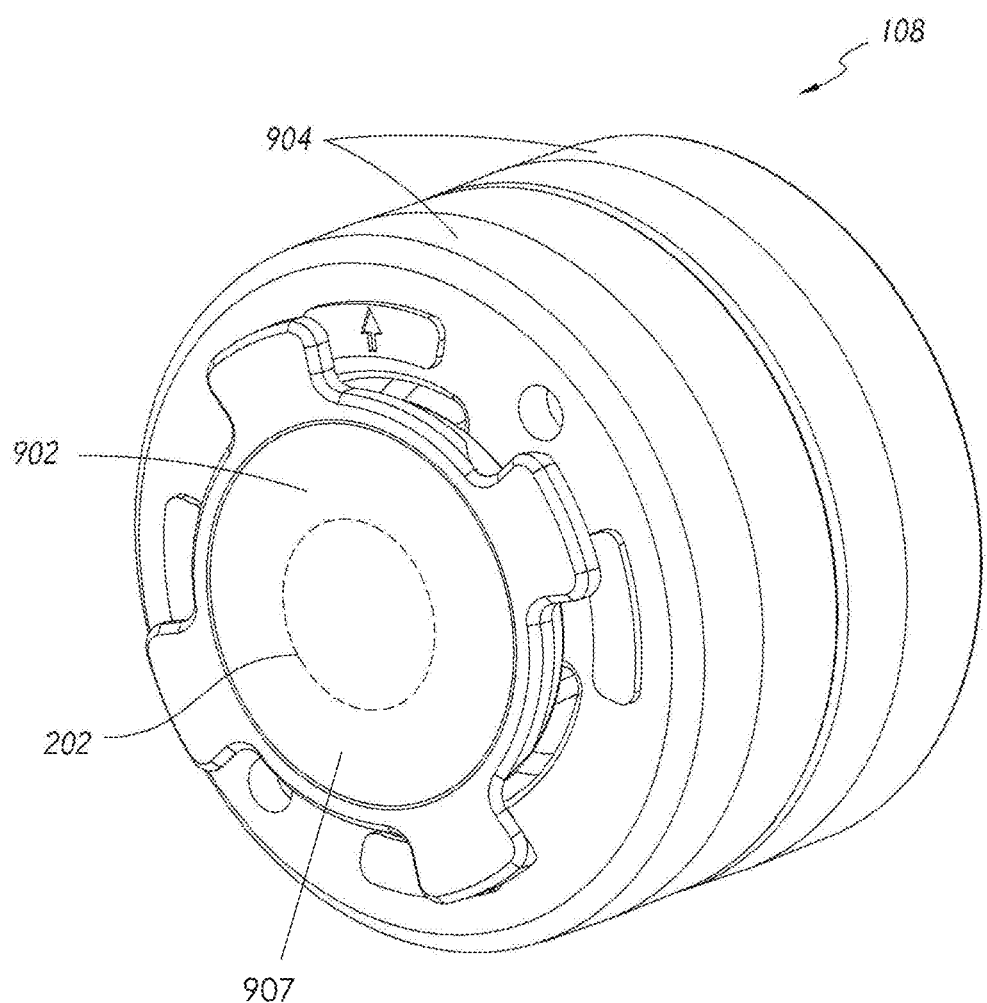
FIG. 10 is a perspective view of an assembled mounting member.

FIG. 10 depicts one embodiment of an assembled mounting member 108 preferably comprised of two mounting bases 904 and an interlocking member 902. In other embodiments, mounting member 108 may be further comprised of additional mounting bases 904 or a spacer, not shown, between the mounting bases.

The side of interlocking member 902 shown in FIGS. 9A and 10 is inserted into the attachment region 106 formed by interlocking surfaces 116 and 126 by aligning the tabs or engaging members 912 of interlocking member 902 with the access openings 166 in the attachment region 106, as seen in FIG. 2. Preferably rotating or twisting mounting member 108 in a clockwise direction results in the tabs or engaging members 912 of interlocking member 902 rotating behind or inside of interlocking surface 126 until further rotational movement is stopped by interaction with interlocking surface 116. This rotational movement of interlocking member 902 results in the rigid yet removable attachment of mounting member 108 to protection system 100. Similarly, rotation or twisting of interlocking member 902 in the opposite direction allows for removal of mounting member 108.

Attachment or detachment of protection system 100 from the mounting member 108 occurs either through rotation of mounting member 108 (resulting in rotation of interlocking member 902) or through rotation of the handheld electronic device within the protection system 100, as when the mounting member 108 is securely attached to another surface.

With reference to FIG. 11, one accessory that may be used with protection system 100 includes a bike mount 1100. The illustrated bike mount 1100 may be mounted on or as a replacement of the top cap of a bicycle steering stem arrangement, preferably using screw 1120. In particular, the bike mount piece 1110 preferably replaces the top cap of a standard bicycle steering headset system and rests on the upper surface of the front fork steerer tube or steering stem spacer. As is known, the top cap is utilized to adjust a preload of the bearings in the bicycle steering headset system. Once the steering stem is clamped to the steerer tube, the top cap is no longer providing any function. The present bike mount 1100 can replace the standard top cap. Preferably, the mount piece 1110 is adjustable (e.g., rotatable) with respect to the bike mount attachment piece 1130. In particular, in the illustrated arrangement, the bike mount attachment piece 1130 includes an arm portion that extends from the mount piece 1110. The arm portion is rotatably coupled to the mount piece 1110 by a pivot assembly. The bike mount attachment piece 1130 may attach to the upper shell piece 102 using the interlocking mounting arrangement discussed above.

Mounting System and Elongated Mount

Figure 12A:
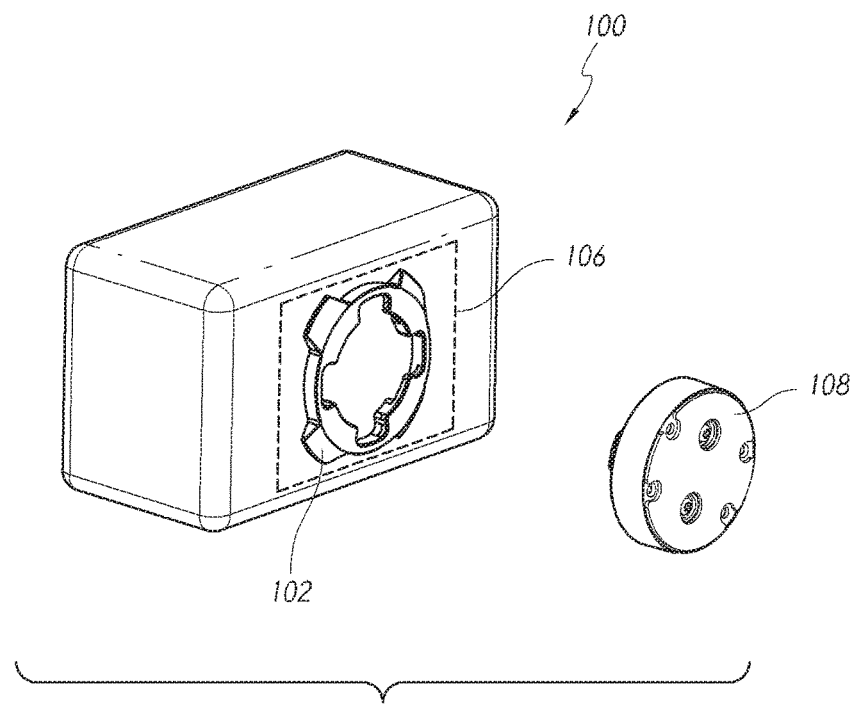
FIG. 12A illustrates a rear perspective view of an exploded mounting assembly for an electronic device or accessory configured with a locking member and a mounting member according to a preferred embodiment of the invention.

A preferred embodiment comprises a mounting assembly for an electronic device or an accessory for an electronic device. FIG. 12A illustrates a rear perspective view of an exploded mounting assembly for an accessory or handheld electronic device. The assembly 6100 is configured with a locking portion 102 and a mounting member or mounting portion 108 similar to the locking portion 102 and mounting portion 108 shown in FIGS. 1-3. The locking member 102 may be integrated into the body of the handheld electronic device or accessory as shown in FIG. 12A, or it may adhere to the body of the handheld electronic device or accessory with adhesive or other attachment means, such as a case or housing that partially or completely encloses the device or accessory.

The mounting assembly preferably includes a locking member 102 defining an attachment region 106, as shown in FIGS. 12A and B for attaching mounting member 108. The attachment region 106 contains an engagement structure that allows the electronic device to be releasably attached the mounting member 108. A preferred engagement structure is described with respect to FIGS. 9A-C and 10 as discussed above. As shown in FIG. 12 and FIGS. 9A-C, mounting member 108 may be comprised of an interlocking member 902 and at least one mounting base 904.

Figure 12B:
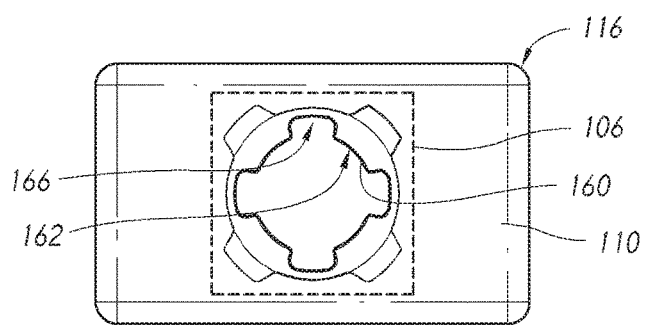
FIG. 12B illustrates a rear view of the accessory configured with a locking member.

As more clearly illustrated in FIGS. 12B and D, the illustrated attachment region 106 defines an opening 160 in the mounting assembly. As described above with respect to FIG. 2, attachment region 106 is configured to allow attachment of mounting member 108 through an interlocking attachment that selectively secures the electronic device or accessory 216 to the mounting member 108 and inhibits or prevents removal in at least one direction. In some embodiments, a first centering magnet (not shown) may be included within the attachment region 106. A second centering magnet (not shown) may be included within the mounting member 108. Magnetic attraction between the first and second centering magnets may help align the mounting member 108 and the attachment region 106 to improve successful attachment of the electronic device or accessory for an electronic device to the mounting member 108.

One embodiment of the mounting surface of an electronic device or accessory is pictured in FIG. 12B. The attachment region 106 as viewed from the rear of the electronic device or accessory is preferably disposed above or outwardly of the plane defined by at least a portion of the exterior rear surface 6110 of the electronic device or accessory 216, as shown most clearly in FIG. 12C, which can be a peripheral portion. In a preferred embodiment, the attachment region 106 has an opening 160 defined by a plurality of equally spaced radial lobes or tabs 162 designed to correspond with the tabs 912 of an interlocking member 902, more clearly viewed in FIGS. 9A and 9B. Mounting member 108 attaches to the exterior rear surface 6110 side of the electronic device or accessory preferably via an interlocking attachment. Once inserted, the tabs 912 of the interlocking member 902 may then rotate until further rotation is prevented by the interlocking surface 116, as seen in FIG. 13. After rotation, the tabs of interlocking member 902 will preferably be located adjacent to the interior side of interlocking surface 126 and against the edge of interlocking surface 116, forming an interlocking connection which preferably attaches mounting member 108 to the locking member 102 of mounting system 6100.

Attachment or detachment of the electronic device or accessory 216 from the mounting member 108 occurs either through rotation of mounting member 108 (resulting in rotation of interlocking member 902) or through rotation of the handheld electronic device or accessory, as when the mounting member 108 is securely attached to another surface.

With reference to FIGS. 13A-C, one mounting accessory that may be used with any of the mounting or protective systems disclosed herein includes an elongated mounting member 600. The elongated mounting member 600 may be mounted to a tripod or other device to support an electronic device (e.g., GPS device, phone, media player and tablet computer) or accessory (e.g., speakers, microphones, cameras, lights, sensors).

Figure 12C:
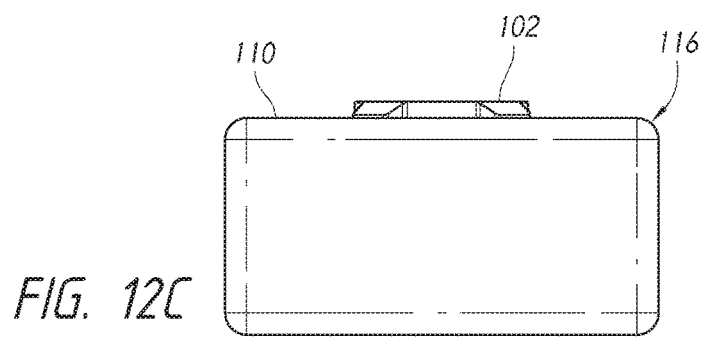
FIG. 12C illustrates a top view of the accessory configured with a locking member.
Figure 12D:
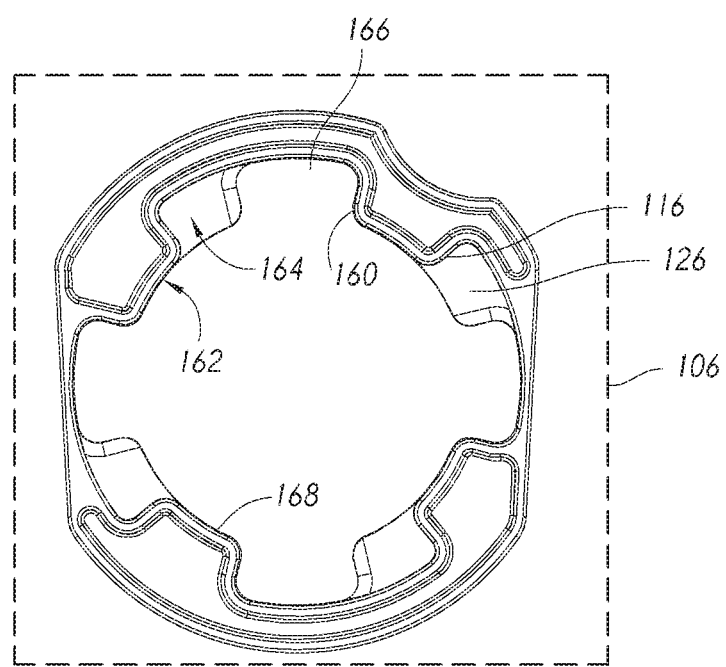
FIG. 12D illustrates a view of the interior of the locking member shown in FIGS. 12A and B.

As discussed above with respect to the mounting member 108, elongated mounting member 600 has an interlocking member 602. Interlocking member 602 comprises a plate portion 607 having a plurality of engaging members 612 located preferably at 90 degree intervals around the circumference of the interlocking member 602. This surface of interlocking member 602 may also display a logo or other information. Elongated mounting member 600 also has an arm portion 640. The arm portion 640 extends from the interlocking member 602 and provides an additional surface which may be gripped by a user or attached to a tripod or stand, such as via an engagement structure (e.g., a threaded cavity 642). In one arrangement, the arm portion 640 of the elongated mounting member 600 has a length that is at least about one-half the length in at least one direction of the electronic device or accessory for which it is intended for use. Accordingly, in at least one embodiment, a free or distal end of the arm portion 640 extends beyond an edge of the device or accessory when the interlocking member 602 is engaged with a corresponding lock member or arrangement (not shown) located at or near a center of the device or accessory to permit the free end to be coupled to another device, such as a tripod or stand, for example. In some arrangements, the free end of the arm portion 640 extends beyond an edge of the device or accessory in at least two directions (e.g., portrait and landscape). In other arrangements, the arm portion 640 can be spaced away from an adjacent surface of the device or accessory a sufficient distance such that the arm portion 640 need not extend beyond an edge of the device or accessory to accommodate a tripod, stand or other device. The elongated mounting member 600 may also be used in place of the mounting member or portion 108 with the mounting assembly for an electronic device or an accessory for an electronic device, as shown in FIGS. 12A-C and as described above.

Case, Mount System and Kickstand

A preferred embodiment of the present invention comprises a shell for rigidly securing and protecting a handheld electronic device. In a preferred embodiment, the shell may be in multiple pieces for ease of assembly around a handheld electronic device. The upper piece of the shell preferably provides an attachment region for a removable mounting member that can attach to various solid surfaces, such as but not limited to a desk, vehicle dashboard, mirror, etc. The shell preferably also incorporates an anti-slip insert in which a magnet is disposed, allowing for magnetic adherence to surfaces without interfering with the anti-slip benefit provided by the anti-slip insert. The shell preferably is formed using a material that is generally rigid and lightweight, such as but not limited to an injection molded polycarbonate or other suitable plastic material(s). Preferably, the shell comprises rigid sidewalls that surround an entirety or portions of the peripheral edges of the device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera) or to reduce the weight of the shell. A rubber bumper may enclose the sides of the shell to provide additional protection in case the handheld electronic device is dropped. The rubber bumper may also provide a more secure gripping surface for the electronic device. The rubber bumper preferably allows access to the various input and output ports of the device.

Figure 14A:
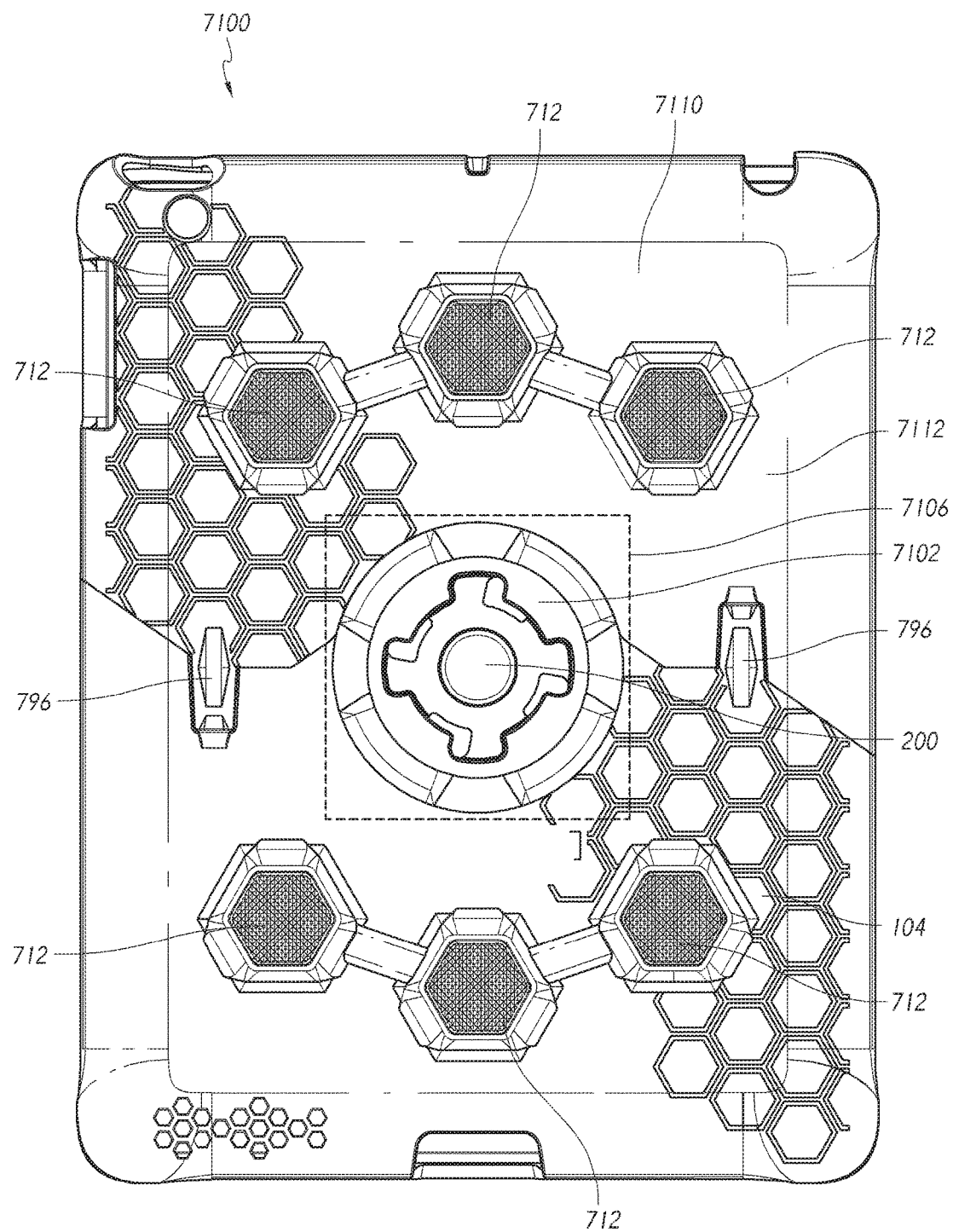
FIG. 14A illustrates a rear view of a protective case system for an electronic device, according to a preferred embodiment of the invention.

A preferred embodiment of the present invention comprises a protective case for an electronic device, as shown in FIG. 14A. The protection system 7100 is configured with a locking member. The locking member may be part of an attachment region 106 on the rear of the protection system 7100. The locking member may be integrated into the rear of the protection system 7100. Protection system 7100 includes a body or shell that, in the illustrated arrangement, is comprised of an upper shell piece 7112 and lower shell piece 7104. Lower shell piece 7104 is designed, in one embodiment, to fit together with upper shell piece 7112 preferably using an interlocking or tab/slot attachment, such as tabs 796. However, in other arrangements, the upper shell piece 7112 and lower shell piece 7104 could be secured together with other arrangements (e.g., mechanical fasteners, such as screws) or could be portions of a unitary or single-piece shell in which installation of the electronic device is accomplished through another method, such as by deformation of the side walls or other portions of the shell to pass over the electronic device. Thus, references to the upper shell piece 7112 or lower shell piece 7104 herein are also intended to refer to the entire shell of an integrated or unitary shell arrangement.

Upper shell piece 7112 preferably includes an attachment region 7106, similar to the attachment region 106 shown in FIGS. 1-3, for attaching a mounting member. The attachment region 106 contains an engagement structure that allows the upper shell piece 7112 and, thus, the protection system 7100 to be releasably attached to the mounting member. A preferred engagement structure is described in greater detail above with reference to FIGS. 9A-C and 10.

Figure 14B:
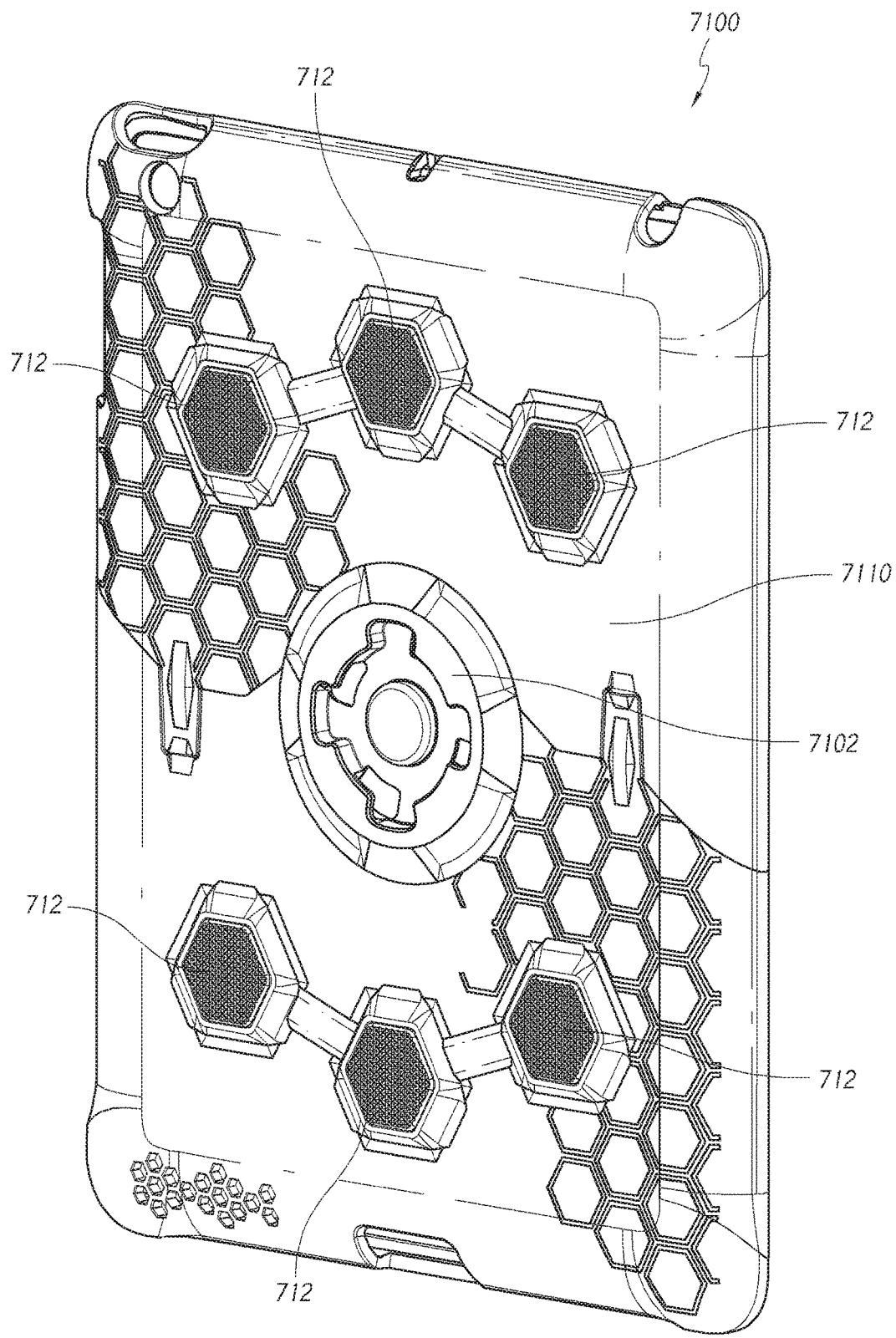
FIG. 14B illustrates a rear perspective view of the protective case system for an electronic device shown in FIG. 14A.
Figure 18A:
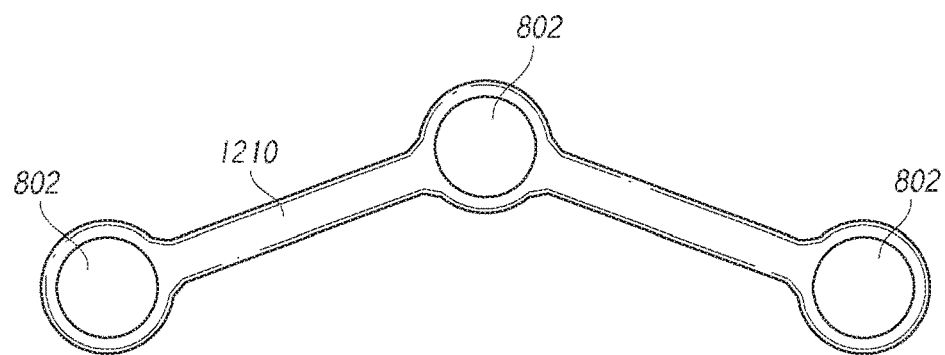
FIG. 18A shows one side of a magnet connecting member for use with the protection system shown in FIGS. 14A and B.
Figure 18B:
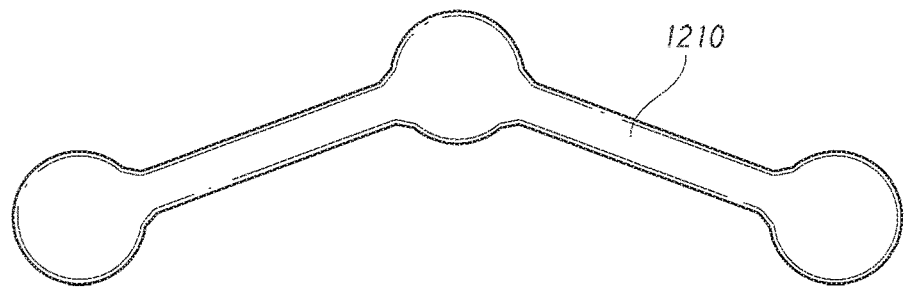
FIG. 18B shows the opposite side of a magnet connecting member for use with the protection system shown in FIGS. 14A and B.
Figure 19A:
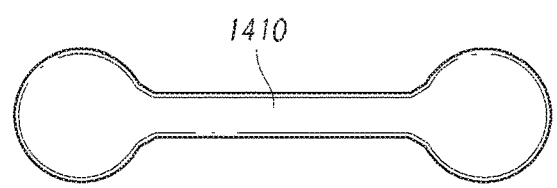
FIG. 19A shows one side of a magnet connecting member for use with the protection system shown in FIGS. 15A and B.
Figure 19B:
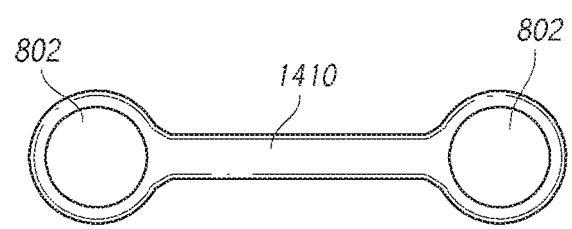
FIG. 19B shows the opposite side of a magnet connecting member for use with the protection system shown in FIGS. 15A and B.

Upper shell piece 7112 also preferably includes at least one non-slip region, which includes a non-slip arrangement that enhances frictional engagement of protection system 7100 with a surface on which the protection system 7100 may be placed. In the illustrated arrangement, the 6 non-slip regions incorporate an opening or cavity in the protection system 7100 (e.g., the upper shell piece 7112) into which non-slip members 712 may be inserted. As shown, the non-slip members 712 are formed in a hexagonal shape, however, the non-slip members may be formed in any shape. The non-slip members 712 may also preferably comprise a rare earth magnet in order to removably attach the handheld electronic device contained within protection system 7100 to a magnetic surface. The magnets may be linked together in sets of two or three in order to fit the pattern of the non-slip members 712 arranged on the rear surface of the protection system 7100. For example, in the embodiments shown in FIGS. 14A-B, three rare earth magnets may be linked by a semi-rigid plastic or other means in a linked configuration such as that outlined on the rear surface of the protection system 7100 and shown in FIGS. 18A-B. In other embodiments, such as that shown in FIGS. 15A and B, the rare earth magnets may be linked as a pair with a rigid or semi-rigid plastic or other means connecting the magnets such that they fit within the non-slip regions 712 shown on the rear surface of the protection system 7100, as shown in FIGS. 19A-B. As shown in FIGS. 18A and B, the magnets 802 may be embedded within a semi-rigid elastomeric or rubber connection member 1210. The connection member 1410 may cover one side of the magnets 802 such that a single magnet surface is exposed, as shown in FIG. 18A. The connection member 1210 maintains the spacing between the magnets 802 to provide easier installation of the magnets within the non-slip members 712 on the rear surface of the protection system.

Figure 15A:
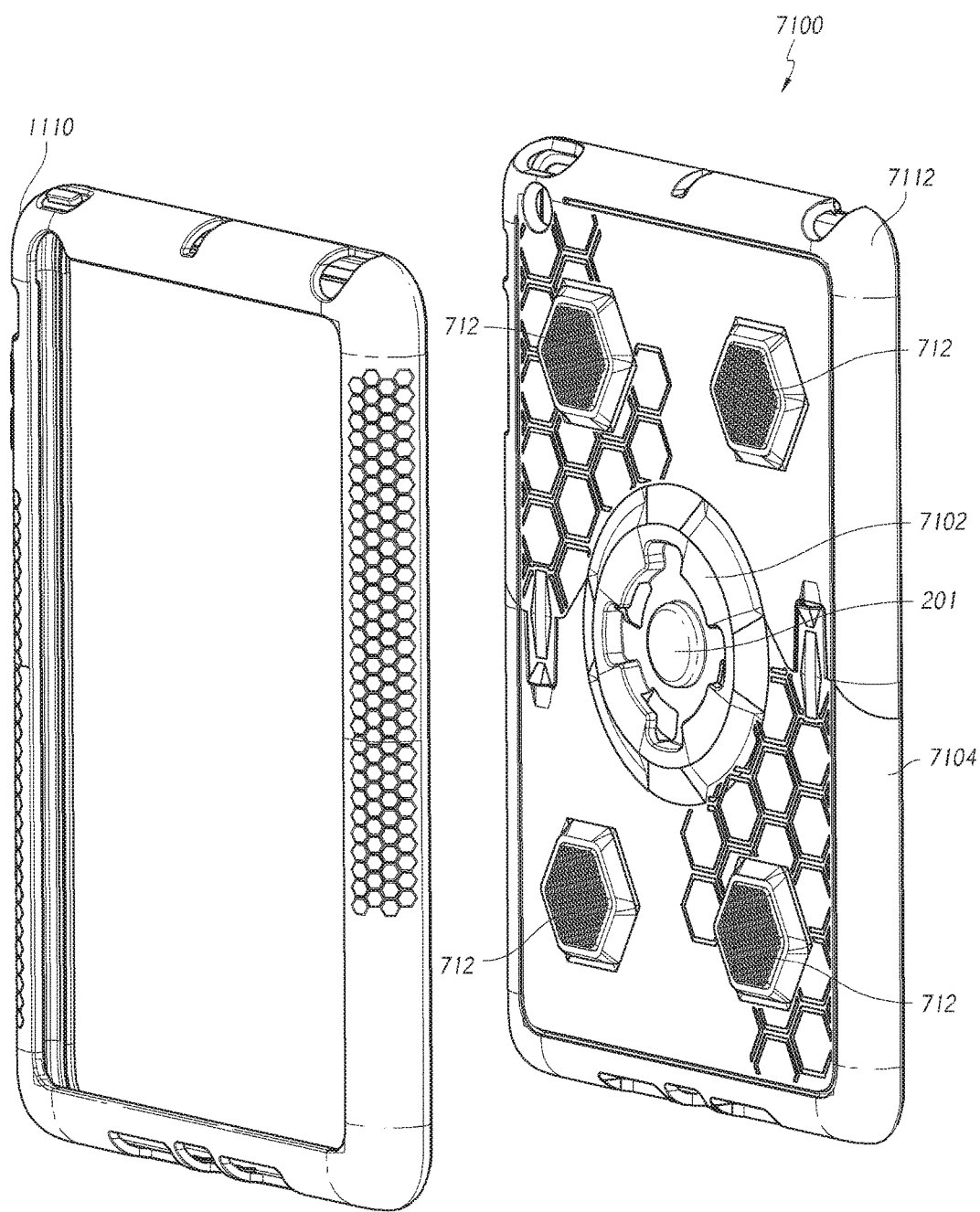
FIG. 15A illustrates a rear perspective view of an exploded assembly for a second embodiment of a protective case and mount system for an electronic device.

FIG. 15A illustrates an exploded assembly view of another embodiment of a protection system 7100. A rubber bumper 1110 may enclose the edges of the upper shell 7112 and lower shell 7104 pieces that form the rigid shell case. The rigid shell case can be used with or without the rubber bumper 1110. In some embodiments, the rubber bumper 1110 covers certain opening(s) in the shell 7112, 7104 (e.g., access openings for buttons) and includes opening(s) that align with other opening(s) of the shell 7112, 7104 (e.g., access openings for power, audio or accessory ports). As shown, there may be a different number of non-slip members 712 or the non-slip members may be in a different configuration. As shown in FIGS. 19A and B, the magnets 802 may be embedded within a semi-rigid elastomeric or rubber connection member 1410. FIG. 19B shows the underside of the magnetic connection member 1410. FIG. 19A shows the opposite side of the magnetic connection member 1410 shown in FIG. 19B. The connection member 1410 may cover one side of the magnets 802 such that a single magnet surface is exposed. The connection member 1410 maintains the spacing between the magnets 802 to provide easier installation of the magnets within the non-slip members 712 on the rear surface of the protection system 7100.

Figure 15B:
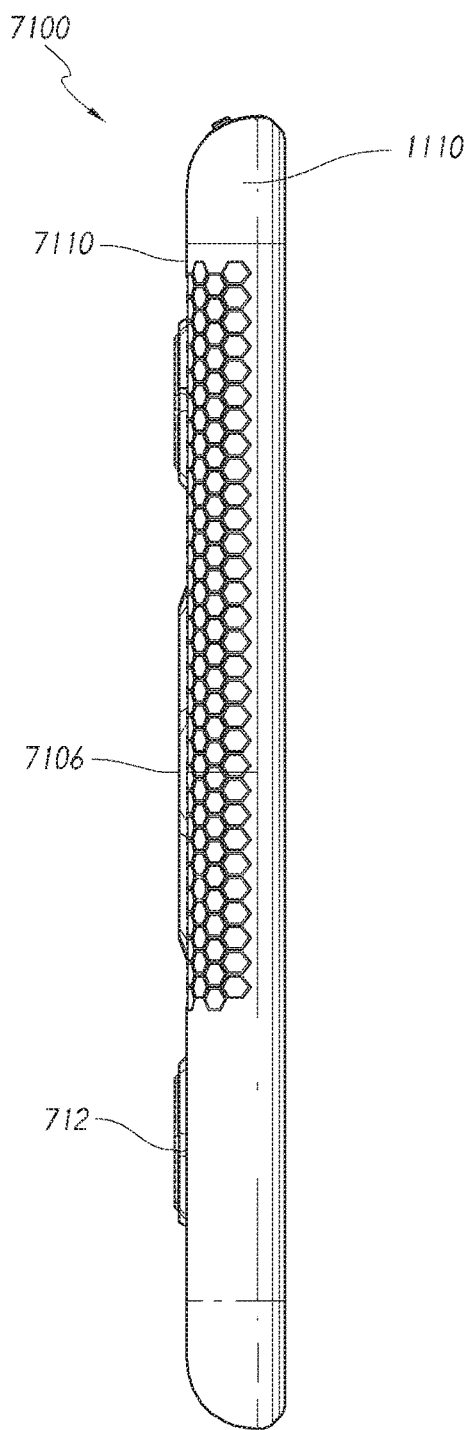
FIG. 15B illustrates a side view of the protective case and mount system for an electronic device shown in FIG. 15A.

FIG. 15B illustrates a side view of the protection system 7100 with the rubber bumper 1110 enclosing the sides of the rigid case. The rubber bumper 1110 may have indentations to provide a gripping surface. The non-slip members 712 may extend outside the plane defined by the exterior rear surface 7110 of the protection system 7100 such that the non-slip members 712 are the first surface to encounter a support surface such as a desk or table when the electronic device is placed on the support surface with the rear surface facing the desk or table. The locking member within the attachment region 7106 may also extend outside the plane defined by the exterior rear surface 7110 of the protection system 7100.

An interlocking member, such as the interlocking member 902 shown in FIGS. 9A-C, may be inserted into the attachment region 7106 as discussed above with respect to the attachment region 106 shown in FIGS. 2 and 9A-C.

Attachment or detachment of the protection system 7100 from the mounting member 108 occurs either through rotation of mounting member 108 (resulting in rotation of interlocking member 902) or through rotation of the handheld electronic device, as when the mounting member 108 is securely attached to another surface. To facilitate alignment of the mounting member 108 and the locking member 7102, a magnetic alignment arrangement can be provided that urges the mounting member 108 and the locking member 7102 into substantial alignment once the two portions are brought within the general vicinity of one another. Such an arrangement is advantageous when the electronic device (and, thus, the shell 7112, 7104) is relatively large in length and or height dimensions relative to the size of the mounting member 108, which can inhibit visual alignment of the mounting member 108 and the locking member 7102. In one arrangement, the locking member 7102 incorporates a magnet or magnetically attractive member 201 (e.g., FIG. 15A) and the mounting member 108 incorporates a complementary magnet or magnetically attractive member 202 (FIG. 10) preferably enclosed within the respective structures. With such an arrangement, when the locking member 7102 of the electronic device/shell is positioned near the mounting member 108, the magnet or magnetically attractive member 201, 202 urge the locking member 102 and mounting member 108 into alignment such that the components can be interlocked via relative rotational movement, as described above.

With reference to FIGS. 16A-G, one mounting accessory that may be used with the protection system 7100 includes an elongated support or display member 600, which can be referred to as a kickstand. The elongated support member 600 may be used to support the electronic device in a portrait or landscape mode on a table or other surface.

As discussed above with respect to the mounting member 108, elongated support member 600 has a similar interlocking member. The elongated support member 600 may engage with the attachment region 7106 of the protection system 7100 such that the electronic device is supported in either a portrait position or a landscape position. The elongated support member 600 is shown engaging with a protection system for a handheld electronic device such as a tablet computer. However, the elongated support member 600 may be used with protection systems for a variety of other electronic devices, such as large and small tablet computers or mobile phones.

Figure 17A:
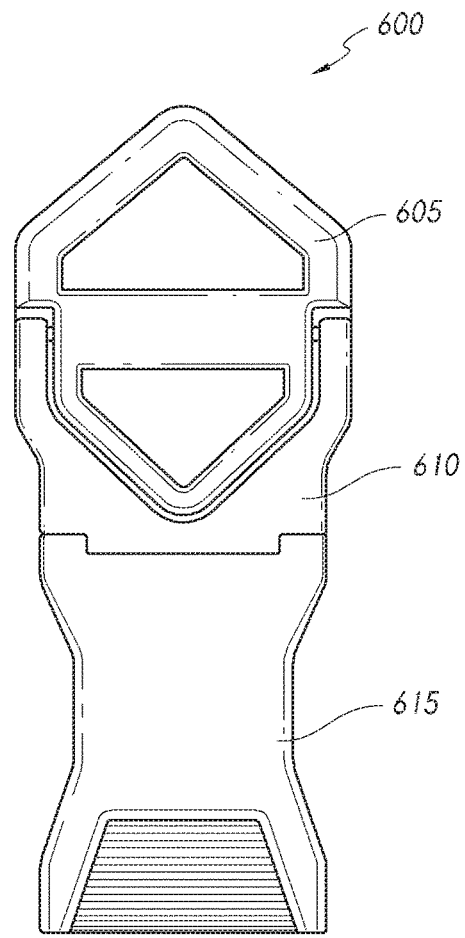
FIG. 17A illustrates a front or outward facing view of a non-interlocking side of an elongated support member.
Figure 17B:
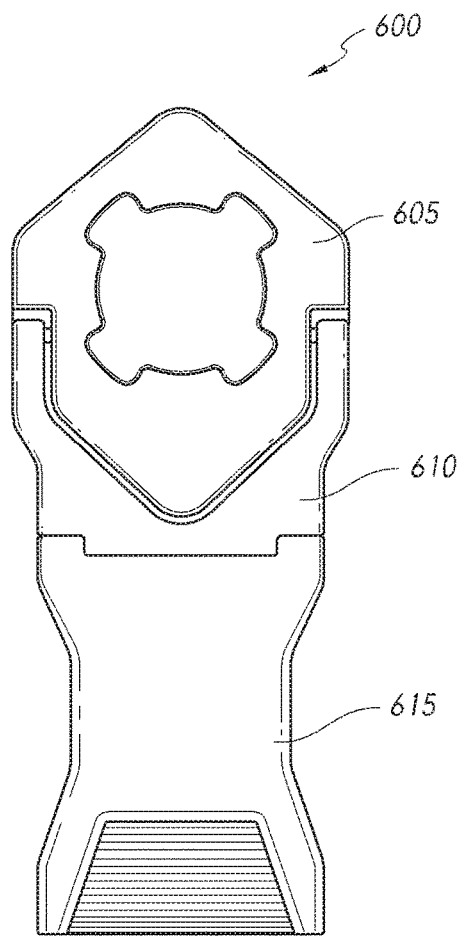
FIG. 17B illustrates a rear or inward facing view of a non-interlocking side of an elongated support member.

As shown in FIGS. 17A and B, the elongated support member 600 may be comprised of several hinged members. FIG. 17A illustrates the outward facing or non-interlocking side of the elongated support member 600. FIG. 17B illustrates the inward facing or interlocking side of the elongated support member 600. A first engaging member 605 has an interlocking member that engages with the attachment region 7106 described above with reference to attachment region 106 shown in FIG. 2. Attached to the first engaging member 605 may be a second hinged member 610. A third hinged member 615 may be attached to the second hinged member 610 to provide additional length and flexibility to the elongated display member.

The second hinged member 610 may be secured to the first engaging member 605 with two hinged connections on either side of the first engaging member 605 that allow the second hinged member 610 to rotate with respect to the first engaging member 605. The first engaging member 605 may be manufactured such that the second hinged member 610 can rotate only to one side of the first engaging member 605 without allowing 360 degree rotation of the second hinged member 610 about the first engaging member 605. Similarly, the third hinged member 615 may be secured to the second hinged member 610 with two hinged connections that allow the third hinged member 615 to rotate with respect to the second hinged member 610. Preferably, the second hinged member 610 is securable in at least two positions relative to the first engaging member 605 and the third hinged member 615 is securable in at least two positions relative to the second hinged member 610. Manipulation of the various hinged components results in several display configurations, shown in FIGS. 16B-G.

Figure 16A:
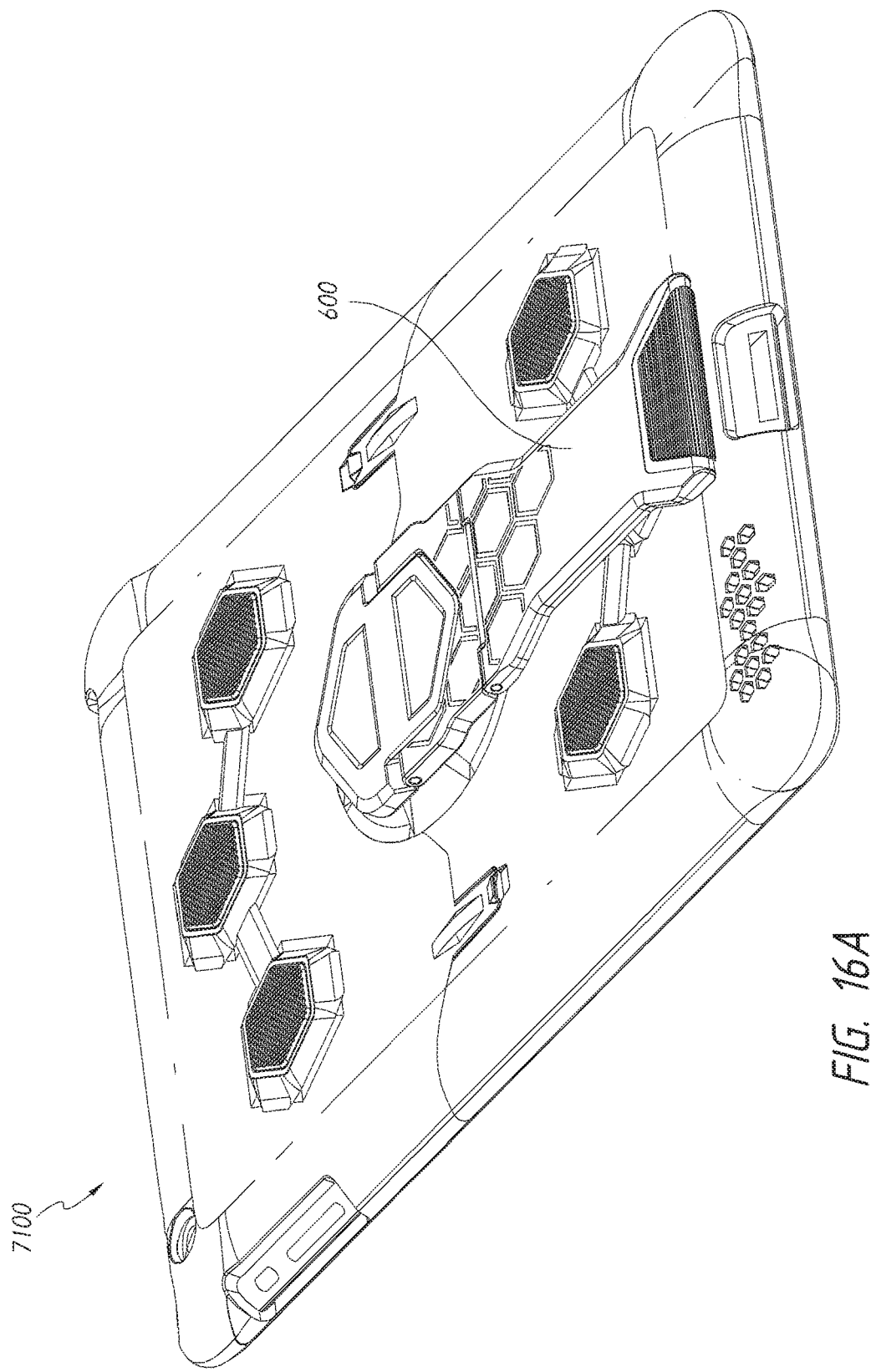
FIG. 16A illustrates the protective case of FIG. 14A configured with a stowable display member shown in the stowed position.

FIG. 16A illustrates the elongated support member 600 in a stowed position. In the stowed position, the elongated support member 600 may fold flat against the rear surface of the protection system 7100. In the illustrated embodiment, the elongated support member 600 is shown engaged with the protection system 7100 in a portrait display mode. However, in other embodiments, the elongated support member 600 may be rotated 90 degrees in either direction to engage and lock with the protection system 7100 in a landscape display mode.

Figure 16B:
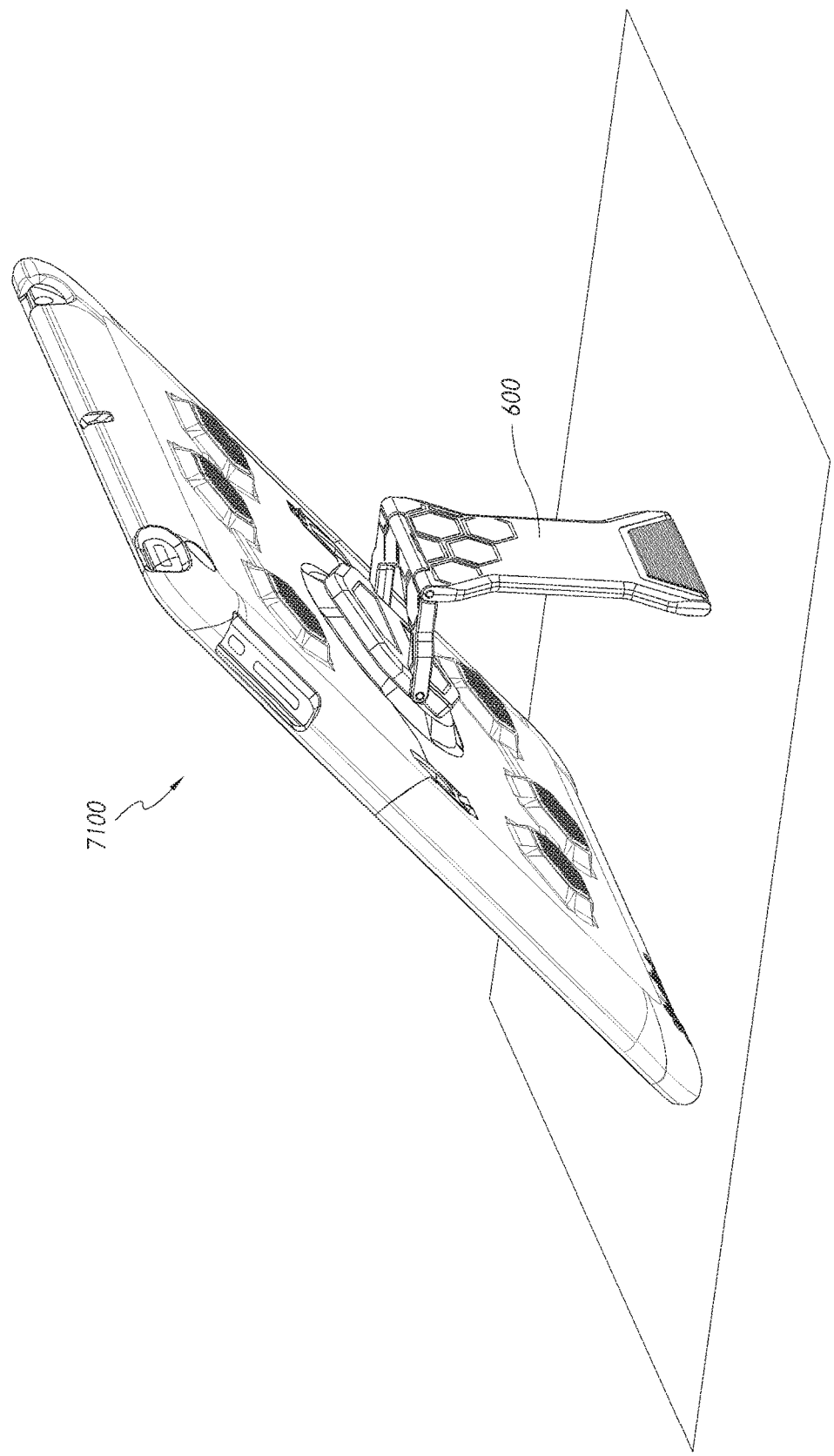
FIG. 16B illustrates a side perspective view of the protective case of FIG. 16A with the display member configured to display the electronic device in portrait mode.
Figure 16C:
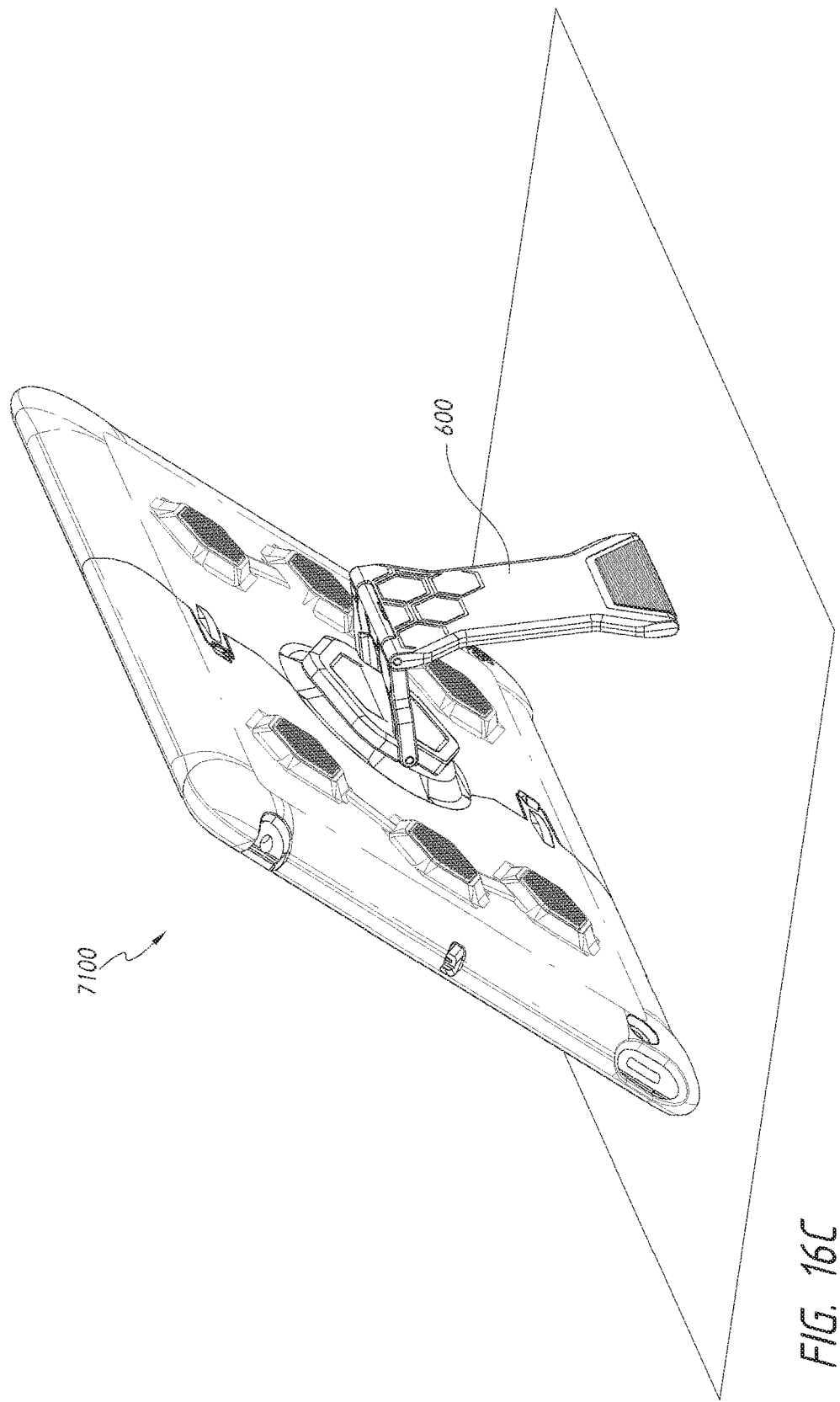
FIG. 16C illustrates a side perspective view of the protective case of FIG. 16A with the display member configured to display the electronic device in landscape mode.
Figure 16E:
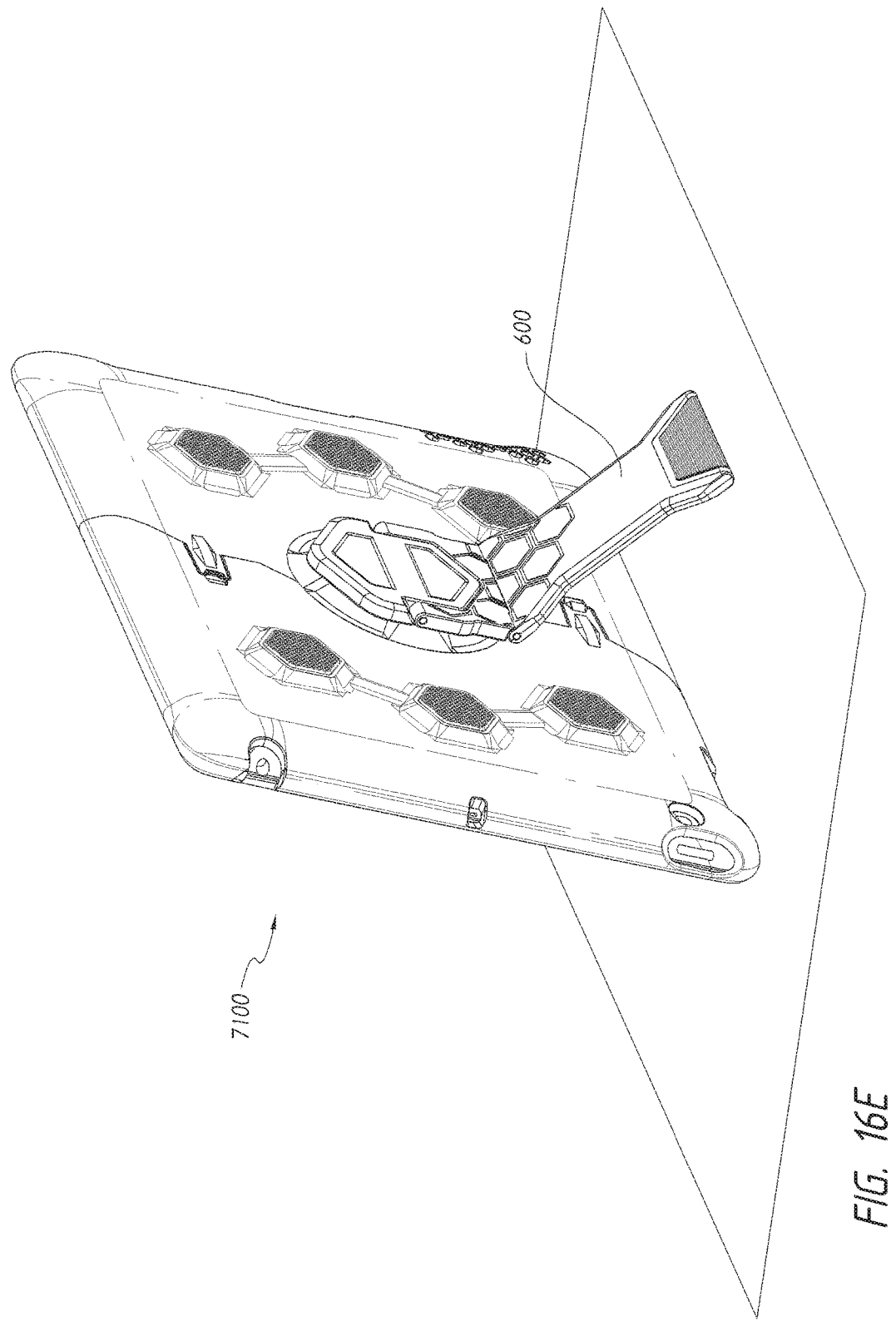
FIG. 16E illustrates a side perspective view of the protective case of FIG. 16A with the display member in a second configuration to display the electronic device in landscape mode.

FIGS. 16B and C illustrate an electronic device encased within protection system 7100 with the elongated support member 600 used to support the electronic device in a first, "browse" or back, position. The electronic device may be displayed in either portrait mode or landscape mode, depending on how the elongated support member 600 is interlocked within the attachment region on the rear surface of the protection system 7100. FIGS. 16B and C illustrate that elongated support member 600 is positioned by manipulating the hinged pieces as discussed above.

FIGS. 16D and E illustrate an electronic device encased within protection system 7100. The elongated support member 600 is used to support the electronic device in a second, "view" or middle, position. The electronic device may be displayed in either portrait mode or landscape mode, depending on how the elongated support member 600 is interlocked within the attachment region on the rear surface of the protection system 7100. As discussed above, FIGS. 16D and E illustrate that elongated support member 600 may be positioned in a variety of positions by manipulating the hinged pieces as discussed above.

FIGS. 16F and G illustrate an electronic device displayed in a typing position. The elongated support member 600 is used to support the protection system 7100 in a reclined or "typing" position for ease of typing on a keyboard displayed on a touchscreen of the electronic device. The electronic device may be displayed in either portrait mode or landscape mode, depending on how the elongated support member 600 is interlocked within the attachment region on the rear surface of the protection system 7100. As discussed above, FIGS. 16F and G illustrate that elongated support member 600 may be positioned in a variety of positions by manipulating the hinged pieces or sections as discussed above.

Mount System and Case with Removable Bumper

A preferred embodiment of the present invention comprises a shell for rigidly securing and protecting a handheld electronic device. In a preferred embodiment, the shell may be in multiple pieces for ease of assembly around a handheld electronic device. The upper piece of the shell preferably provides an attachment region for a removable mounting member that can attach to various solid surfaces, such as but not limited to a desk, vehicle dashboard, mirror, etc. The shell preferably also incorporates an anti-slip insert in which a magnet is disposed, allowing for magnetic adherence to surfaces without interfering with the anti-slip benefit provided by the anti-slip insert. The shell preferably is formed using a material that is generally rigid and lightweight, such as but not limited to an injection molded polycarbonate or other suitable plastic material(s). Preferably, the shell comprises rigid sidewalls that surround an entirety or portions of the peripheral edges of the device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera) or to reduce the weight of the shell. A rubber bumper may enclose the sides of the shell to provide additional protection in case the handheld electronic device is dropped. The rubber bumper may also provide a more secure gripping surface for the electronic device. The rubber bumper preferably allows access to the various controls and/or input and output ports of the device. The rubber bumper preferably is made of a relatively soft and/or stretchable material, such as rubber or a rubber-like material. The rubber bumper preferably is softer than the material used for the shell, which can be a relatively rigid material. Thus, benefits of both a soft case and a rigid case can be provided without the drawbacks associated with a completely soft or rigid case. Thus use of the term "rubber" bumper is for convenience and is not limited to rubber material (but covers rubber, rubber-like and other suitable soft materials) unless otherwise indicated.

Figure 20A:
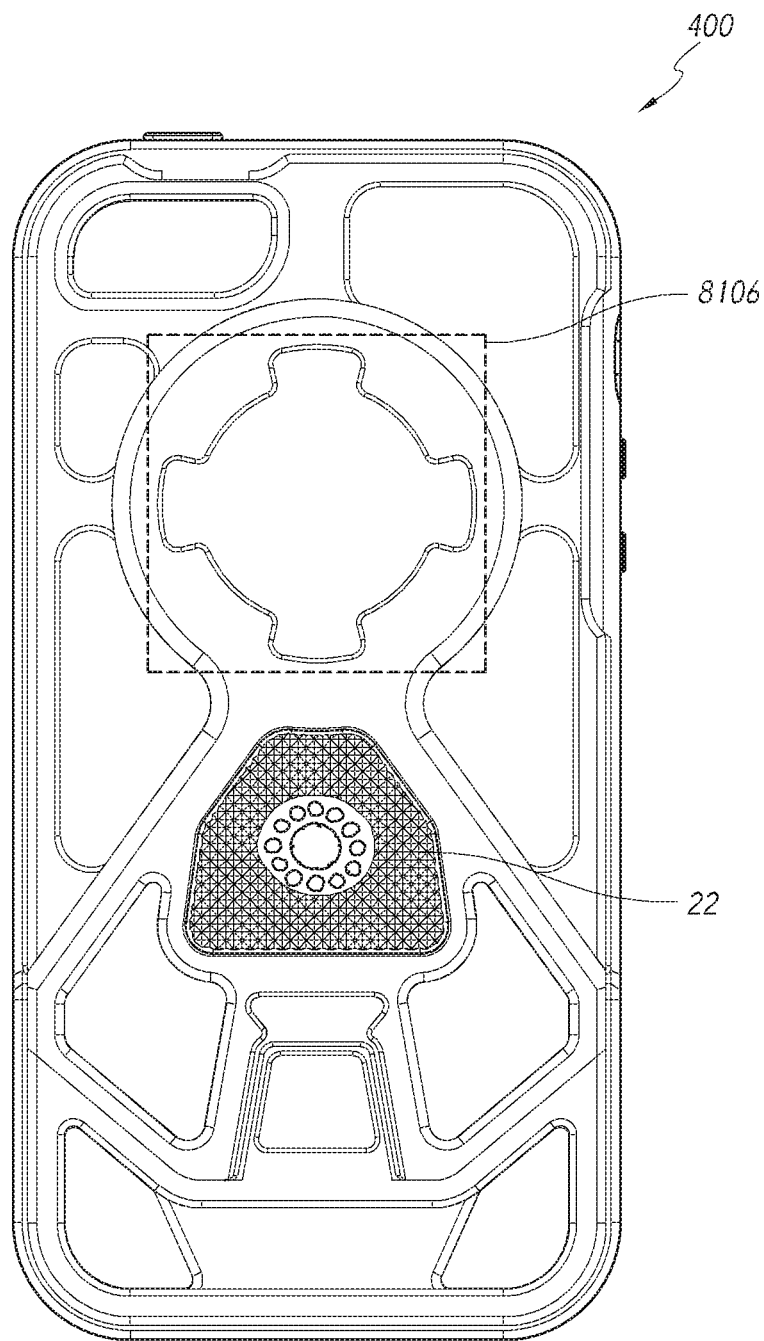
FIG. 20A illustrates a rear view of a second embodiment of a protection system for a handheld electronic device.
Figure 20B:
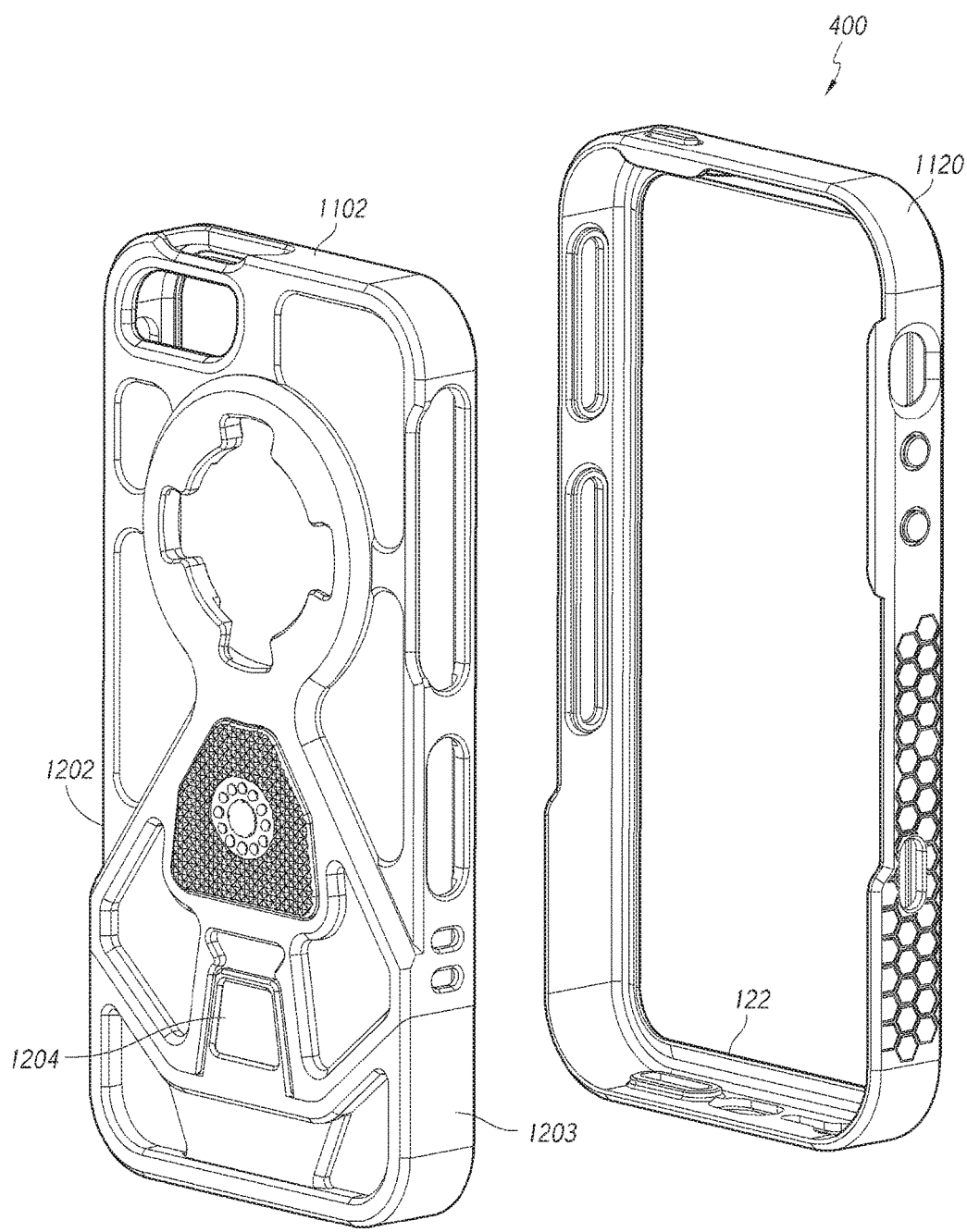
FIG. 20B illustrates an exploded rear perspective view of the protection system shown in FIG. 20A that incorporates an elastomer or rubber bumper.
Figure 20C:
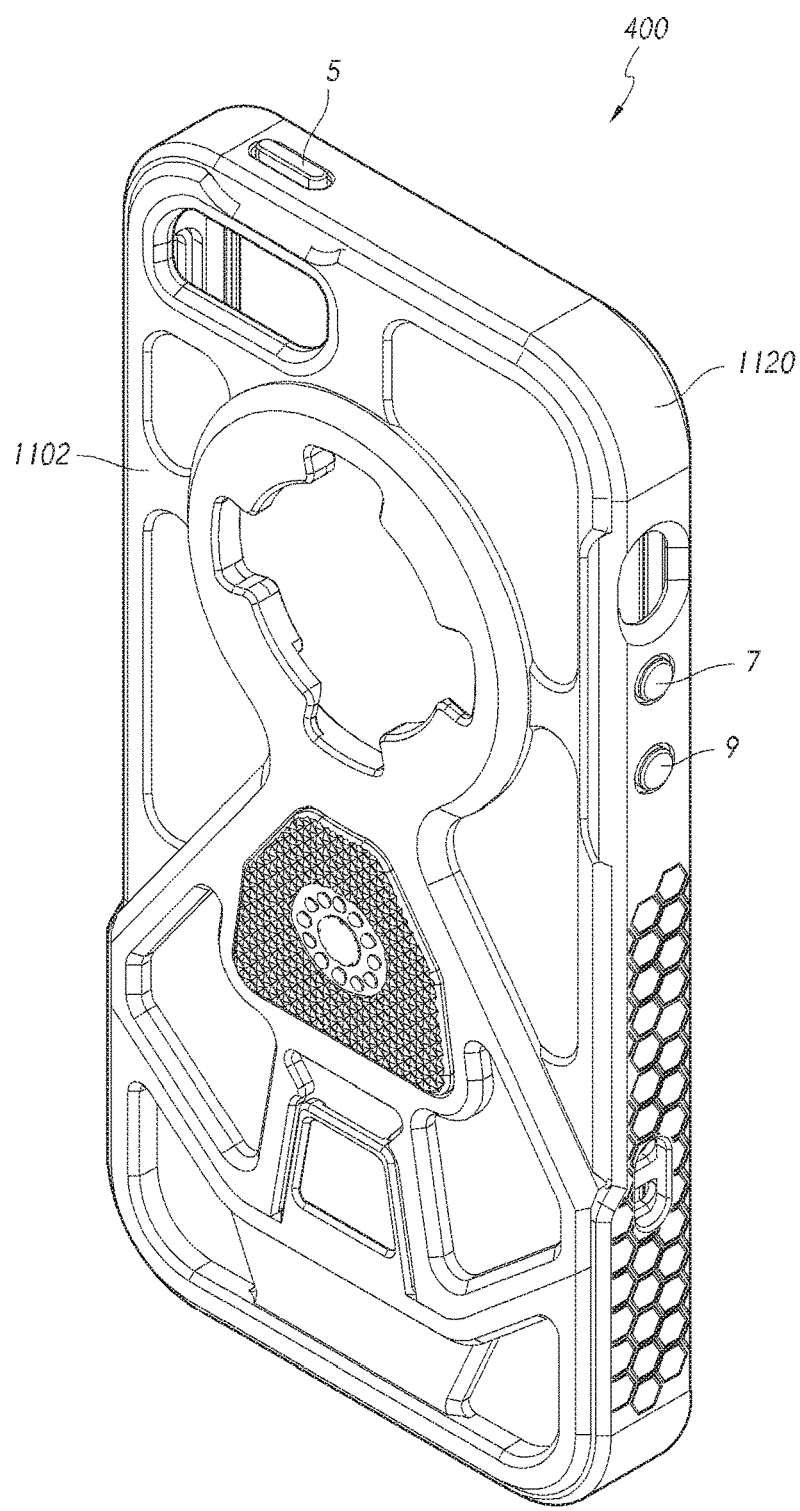
FIG. 20C is a perspective view of the protection system of FIG. 20A.
Figure 20D:
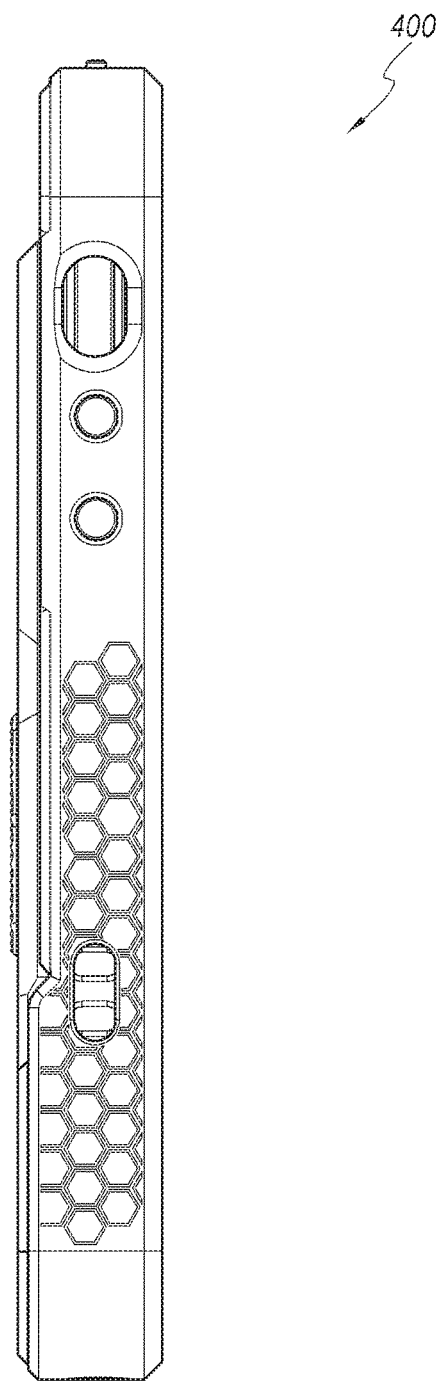
FIG. 20D is a side view of the protection system of FIG. 20A.

The rear surface of a preferred embodiment of a protection system 400 for a small handheld device, such as a mobile phone, is shown in FIGS. 20A-C. This embodiment illustrates a rigid shell member 1102 that may be made of one or more pieces to provide ease of installation on an electronic device. In the embodiment shown in FIGS. 20A and B, the rigid shell member 1102 is includes an upper shell piece 1202 and a lower shell piece 1203. The upper shell piece 1202 and the lower shell piece 1203 may be joined together by a single tab 1204 as shown, or by multiple tabs. The lower shell piece 1203 may include guide tabs (not shown) that align the lower shell piece 1203 with the upper shell piece 1202 and provide an support surface to maintain the rigidity of the attached upper and lower shell pieces. The shell member desirably incorporates numerous openings in the rear surface to provide access to the various input and outputs of the electronic device, as is described in greater detail below. As has been described in greater detail above, the protection system 400 includes a non-slip member 22 made of a non-slip material in order to provide a gripping surface to prevent a handheld electronic device from slipping on a solid surface. The non-slip member 22, similar to the non-slip member 112 discussed above with respect to FIG. 8, preferably also contains a magnetic member, such as a rare earth magnet, as further discussed above. The magnet is positioned near or embedded within the non-slip member 22 in order to provide a means of attached protection system 400 to a magnetic surface without impacting the non-slip benefits provided by non-slip member 22 or scratching the surface upon which the electronic device is placed. The protection system 400 also includes an attachment region 8106 for attaching a mounting member as is described in greater detail with respect to attachment region 106 shown in FIGS. 1-3.

Similarly to the protection system 300 described above with respect to FIG. 15A, the embodiment shown in FIGS. 20A and B also includes an elastomer or rubber bumper 1120 that may be used in addition to the rigid shell member 1102. As shown, the rigid shell member 1102 provides access along the peripheral edges of the electronic device to the various controls or buttons located along the peripheral edge. The rubber bumper 1120 surrounds the peripheral edges of the rigid shell member 1102 and fits securely over the rigid shell member 1102 to provide an additional level of protection that is also easily removable as the rubber bumper can stretch and flex. In one embodiment, the rubber bumper 1102 also includes a lip 1122 that extends around the periphery of the front surface of the electronic device. The lip 1122 may extend slightly over the front display surface of the electronic device such that the rubber bumper 1120 will not easily slide off. However, the lip 1122 desirably does not significantly cover the front display area of the electronic device.

FIGS. 20C and D illustrate the protection system 400 with the rubber bumper 1120 installed over the rigid shell member 1102. As was discussed above with respect the embodiment of the protection system 300 shown in FIGS. 15A and B, the rubber bumper 1120 may have a pattern imprinted or otherwise formed on some or all of the peripheral edges to provide a means for gripping or holding the electronic device. While some of the buttons, such as volume controls or power controls, may be covered by the rubber bumper 1120 as indicated by the references 5, 7, and 9, the rubber bumper 1120 may include raised areas along the peripheral edges to provide a means for interacting with the underlying buttons or controls. The under or interior side of the rubber bumper 1120 preferably includes interaction members that extend towards the peripheral edge of the electronic device from the interior peripheral edge of the rubber bumper 1120 such that the buttons or other controls may be pushed from the outside of the rubber bumper 1120.

The assembled upper shell piece 1102 and lower shell piece 1204 of the protection system 400 together define an interior region or space in which a handheld electronic device may be enclosed as discussed above with respect to FIGS. 1-4. Additionally, the protection system 400 is preferably compatible with any of the mounting, support, or display members discussed herein.

Additional Mounts

Preferably, the mounts disclosed herein are configured for use with the mounting arrangements (e.g., attachment region 106) disclosed above. In those arrangements, the attachment region 106 is provided by a separate case that is configured to receive an electronic device, such as a smart phone. However, in other arrangements, an electronic device (e.g., smart phone, GPS device, cycle computer, camera or other data acquisition unit) can include a suitable attachment region provided in an integrated housing of the device. Thus, a description of either one herein also includes the other, unless indicated otherwise.

FIGS. 21A-D illustrate a universal mount 2100 that can permit an associated electronic device to be secured to a variety of objects, such as a vehicle handlebar or other rod, tube or bar-like objects. The mount 2100 generally comprises a mount portion 2102 and a strap portion 2104. The mount portion 2102 preferably is constructed from a relatively rigid material (more rigid than the strap portion 2104), such as a hard plastic material, and is configured in a manner substantially similar to the mounting member 108 discussed above. However, preferably, the illustrated mount portion 2102 includes a lock arrangement 2110 that selectively secures the associated electronic device to the mount 2100.

In particular, the lock arrangement 2110 includes a lock arm or lock tab 2112 that extends away from the main body portion of the mount portion 2102. Preferably, the lock tab 2112 is flexible generally in a direction perpendicular to a primary plane of the mount portion 2102 and carries one of the projections 926 as discussed above. The lock tab 2112 is normally biased into an engagement position in which the projection 926 engages the attachment region 2106 of an associated case shell. The lock tab 2112 can be moved (e.g., downwardly) to disengage the projection 926 and permit removal of the associated case from the mount 2100.

The lock tab 2112 can be supported relative to the main body of the mount portion 2102 and/or biased by any suitable arrangement. For example, in some configurations, the lock tab 2112 can be unitarily formed (i.e., a single piece) with a portion or all of the main body and the biasing force can be provided by the resilient nature of the material. However, in the illustrated arrangement, the lock tab 2112 is an elongate arm that is pivotally attached to the main body of the mount portion 2102. Preferably, the lock tab 2112 comprises a pair of pin portions one each side of the tab 2112 that engage respective openings defined by a generally channel-shaped base 2114 of the mount portion 2102. In other arrangements, a separate rod or pin member can pivotally attach the lock tab 2112 to the main body of the mount portion 2102. Preferably, a biasing member, such as a spring 2116, biases the lock tab 2112 into the engaged position.

The strap portion 2104 allows the mount 2100 to be attached to a variety of objects. The strap portion 2104 includes two portions that can be selectively secured together, preferably in one of two or more available positions to provide adjustability to the mount 2100. In the illustrated arrangement, the strap portion 2104 includes four adjustment positions. In particular, a first section of the strap portion 2104 includes an opening or window 2120 that accommodates a second section of the strap portion 2104 and a portion of the first section surrounding the window 2120 selectively engages one of the available adjustment or engagement spaces defined by the second section. In the illustrated arrangement, the adjustment spaces are arranged generally within a single plane or tangentially with respect to an axis about which the strap portion 104 can be mounted. Thus, some of the adjustment spaces are radially closer to the axis than other adjustment spaces.

Figure 21A:
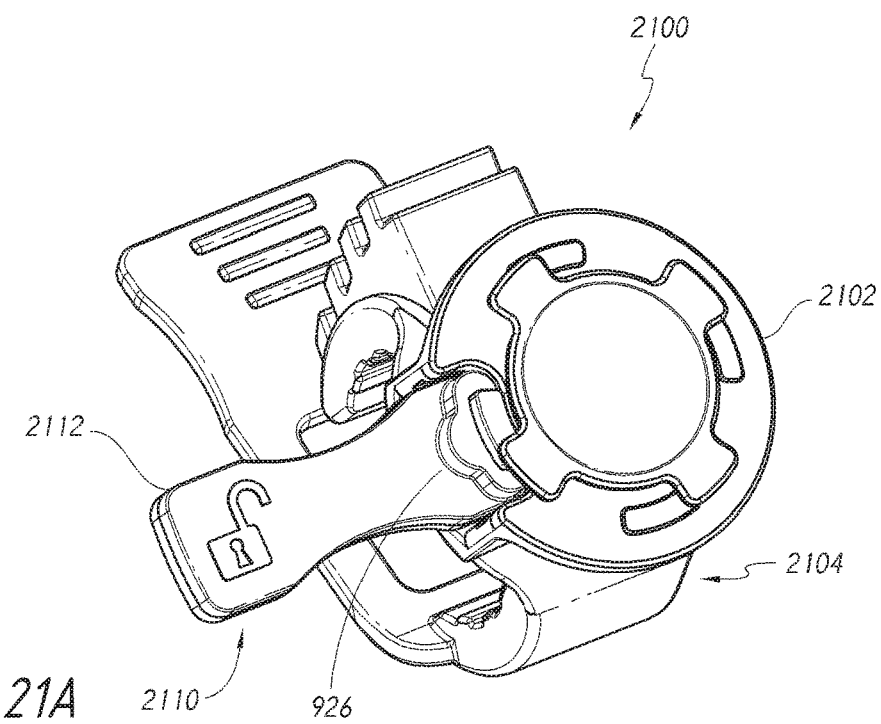
FIG. 21A illustrates a front perspective view of a mount for an electronic device configured with a locking member.
Figure 21B:
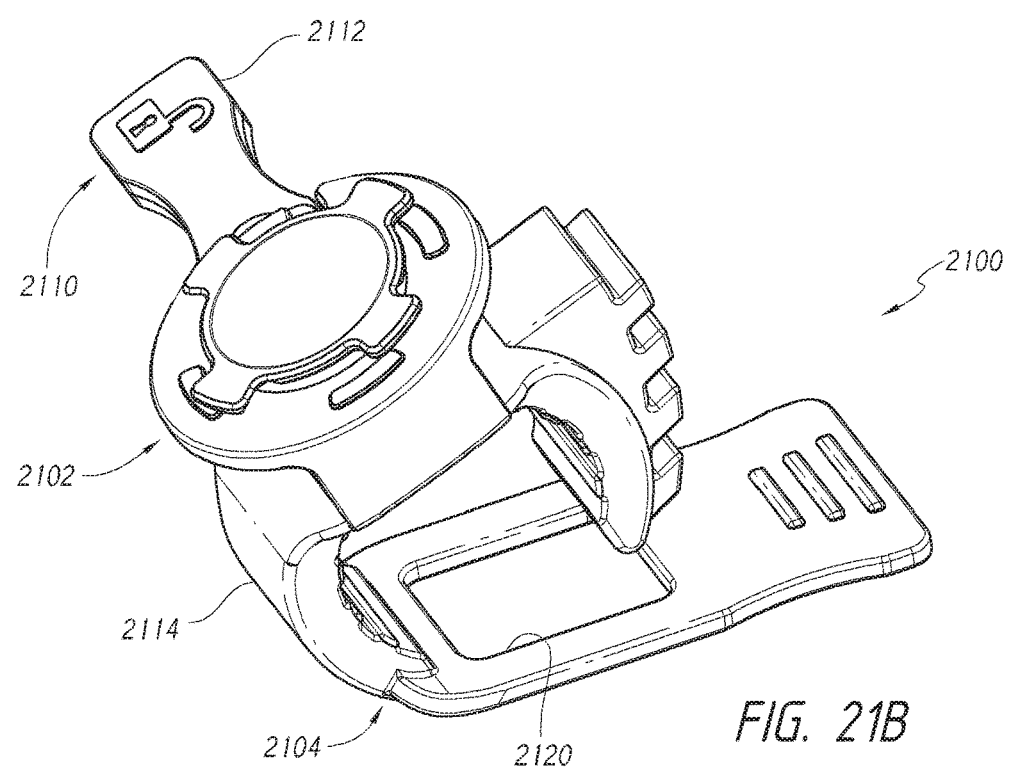
FIG. 21B illustrates a side view of the mount shown in FIG. 21A.
Figure 21C:
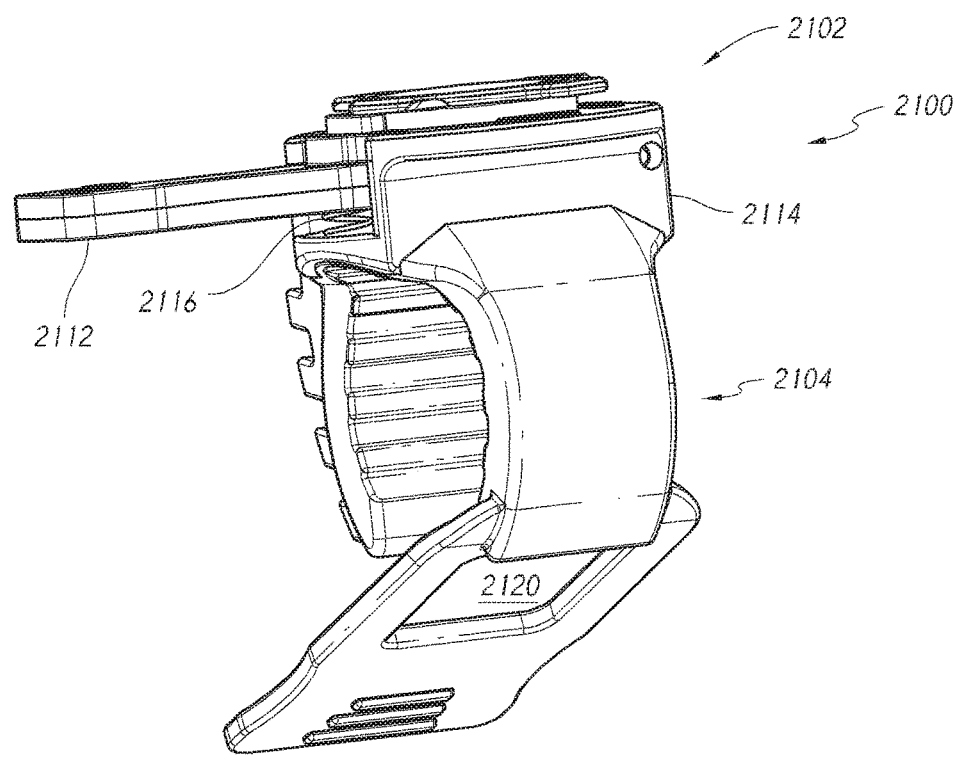
FIG. 21C illustrates another side view of the mount shown in FIG. 21A.
Figure 21D:
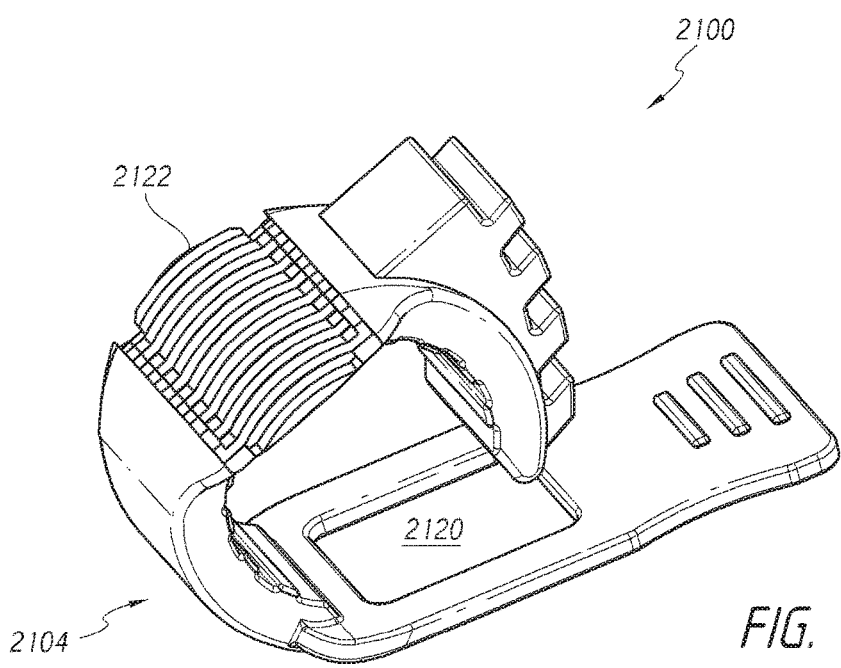
FIG. 21D illustrates an underside view of the mount shown in FIG. 21A.

The mount portion 2102 can be coupled to the strap portion 2104 by any suitable arrangement. With reference to FIG. 21D, the strap portion 2104 can include an axially-extending recess, which defines a plurality of circumferential ribs 2122. At least some of the ribs 2122 can be positioned on more than one (e.g., two or three) surfaces of the recess. Preferably, most of the ribs 2122 are positioned on three surfaces of the recess. The mount portion 2102 can be received within the recess with the ribs 2122 of the strap portion 2104 engaging corresponding structure (e.g., ribs) on the mount portion 2102. Thus, the coupling of the mount portion 2102 and the strap portion 2104 can be solely via engagement of the corresponding ribs. Alternatively, or in addition, other suitable means for connection of the mount portion 2102 and the strap portion 2104 can be provided.

Figure 22:
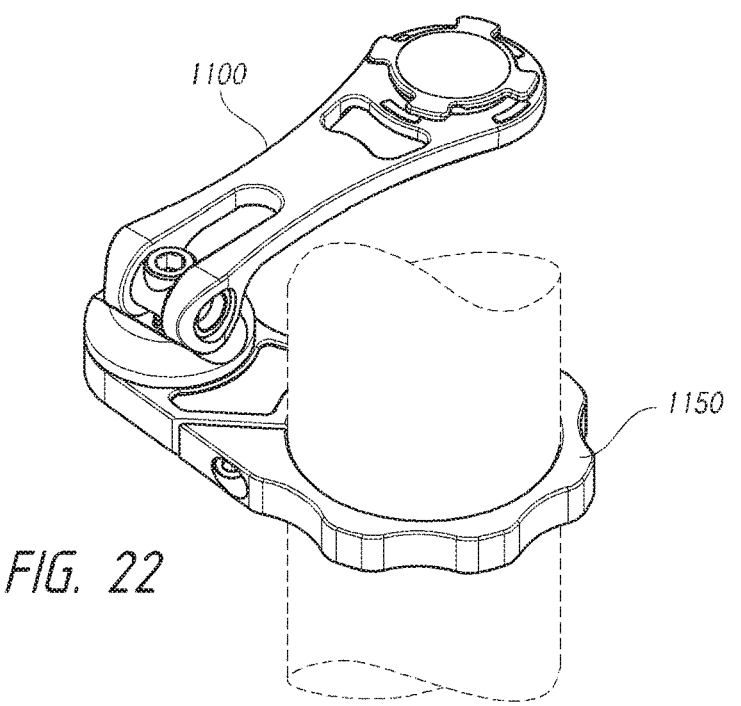
FIG. 22 is a perspective view of another embodiment of a mount for an electronic device configured to attach to a fork of a bicycle or motorcycle.
Figure 23:
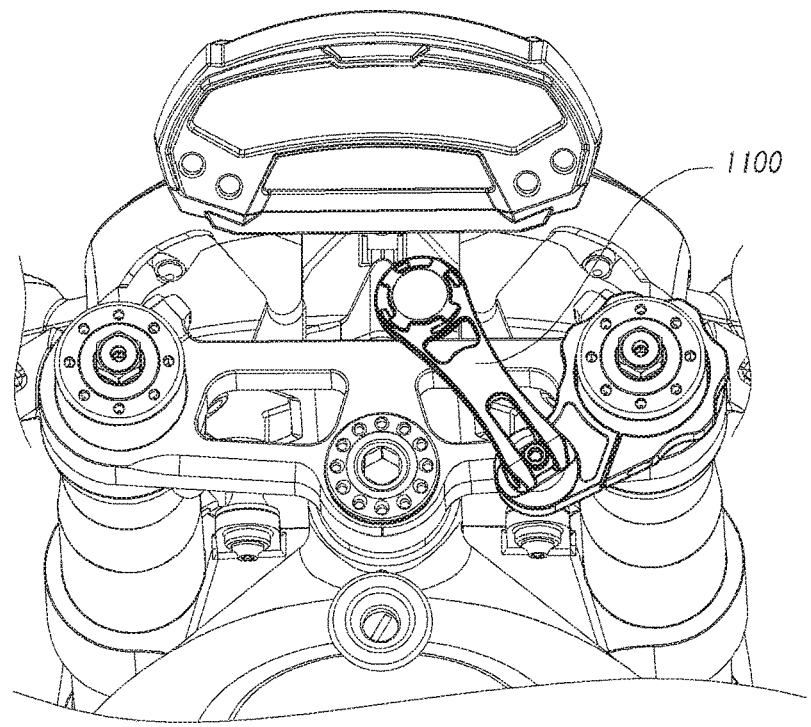
FIG. 23 is a view of the mount shown in FIG. 22 attached to a front fork of a motorcycle.

FIGS. 22 and 23 illustrate a mount configured to be attached to a tubular object, such as a motorcycle (illustrated) or bicycle fork leg. The mount can comprise a bike mount as shown and described with reference to bike mount 1100 shown in FIG. 11. The bike mount can be secured to a fork tube clamp 1150 that can be secured to the motorcycle or bicycle fork leg. The fork tube clamp 1150 can have a split-ring design, for example.

Figure 24:
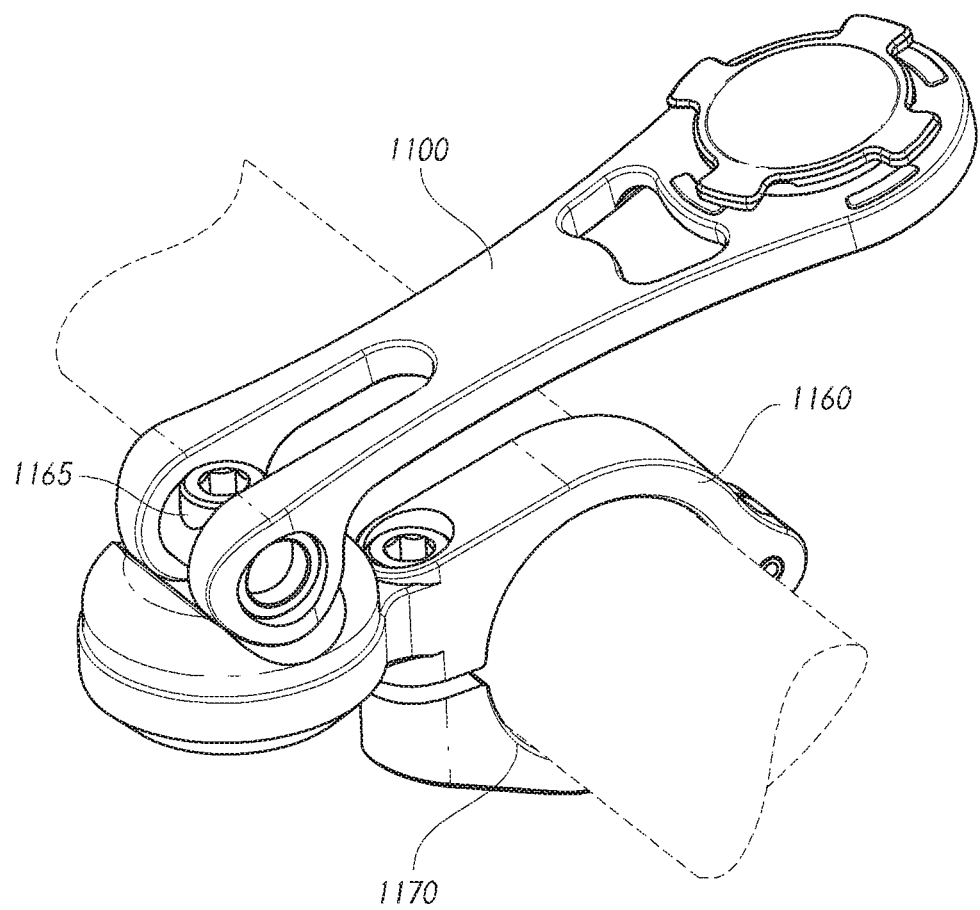
FIG. 24 is a perspective view of a third embodiment of a mount for an electronic device configured to attach to a tube, such as a tube for a bicycle.

FIG. 24 illustrates another mount that can be secured to a tubular object, such as a motorcycle or bicycle handlebar. This mount also includes the bike mount 1100 as shown and described with reference to FIG. 11. In addition, the bike mount 1100 can be secured to a clamp arrangement 1160 having two portions that can be used to clamp the bike mount 1100 to a tubular object. In the illustrated arrangement, the two portions are pivotally connected and can be secured by a suitable fastening member, such as a bolt. Rubber shims 1170 can be provided for additional friction and to adjust the clamp arrangement 1160 to different sized tubular objects.

Interchangeable Inserts for Protective System

Figure 25:
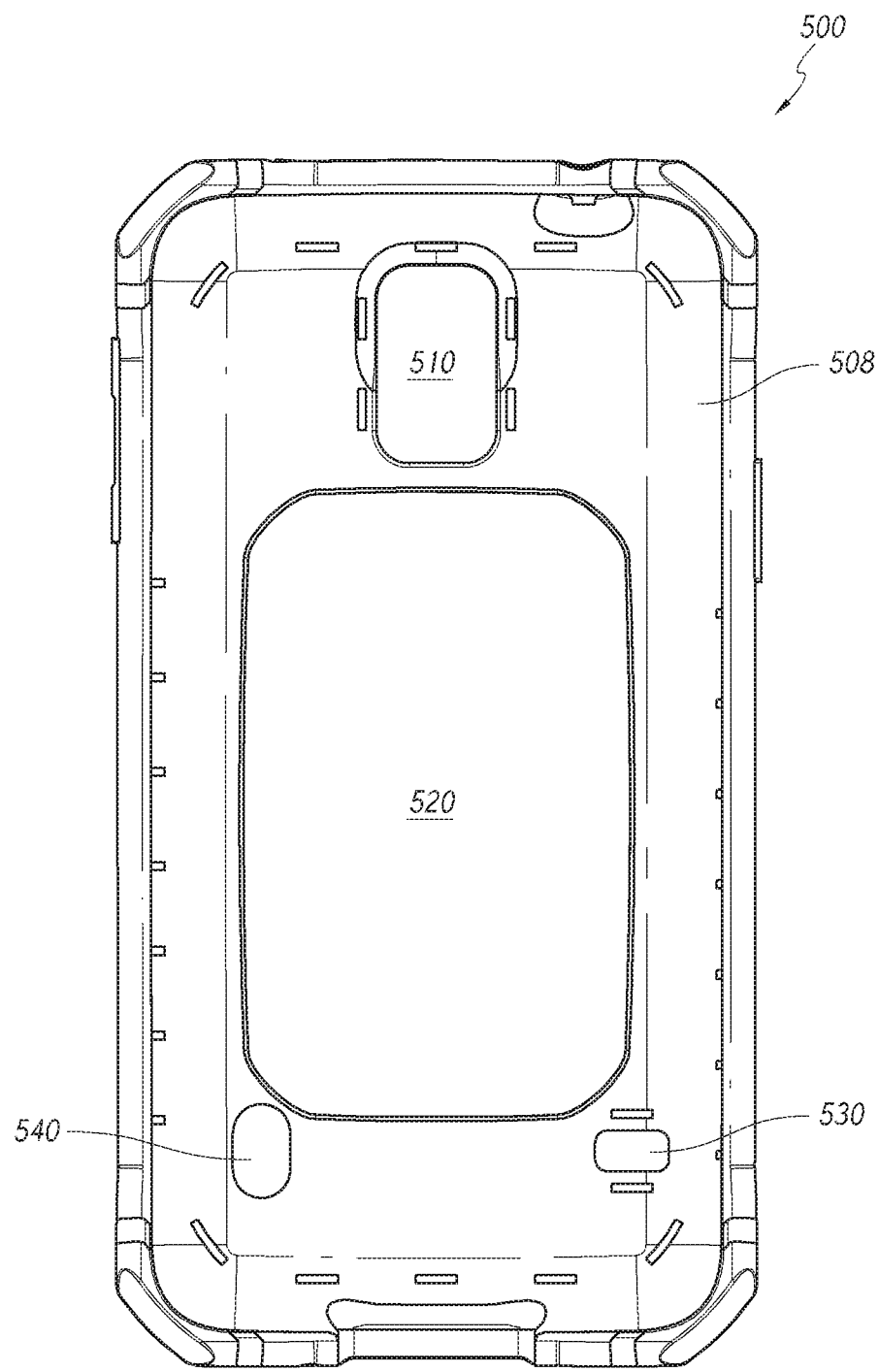
FIG. 25 is a view of the interior rear surface of a shell of another embodiment of a protective system for a handheld electronic device.

Further embodiments of a modular or interchangeable protective case for an electronic device are shown in FIGS. 25-33. FIG. 25 illustrates a view of an interior rear surface of a protective system 500 for a handheld electronic device (e.g., smart phone, GPS device, cycle computer, camera or other data acquisition unit). As discussed above with respect to FIG. 1, the protective system 500 comprises a shell for securing and protecting a handheld electronic device. In a preferred embodiment, the shell may be in a single piece for ease of assembly around a handheld electronic device. The shell also preferably provides a connection region for connecting an interchangeable insert. The shell preferably is formed using a material that is generally flexible and lightweight, such as but not limited to rubber, silicone, or other suitable material(s). Preferably, the shell comprises flexible sidewalls that surround an entirety or portions of the peripheral edges of the device. The sidewalls preferably are arranged to protect the device by absorbing incidental shock forces and/or inhibiting or preventing direct contact between the device and another object. The sidewalls also desirably contain various button portions or openings to allow access to the control buttons, inputs, and outputs of the handheld electronic device.

In one embodiment, protective system 500 comprises a shell 508 having sidewalls that surround an entirety or portions of the peripheral edges of the device, similar to protective system 100 shown in FIG. 1. The protective system 500 also comprises a number of openings (such as openings 510, 530 and 540) to allow additional access to features of the handheld electronic device that may be located on the rear of the device (such as a camera) or to reduce the weight of the shell.

Figure 26:
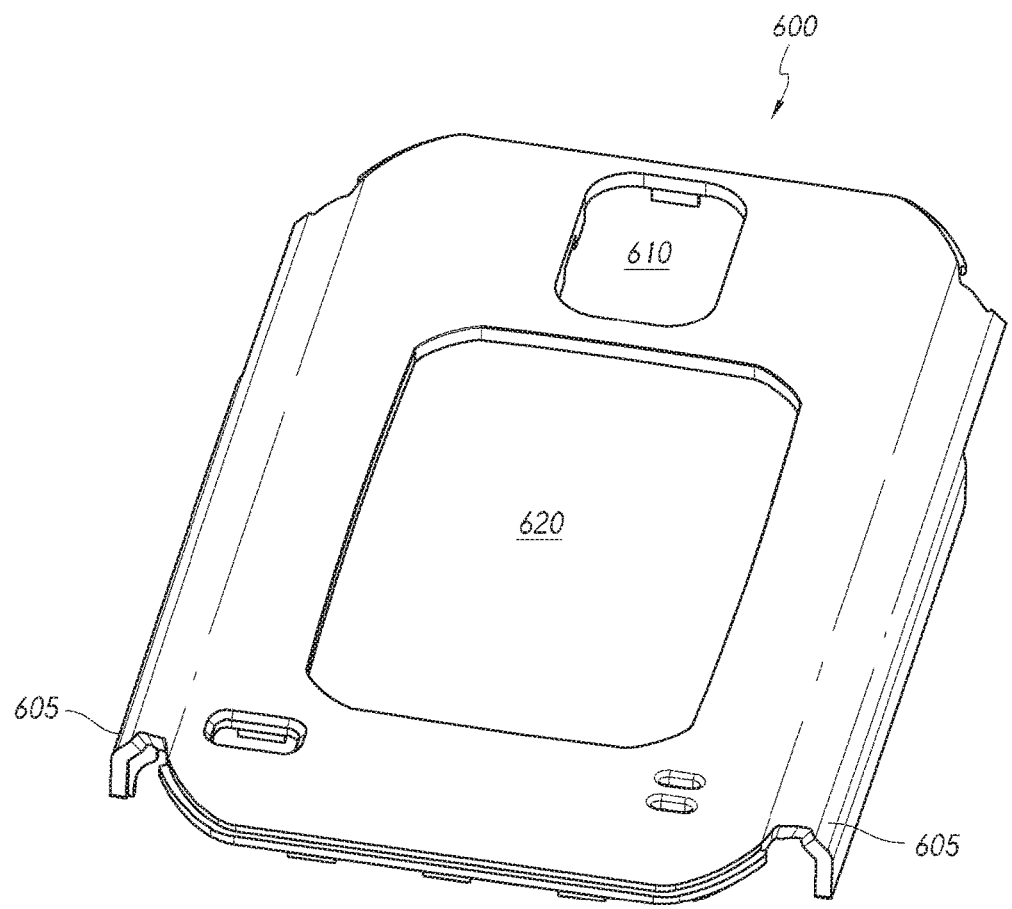
FIG. 26 is a perspective view of an interchangeable insert for use with a protective system such as that shown in FIG. 25.
Figure 27:
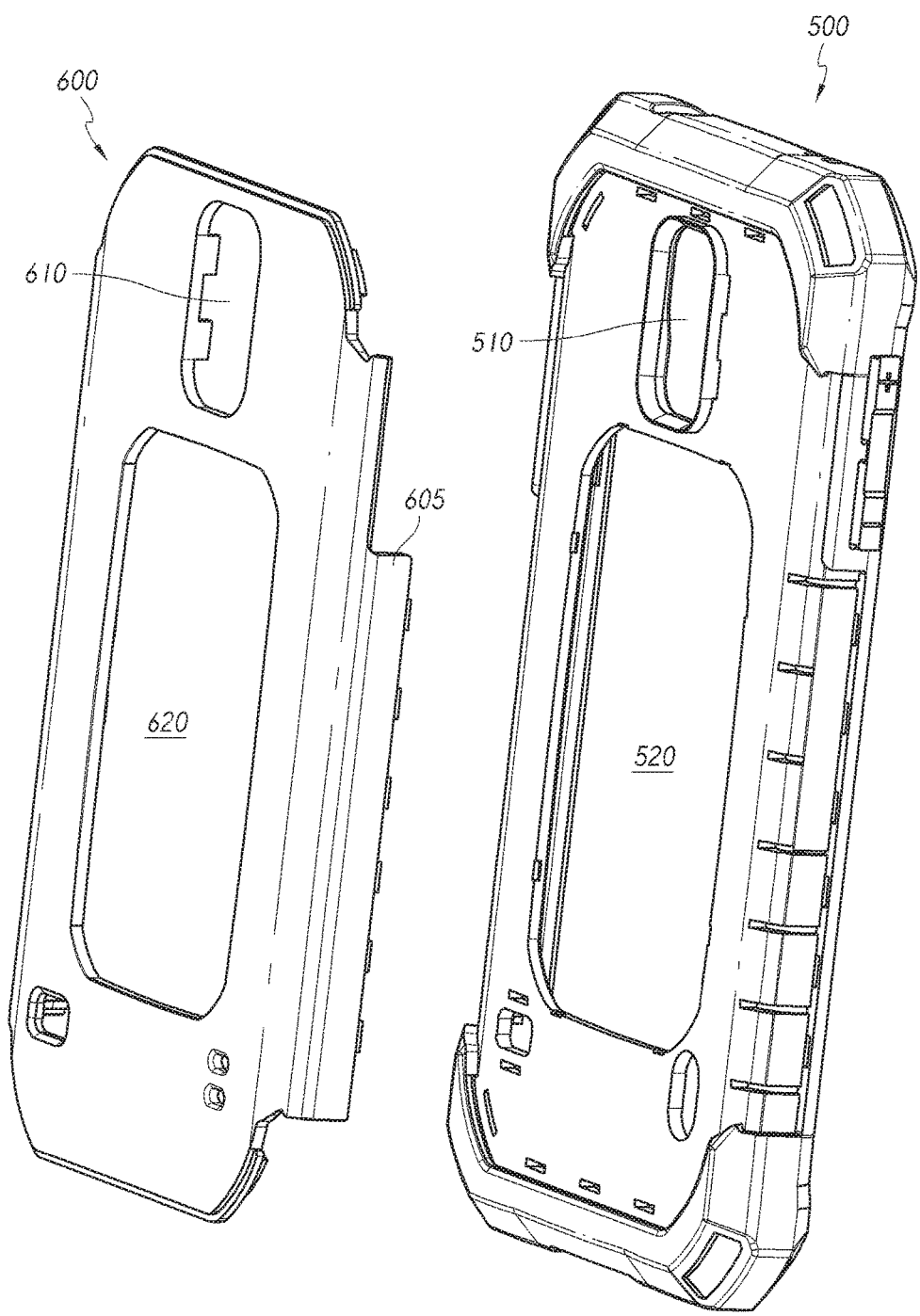
FIG. 27 is an exploded rear view of another embodiment of a protective system for a handheld electronic device.

The protective system shown in FIG. 25 may also incorporate an exterior shell piece, such as shell piece 600 shown in FIG. 26. The exterior shell piece 600 comprises extending sidewalls 605 that wrap around the exterior surface of the sidewalls 508 of the protective system 500. Tabs or other mechanical fasteners can hold the exterior shell piece 600 to the protective system 500. The exterior shell piece 600 is preferably made of a rigid and lightweight material such as but not limited to an injection molded polycarbonate or other suitable plastic material(s). When inserted onto the rear of the protective system 500, the exterior shell 600 can provide a rigid protective surface for the electronic device. Preferably, as shown in FIG. 27, the openings 610, 620 within the exterior shell piece 600 align with corresponding openings 510, 520 in the protective system 500 to provide access to features of the electronic device, such as the camera or a battery.

Figure 28A:
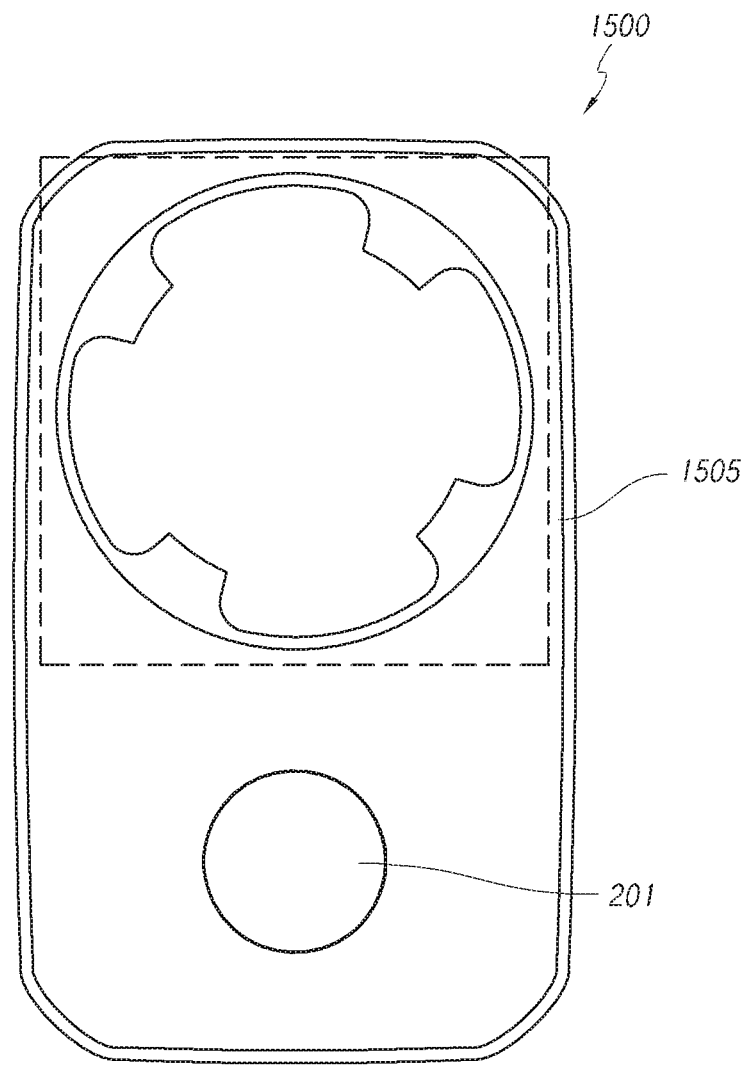
FIG. 28A is an exterior rear view of another embodiment of an interchangeable insert having an attachment region for use with a protective system such as the protective system shown in FIG. 25.

In some embodiments, interchangeable inserts may be used with a protective system for an electronic device to provide added function, such as providing an attachment region for a mount such as the mounts described herein, a non-slip surface to prevent the electronic device from slipping off a solid surface such as a desk or table, and/or an embedded magnet to attach the electronic device to a magnetic surface. FIG. 28A illustrates a rear view of one interchangeable insert 1500 that incorporates an opening 1505 for an attachment region similar to attachment region 106 as described above with respect to FIGS. 1-3. Additionally, the interchangeable insert 1500 may also comprise a magnetic member 201 that may be used to removably attach the electronic device to a magnetic surface.

Figure 28B:
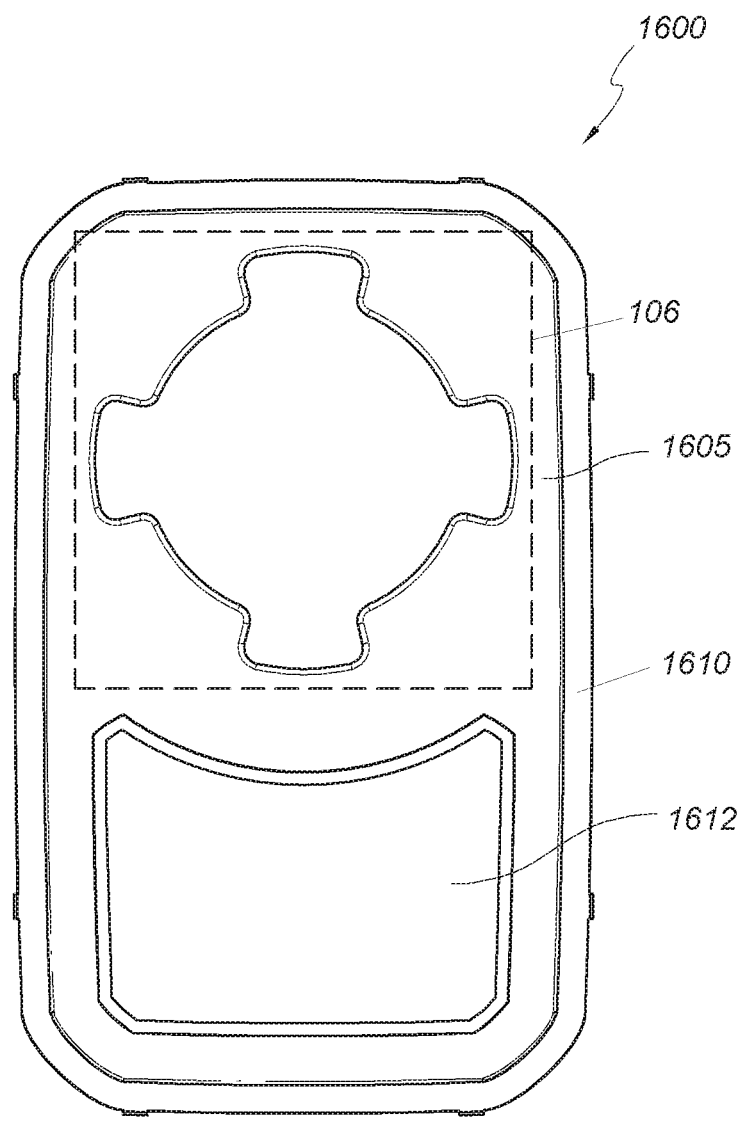
FIG. 28B is an exterior rear view of another embodiment of an interchangeable insert configured to attach with the insert shown in FIG. 28A for use with a protective system such as the protective system shown in FIG. 25.
Figure 29:
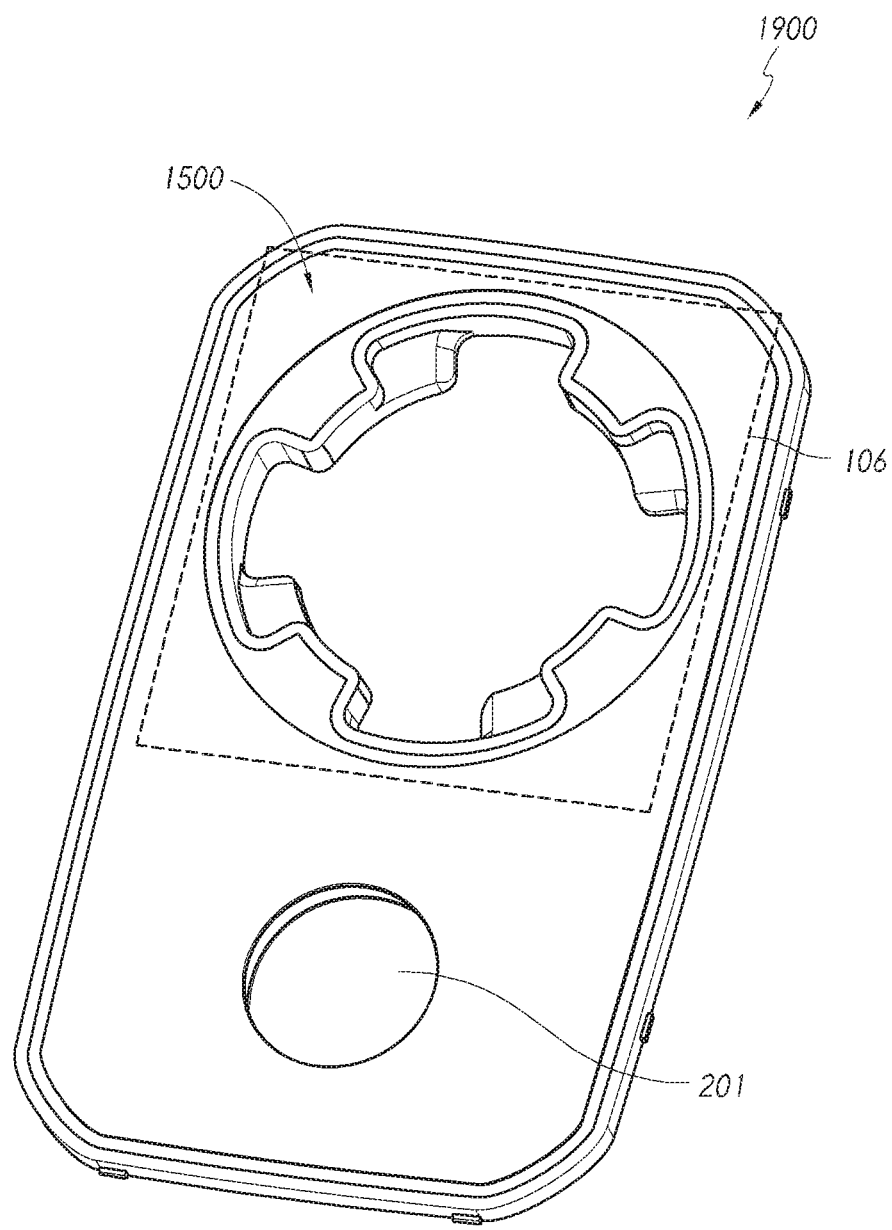
FIG. 29 is a view of the interior rear surface of the interchangeable insert shown in FIG. 28.

A second interchangeable insert 1600 is shown in FIG. 28B. Preferably, the interchangeable insert 1600 is configured such that the interchangeable insert 1500 shown in FIG. 28A can be pressed onto the surface 1605 such that the exterior surface of the insert 1500 is flush with or slightly below the surrounding sidewalls 1610 of the insert 1600. The insert 1600 comprises an attachment region 106 similar to attachment region 106 as described above with respect to FIGS. 1-3 for attaching a mount or mounting member. As discussed above, a mounting member, such as mounting member 108 discussed above, may interact with the attachment region to mount the electronic device to a variety of surfaces or in a variety of positions. Additionally, insert 1600 may further comprise a non-slip member 1612 similar to the non-slip members discussed above. When inserts 1500 and 1600 are assembled, the magnet is positioned near or embedded within the non-slip member 1612 in order to provide a means of attaching the protection system to a magnetic surface without impacting the non-slip benefits provided by non-slip member 1612 or scratching the surface upon which the electronic device is placed. FIG. 29 illustrates the interchangeable insert assembly 1900 of insert 1500 and insert 1600.

Figures 30, 31:
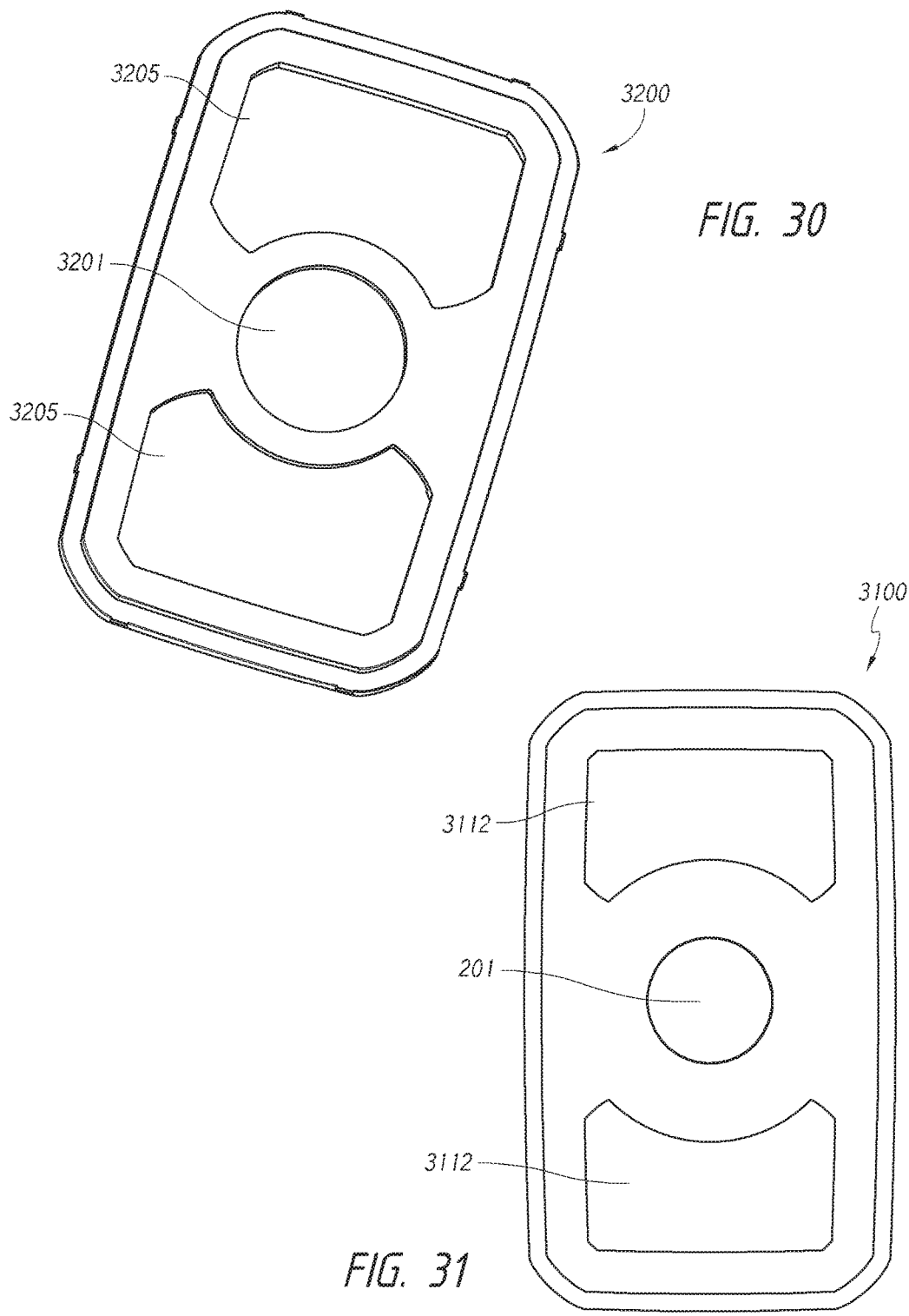
FIG. 30 is a perspective view of another embodiment of an interchangeable insert for use with a protective system such as the protective system shown in FIG. 25.
FIG. 31 is a rear view of another embodiment of an interchangeable insert for use with a protective system such as the protective system shown in FIG. 25.
Figure 32:
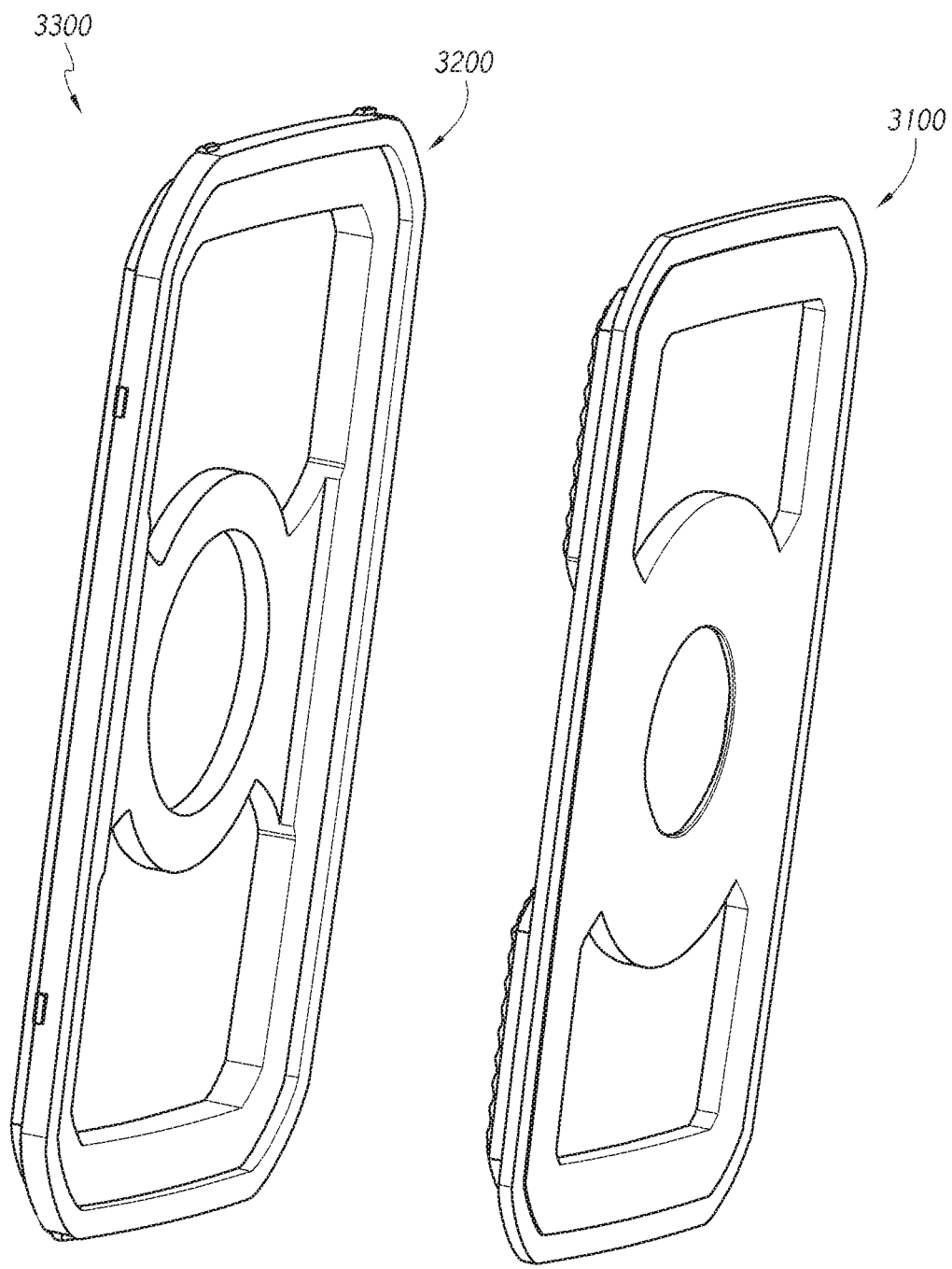
FIG. 32 is an exploded rear view of the interchangeable inserts shown in FIGS. 30 and 31 that may be used together with a protective system for a handheld electronic device, such as the protective system shown in FIG. 25.

Another embodiment of an interchangeable insert for a protective system is shown in FIGS. 30 and 31. The insert may be formed from a first piece 3100 that may comprise one or more non-slip members 3112. Additionally, the first piece 3100 may also comprise a magnetic member 201 that may be embedded within a non-slip member as discussed above with respect to FIG. 8A-C. As discussed above, the one or more non-slip members may be arranged such that a non-slip surface of the non-slip member extends above a rear surface of the protective system such that the non-slip surface provides non-slip properties and benefits to the protection system, such as preventing a handheld electronic device within the protection system from sliding off a smooth surface such as a desk or counter. A second piece 3200, shown in FIG. 30, is desirably configured to receive the first piece 3100. Openings 3205 and 3201 are preferably configured such that the non-slip members 3112 and magnetic member 201 can fit within the openings 3205, 3201 and extend beyond a rear surface of the protective system as discussed in greater detail above. An exploded view of the assembly of inserts 3100 and 3200 is shown in FIG. 32. The insert assembly 3300 comprising interchangeable inserts 3100 and 3200 may be used with a protective system for an electronic device, such as protective system 500 shown in FIG. 27.

Figure 33:
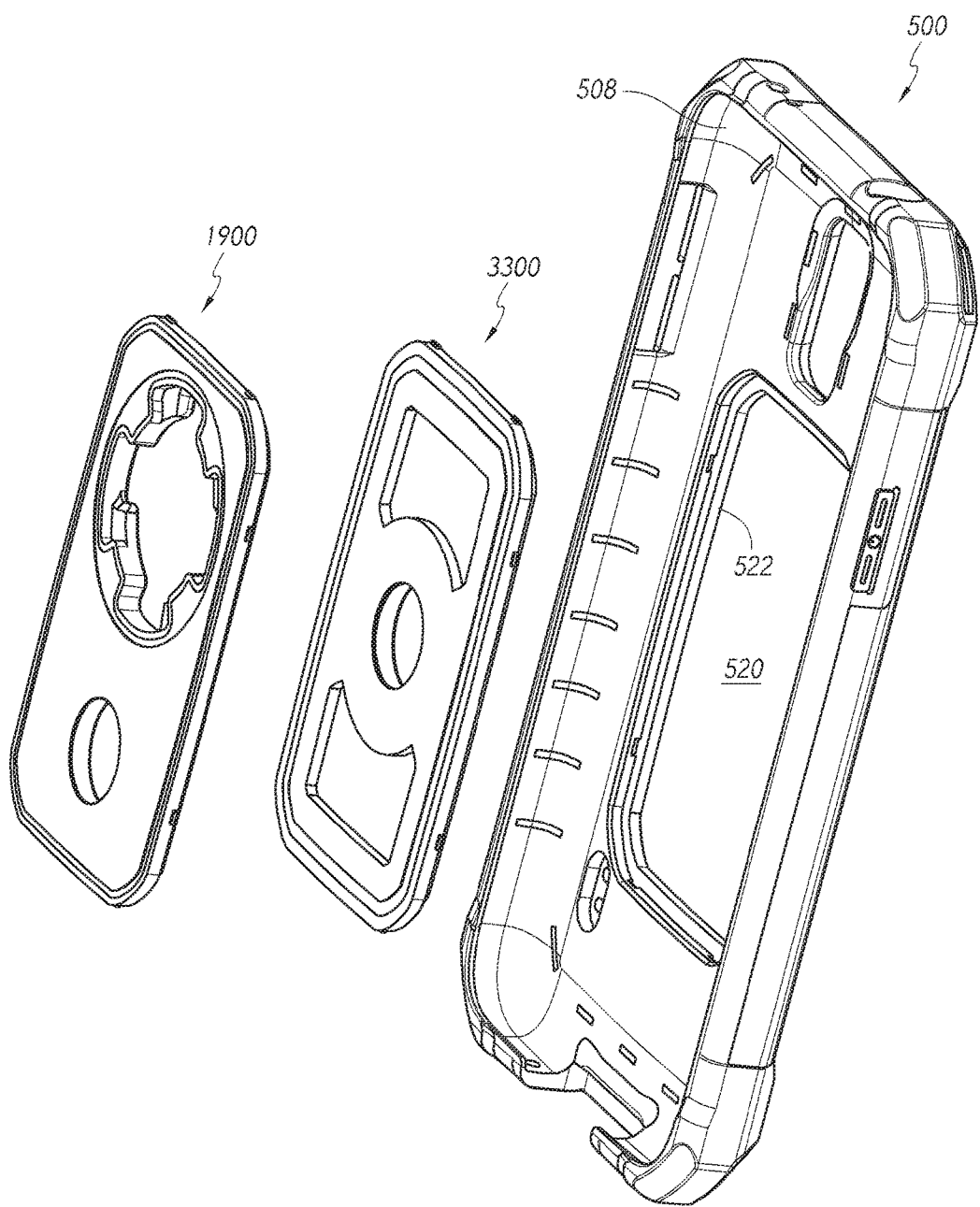
FIG. 33 is an exploded rear view of the interchangeable inserts shown in FIGS. 29 and 31 that may be used with the protective system shown in FIG. 25.

FIG. 33 illustrates a protective system 500 that can accommodate either of the interchangeable insert assemblies 1900 and 3300 discussed above. Preferably, either of the insert assemblies 1900 and 3300 may be inserted into the opening 520 in the shell 508 such that at least a partial surface of the insert assembly extends beyond the rear surface of the shell 508. Preferably, each of the inserts 1900 and 3300 are larger than the opening 520 such that the edge of the insert 1900, 3300 is supported by the interior-facing surface 522 that surrounds the opening 520 to retain the insert 1900, 3300 in place. As illustrated, the insert assembly is fit with the shell 508 prior to installing the protective system on an electronic device. The insert assemblies 1900 and 3300 are easily interchangeable, depending on the user's preference. For example, if the user would like to mount the electronic device using any of the mounts disclosed herein, the user may remove the protective system 500 from the electronic device and easily fit the assembly 1900 to the shell 508. If the user prefers a solid rear surface comprising one or more non-slip members, the user can easily remove the protective system 500 from the electronic device and switch out or install the interchangeable insert assembly 3300 with the shell 508. This system of interchangeable inserts provides greater flexibility and ease of use of the protective system. Additionally, in some embodiments, the inserts 1900 and 3300 may be made of materials of different colors, allowing the user to further personalize the protective system 500.

Although this application discloses certain preferred embodiments and examples, it will be understood by those skilled in the art that the present inventions extend beyond the specifically disclosed embodiments to other alternative embodiments and/or uses of the invention and obvious modifications and equivalents thereof. Further, the various features of these inventions can be used alone, or in combination with other features of these inventions other than as expressly described above. While the disclosed embodiments are primarily directed to a protection system for a handheld electronic device, aspects of the invention may be used in connection with other types of protection systems. Thus, it is intended that the scope of the present inventions herein disclosed should not be limited by the particular disclosed embodiments described above, but should be determined only by a fair reading of the claims that follow.

What is claimed is:

1. A mounting system for mounting a wireless electronic device having a speaker to an associated mount, comprising:

a locking member associated with one of the speaker and the mount, the locking member defining an attachment region designed to receive an interlocking member having a structure and associated with the other of the speaker and the mount;

the attachment region comprising an open space and at least a first interlocking surface portion, a second interlocking surface portion, and a third interlocking surface portion, each of the interlocking surface portions surrounding at least a portion of the open space and being circumferentially offset from each other, each of the interlocking surface portions including a retaining surface that defines an interlocking area;

the interlocking member comprising a plate portion having at least a first engaging member, a second engaging member, and a third engaging member, each of the engaging members being configured to interact with one of the first, second and third interlocking surface portions such that, in use, the plate portion is received in the open space and each of the engaging members is disposed within one of the interlocking areas to removably interlock the interlocking member with the locking member in an interlocked position; and a magnet enclosed within the structure of the interlocking member such that at least an outer surface of the interlocking member completely conceals the magnet, the magnet centered within a boundary defined by the plate portion of the interlocking member.

2. The system of claim 1, wherein the interlocked position is achieved by rotation of the interlocking member within the attachment region.

3. The system of claim 1, wherein the magnet enables the wireless electronic device to be mounted on to a magnetically attractive surface.

4. A mounting system for mounting a wireless electronic device having a speaker to an associated mount, comprising:

a locking member associated with one of the speaker and the mount, the locking member defining an attachment region designed to receive an interlocking member having a structure and associated with the other of the speaker and the mount;

the attachment region comprising an open space and a plurality of interlocking surface portions, the plurality of interlocking surface portions surrounding at least a portion of the open space and being circumferentially offset from each other, each of the interlocking surface portions including a retaining surface that defines an interlocking area;

the interlocking member comprising a generally circular plate portion having a plurality of engaging members, each of the engaging members being configured to interact with one of the plurality of interlocking surface portions such that, in use, the generally circular plate portion is received in the open space and each of the plurality of engaging members is disposed within one of the plurality of interlocking areas to achieve an interlocked position between the interlocking member and the locking member; and a magnet enclosed within one or both of the structure of the interlocking member and a structure of the attachment region, said structures comprising at least an outer surface configured to completely conceal the magnet, the magnet configured to facilitate location of the interlocking member relative to the attachment region prior to interlocking of the interlocking member with the locking member.

5. The system of claim 4, wherein the interlocked position is achieved by rotation of the interlocking member within the attachment region.

6. The system of claim 4, wherein the magnet enables the wireless electronic device to be mounted on to a magnetically attractive surface.

7. A mountable wireless speaker, comprising:

a housing having a first wall and a second wall spaced from the first wall;

a locking portion comprising a plurality of tabs spaced outwardly from an exterior surface of the second wall, each of the tabs circumferentially offset from one another and defining an interlocking surface portion, wherein the locking portion is configured to interlock with a cooperating mount having a plurality of tabs, wherein the interlocking surface portions of the locking portion engage the plurality of tabs of the mount when the housing is interlocked with the mount;

a magnet enclosed within a structure of the locking portion such that at least an outer surface of the locking portion completely conceals the magnet, the magnet centered within a boundary defined by the locking portion, the magnet configured to facilitate location of the locking portion relative to the mount prior to interlocking of the housing with the mount or to allow the housing to be secured to a cooperating magnetically-attractive surface.

* * * * *